US012685995B2

(12) United States Patent
Konstas et al.

(10) Patent No.: US 12,685,995 B2
(45) Date of Patent: Jul. 21, 2026

(54) MICROPOROUS AEROGEL

(71) Applicant: Commonwealth Scientific and Industrial Research Organisation, Australian Capital Territory (AU)

(72) Inventors: Kristina Konstas, Acton (AU); George Maurdev, Acton (AU); Xingdong Wang, Acton (AU)

(73) Assignee: Commonwealth Scientific and Industrial Research Organisation (AU)

( * ) Notice: Subject to any disclaimer, the term of this patent is extended or adjusted under 35 U.S.C. 154(b) by 45 days.

(21) Appl. No.: 18/041,399

(22) PCT Filed: Aug. 10, 2021

(86) PCT No.: PCT/AU2021/050878
§ 371 (c)(1),
(2) Date: Feb. 10, 2023

(87) PCT Pub. No.: WO2022/032338
PCT Pub. Date: Feb. 17, 2022

(65) Prior Publication Data

US 2023/0398515 A1 Dec. 14, 2023

(30) Foreign Application Priority Data

Aug. 10, 2020 (AU) ................................ 2020902820

(51) Int. Cl.
*B01J 20/10* (2006.01)
*B01D 53/04* (2006.01)
(Continued)

(52) U.S. Cl.
CPC ........ *B01J 20/103* (2013.01); *B01D 53/0438* (2013.01); *B01J 20/24* (2013.01);
(Continued)

(58) Field of Classification Search
None
See application file for complete search history.

(56) References Cited

U.S. PATENT DOCUMENTS 9,931,612 B2 4/2018 Begag et al.
11,897,776 B2 2/2024 Tran et al.
(Continued)

FOREIGN PATENT DOCUMENTS

CN 101973558 A 2/2011
CN 103706342 A 4/2014
(Continued)

OTHER PUBLICATIONS

Xomeritakis et al (Microporous sol-gel derived aminosilicate membrane for enhanced carbon dioxide separation, Separation and Purification Tech. 42, (2005) 249-257). (Year: 2005).*
(Continued)

*Primary Examiner* — Michael Forrest
(74) *Attorney, Agent, or Firm* — Brown Rudnick LLP; Ryan C. Smith

(57) ABSTRACT

The present disclosure generally relates to a microporous aerogel, processes for preparing a microporous aerogel, and applications for the microporous aerogel. The present disclosure also generally relates to an apparatus for capturing carbon dioxide from a gaseous stream or from the atmosphere, the apparatus comprising a microporous aerogel for selectively adsorbing and desorbing the carbon dioxide.

32 Claims, 28 Drawing Sheets

(51) Int. Cl.

| | |
|---|---|
| ***B01J 20/24*** | (2006.01) |
| ***B01J 20/26*** | (2006.01) |
| ***B01J 20/28*** | (2006.01) |
| ***B01J 20/30*** | (2006.01) |
| ***B01J 20/34*** | (2006.01) |
| ***C01B 33/155*** | (2006.01) |
| ***C01B 33/158*** | (2006.01) |

(52) U.S. Cl.

CPC ........... *B01J 20/261* (2013.01); *B01J 20/262* (2013.01); *B01J 20/28011* (2013.01); *B01J 20/28016* (2013.01); *B01J 20/28047* (2013.01); *B01J 20/28059* (2013.01); *B01J 20/28061* (2013.01); *B01J 20/28064* (2013.01); *B01J 20/2808* (2013.01); *B01J 20/3042* (2013.01); *B01J 20/3085* (2013.01); *B01J 20/3433* (2013.01); *B01J 20/3483* (2013.01); *C01B 33/155* (2013.01); *C01B 33/1585* (2013.01); *B01D 2253/106* (2013.01); *B01D 2253/25* (2013.01); *B01D 2253/306* (2013.01); *B01D 2253/308* (2013.01); *B01D 2257/504* (2013.01); *B01D 2259/4009* (2013.01); *C01P 2006/10* (2013.01); *C01P 2006/12* (2013.01); *C01P 2006/16* (2013.01)

(56) References Cited

U.S. PATENT DOCUMENTS

| | | | | |
|---|---|---|---|---|
| 2013/0034609 | A1 | 2/2013 | Liu et al. | |
| 2013/0287661 | A1 | 10/2013 | Begag et al. | |
| 2015/0141533 | A1 * | 5/2015 | Joshi | B01J 13/0091 516/111 |
| 2019/0299191 | A1 | 10/2019 | Tran-Thi et al. | |

FOREIGN PATENT DOCUMENTS

| | | | | |
|---|---|---|---|---|
| CN | 103754886 | A | 4/2014 | |
| CN | 103816857 | A | 5/2014 | |
| CN | 107199023 | A | 9/2017 | |
| CN | 107 790 105 | A | 3/2018 | |
| CN | 108238602 | A | 7/2018 | |
| CN | 108993412 | A | 12/2018 | |
| CN | 110 354 812 | A | 10/2019 | |
| FR | 3 086 938 | A1 | 4/2020 | |
| WO | 2007/114991 | A | 10/2007 | |
| WO | WO-2015147441 | A1 * | 10/2015 | B01D 53/02 |
| WO | 2015/185434 | A1 | 12/2015 | |
| WO | 2019/161420 | A1 | 8/2019 | |
| WO | 2020/146901 | A1 | 7/2020 | |

OTHER PUBLICATIONS

Fan et al ("Flexible, amine-modified silica aerogel with enhanced carbon dioxide capture performance", J Porous Mater (2016) 23:131-137). (Year: 2016).*

Machine Translation of Chen et al (CN107790105) (Year: 2018).*

Machine Translation of Jang (WO-2015147441) (Year: 2015).*

Bora Yay et al.; "A Review on Silica Aerogels for CO2 Capture Applications"; Pamukkale Univ Muh Bilim Derg, 25 (7), 907-913, 2019.

International Search Report and Written Opinion for PCT/AU20210/50878 (Sep. 27, 2021).

International Preliminary Report on Patentability for PCT/AU20210/50878 (Jun. 22, 2022).

Extended European Search Report issued in the corresponding European Application No. 21854979.8, Mar. 12, 2024.

* cited by examiner

| Cycle Dry@740ppm | CO2 wt% |
| --- | --- |
| 1 | 3.1 |
| 2 | 3.2 |
| 3 | 3.2 |
| 4 | 3.2 |
| 5 | 3.3 |
| Zeolite 13X | 1.7 |

| Run# Wet@740ppm | CO2 wt% |
|---|---|
| 6 | 3.0 |
| 7 | 2.7 |
| 8 | 2.5 |
| 9 | 2.5 |
| 10 | 2.4 |
| Zeolite 13X | 1.3 |

MICROPOROUS AEROGEL

This application is a National Stage Application of PCT/AU2021/050878, filed Aug. 10, 2021, which claims the benefit of priority to Application No. 2020902820, filed Aug. 10, 2020 in Australia, which applications are incorporated herein by reference. To the extent appropriate, a claim of priority is made to each of the above disclosed applications.

FIELD

The present disclosure generally relates to a microporous aerogel, processes for preparing a microporous aerogel, and applications for the microporous aerogel. The present disclosure also generally relates to an apparatus for capturing carbon dioxide from a gaseous stream or from the atmosphere, the apparatus comprising a microporous aerogel for selectively adsorbing and desorbing the carbon dioxide.

BACKGROUND

Various approaches have been used for $CO_2$ capture including the use of liquid and solid-based sorbents. Liquids that are employed typically involve alkaline solutions, which chemically react with the $CO_2$. However, the rate of uptake and energy requirements to regenerate the materials are challenging. In addition, there are issues with corrosion and evaporation caused by highly alkaline liquids. The use of solid sorbets in $CO_2$ capture and sequestration has received increased interest due to their good sorption capacity. There are a number of emerging solid materials that can be used including amine-functionalized silica, oxides, zeolites, carbon, polymers and, metal organic frameworks (MOFs). Whilst these materials offer lower regeneration energies the cost of synthesis can be high and some of these materials require the use of expensive chemicals, toxic solvents, have multistep operations (extractions, filtration, washing, and drying), are thermally unstable and susceptible to chemical degradation.

Consequently, there is a need to provide alternative or improved aerogels and processes for preparing alternative or improved aerogels.

SUMMARY

The present disclosure provides an alternate microporous aerogel, in particular, a silica-based aerogel for carbon dioxide capture, a process for preparing the silica-based aerogel, an adsorption apparatus incorporating the silica-based aerogel, and an associated adsorption and desorption method. The present inventors have undertaken research and development into processes for capturing carbon dioxide ($CO_2$) from gaseous streams using silica-based aerogels. The silica-based aerogel composition can be tailored to provide control and selectivity over the $CO_2$ absorption efficiency. In particular, the silica-based aerogels can capture $CO_2$ from a low $CO_2$ concentration gaseous stream by absorbing $CO_2$ within the aerogel, thereby removing it from the gaseous stream. The absorbed $CO_2$ can then be collected from the silica-based aerogel, and the regenerated silica-based aerogel can be reused to absorb more $CO_2$ (e.g. recycled, continuously cycled). The present disclosure described herein can also be scalable for industrial application, and may find use particularly in direct air capture of $CO_2$. The present disclosure described herein using a selection of silica-based aerogels can combine one or more of the following advantageous properties: microporosity, hydrophobicity, $CO_2$ selectivity, ambient $CO_2$ conditions for effective capture, heat of adsorption of carbon dioxide, and/or the ability for regeneration.

In one aspect there is provided a silica-based aerogel for carbon dioxide capture, wherein the microporous aerogel comprises a plurality of pores and at least 50% of the pores have a diameter of less than about 2 nm. The aerogel may adsorb $CO_2$ from air in environments with a $CO_2$ concentration of less than about 10 vol. %. The aerogel may adsorb $CO_2$ from air in enclosed or indoor environments with a $CO_2$ concentration of less than about 2 vol. % (DACi). The aerogel may adsorb $CO_2$ from air in environments with a $CO_2$ concentration of about 0.04 vol. %, wherein the environment is direct air capture (DAC).

In an embodiment or example, the $CO_2$ adsorption of the aerogel may be at least 0.47 mmol/g.

In some embodiments or example the microporous aerogel may comprise or consist of a reaction product of at least one amino substituted silane, at least one silicate, and optionally at least one alkyl substituted silane.

In an embodiment or example, the density of the aerogel may be about 0.02 $g/cm^3$ to about 0.6 $g/cm^3$. In an embodiment or example, the aerogel may have a surface area between about 0.1 and 500 $m^2/g$. In an embodiment or example, the aerogel may have a pore size between about 0.1 to about 2 nm.

In some embodiments or example, the aerogel may be in the form of particles, powders, beads, granules, sheets/layers, cast blocks, cylinders, discs, porous membranes or monoliths. The aerogel may comprise a plurality of particles, powders, pellets, beads, granules, coatings, or sheets/layers.

In some embodiments or examples, the aerogel may be a self-supporting aerogel. In another embodiment or example, the aerogel may be applied as a coating composition or film on a substrate.

In an embodiment or example, the reaction product may be prepared via a one-pot synthesis.

In another embodiment or example, the aerogel may be in the form of a composite, wherein the composite may comprise or consist of the aerogel, one or more additives, optionally a lubricant, and optionally a solvent. The one or more additives may be selected from a binder, optionally a metal organic framework (MOF), and a nanoparticle. The additive may be in an amount of about 5 to about 35 wt. % based on the total weight of the aerogel. In some embodiments or examples, the composite may be self-supporting in the form of a pellet, bead, sheet or granule. In other embodiment, the composite may be applied as a coating composition, paste or film on a substrate.

In another aspect there is provided an aerogel composite consisting of: (i) a microporous aerogel comprising a reaction product of an amino substituted silane, a silicate, and optionally an alkyl substituted silane according to any one of the embodiments or examples described herein, or combinations thereof; (ii) one or more additives, wherein the additive has a % loading of about 5 to about 35 wt. %; (iii) optionally a lubricant; and optionally a solvent. The one or more additives may be selected from a binder, optionally a metal organic framework (MOF), and a nanoparticle. The binder may be selected from cellulose-based polymers, silane-based polymers, cellulose-siloxane-based polymers, polyglycol-based polymers, polyvinyl pyrrolidone, polyvinyl alcohol, polyethylene imine, bentonite, graphite, or combinations thereof.

In another aspect there is provided a process for preparing a silica-based microporous aerogel for carbon dioxide, wherein the microporous aerogel comprises a plurality of pores and at least 50% of the pores have a diameter of less than about 2 nm, the process comprising: (i)(a) mixing an aqueous solution comprising at least one amino substituted silane, at least one silicate, and optionally at least one alkyl substituted silane, optionally a buffer, optionally one or more additives, and a solvent system, to form a wet-gel matrix; and (ii) drying the wet-gel matrix to provide a dried silica-based aerogel, with the proviso that drying the wet-gel matrix does not involve supercritical $CO_2$.

In an embodiment or example, the process may be a sol gel process and step (ii) comprises: (a1) optionally heating the wet gel matrix to obtain a gel; and (a2) drying the gel by solvent evaporation and/or heat treatment to provide a dried silica-based aerogel.

In another embodiment or example, step (ii) may further comprise: (b1) wherein the wet gel matrix may be applied to a substrate to form a wet-gel film coating the substrate; and (b2) drying the wet-gel film by solvent evaporation and/or heat treatment to provide a dried silica-based coated substrate.

In another embodiment or example, the process further may comprise or consist of preparing an aerogel composite by: (c1) pressing a mixture consisting of an aerogel according to any one of the embodiments or examples as described herein, or a combination thereof, one or more additives, optionally a lubricant, into a pellet, wherein the additive has a % loading of about 5 to about 35 wt. %; or (c2) liquid extrusion of a mixture consisting of an aerogel according to any one of the embodiments or examples as described herein, or a combination thereof, one or more additives, optionally a lubricant, and optionally a solvent, to provide a viscous paste, wherein the additive has a % loading of about 5 to about 35 wt. %.

The amino substituted silane may be of Formula 1 $R^1Si(OR_2)_n$-L-$NH_2$ as defined in any one of the embodiments or examples described herein.

The alkyl substituted silane may be of Formula 2 $R^5{}_mSi(OR^6)_n$ as defined in any one of the embodiments or examples described herein.

The silicate may be of Formula 3 $Si(OR^7)_4$ as defined according to any one of the embodiments or examples described herein.

In some embodiments or examples, the solvent may be water, a non-aqueous solvent, or a combination thereof.

In an embodiment or example, the process may further comprises step (iii) an activation step.

In another aspect there is provided a silica-based microporous aerogel for carbon dioxide ($CO_2$), wherein the microporous aerogel comprises a plurality of pores and at least 50% of the pores have a diameter of less than about 2 nm, prepared by the process according to any one or more embodiments or examples described herein.

In another aspect there is provided a silica-based microporous aerogel for carbon dioxide ($CO_2$) capture, wherein the microporous aerogel comprises a plurality of pores and at least 50% of the pores have a diameter of less than about 2 nm, comprising a reaction product according to any one or more embodiments or examples described herein, and prepared by the process according to any one or more embodiments or examples described herein.

In another aspect there is provided a process for capturing carbon dioxide ($CO_2$) from a gaseous stream or atmosphere containing $CO_2$ comprising: contacting the gaseous stream or atmosphere with a silica-based aerogel for capturing at least some $CO_2$ from the gaseous stream or atmosphere, wherein the silica-based aerogel is according to any one of the embodiments or examples described herein or is a silica-based aerogel prepared by the process according to any one of the embodiments or examples described herein.

In an embodiment, the gaseous stream or atmosphere may have a $CO_2$ concentration of less than about 150,000 ppm. The gaseous stream or atmosphere may have a $CO_2$ concentration in the range of between about 3,000 ppm and 150,000 ppm, wherein the process may be direct air capture in external power plants (DACex). The gaseous stream or atmosphere may have a $CO_2$ concentration of less than about 40,000 ppm. The gaseous stream or atmosphere may have a $CO_2$ concentration of less than about 20,000 ppm. The gaseous stream or atmosphere may have a $CO_2$ concentration of less than about 10,000 ppm. The gaseous stream or atmosphere may have a $CO_2$ concentration of less than about 7.000 ppm. The gaseous stream or atmosphere may have a $CO_2$ concentration of less than about 5,000 ppm. The gaseous stream or atmosphere may have a $CO_2$ concentration in the range of between about 4,000 ppm and 5,000 ppm, wherein the process may be direct air capture of exhaled breath in masks or personal protective equipment (DACp). The gaseous stream or atmosphere may have a $CO_2$ concentration of less than about 1,000 ppm. The gaseous stream or atmosphere may be ambient air. The gaseous stream or atmosphere may be less than about 500 ppm, wherein the process may be direct air capture (DAC). The present disclosure is suitable for use in capturing $CO_2$ in the atmosphere, where the concentration of $CO_2$ is at atmospheric levels (DAC) or where higher concentrations might be present in enclosed surroundings (DACi).

In some embodiments or examples, contacting the gaseous stream or atmosphere with the aerogel may comprise passing the gaseous stream or atmosphere through a bed comprising the aerogel.

In some embodiments or examples, at least about 50% to about 99% of $CO_2$ may be removed from the gaseous stream or atmosphere. Preferably at least about 90% of $CO_2$ may be removed from the gaseous stream.

In some embodiments or examples, the process may further comprise a regeneration recovery process to desorb the absorbed $CO_2$ from the silica-based aerogel. The regeneration recovery process may comprise heating the silica-based aerogel to a temperature range of between about 60° C. and about 140° C. to desorb the absorbed $CO_2$ from the silica-based aerogel, by reducing pressure, by flow of a gas with low $CO_2$, or a combination thereof.

In another aspect there is provided an adsorption apparatus for capturing carbon dioxide ($CO_2$) from a gaseous stream or atmosphere containing $CO_2$ comprising: a chamber enclosing at least one silica-based aerogel, as defined according to any one of the embodiments or examples described herein and/or prepared according to any one of the embodiments or examples described herein, the chamber comprising an inlet through which gaseous stream can flow to the silica-based aerogel and an outlet through which the effluent gaseous stream can flow out from the silica-based aerogel.

In some embodiments or examples, the apparatus may comprise two or more chambers enclosing at least one silica-based aerogel connected in parallel to the gaseous stream. The apparatus may comprise at least three chambers enclosing at least one silica-based aerogel in each chamber, wherein each chamber may be connected in parallel to the gaseous stream. The silica-based aerogel enclosed within the at least three chambers may be operated in different sections of the adsorption and regeneration cycle to produce a continuous flow of the effluent gaseous stream.

In some embodiments or examples, the effluent gaseous stream from the outlet may flow to a variety of secondary processes.

BRIEF DESCRIPTION OF THE DRAWINGS

Preferred embodiments of the present disclosure will be further described and illustrated, by way of example only, with reference to the accompanying drawings in which.

DETAILED DESCRIPTION

Figure 1A:
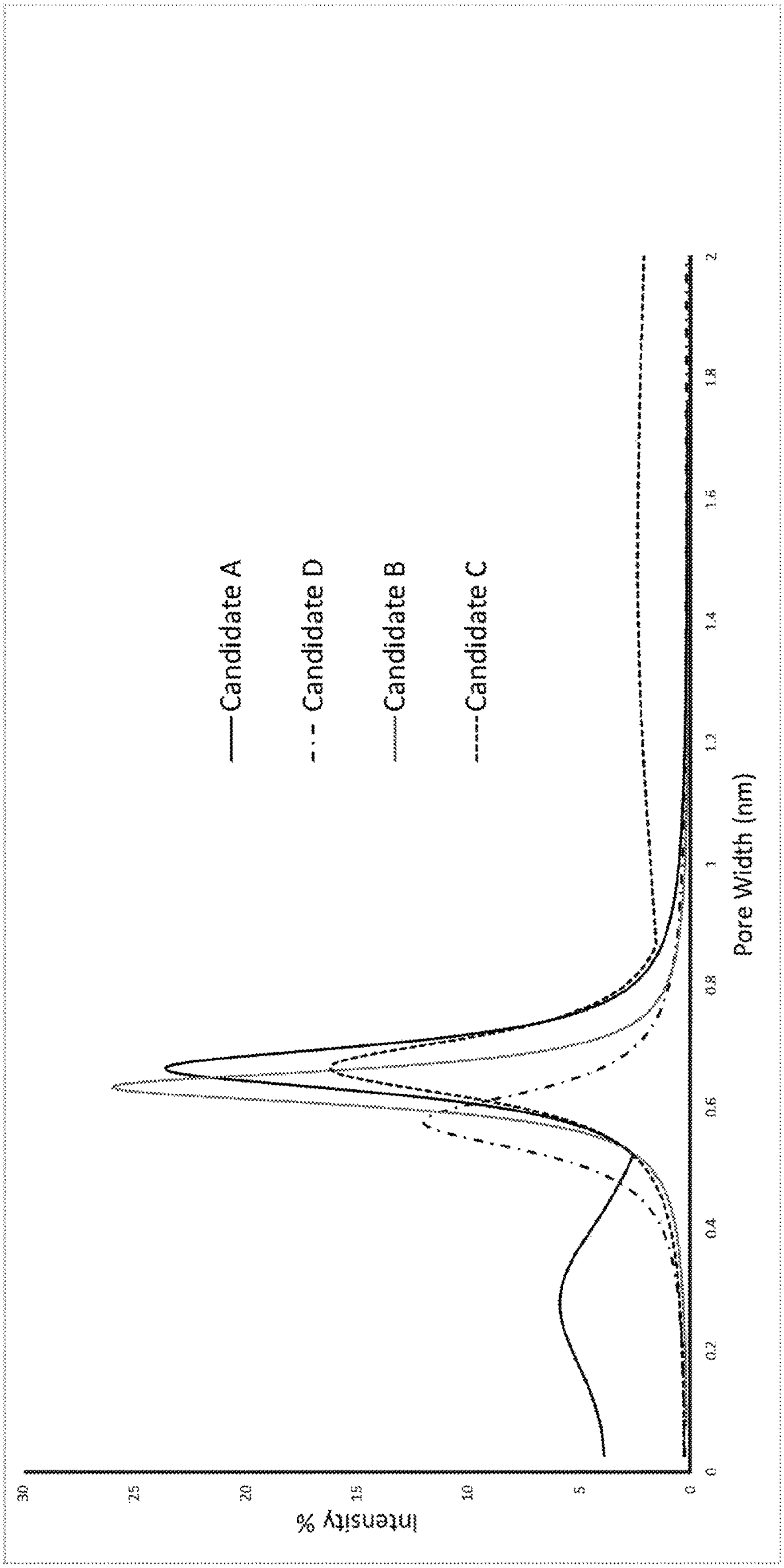
FIG. 1 shows (a) a graph showing the pore size distribution of Candidates A, B, C, and D determined using PALS; (b) a graph showing pore size distribution of J, P, M and L determined using $N_2$ gas; (c) a graph showing $CO_2$ uptake of select silica-based aerogels at various pressure as a function of density; and (d) a graph showing $CO_2$ uptake of select silica-based aerogels at various pressure as a function of density.

The present disclosure describes the following various non-limiting embodiments, which relates to investigations undertaken to identify processes for capturing carbon dioxide ($CO_2$) from gaseous streams (e.g. atmosphere) using silica-based aerogels. It was found that silica-based aerogels could be used to absorb $CO_2$ from low $CO_2$ concentration gaseous streams. The silica-based aerogels comprise a reaction product of at least one amino substituted silane and at least one alkyl substituted silane which can absorb and retain $CO_2$. The captured $CO_2$ can be removed from the silica-based aerogel, and the regenerated silica-based aerogels can be reused as an adsorbent material to capture $CO_2$ from low $CO_2$ concentration environments.

General Definitions and Terms

In the following description, reference is made to the accompanying drawings which form a part hereof, and which is shown, by way of illustration, several embodiments. It is understood that other embodiments may be utilized and structural changes may be made without departing from the scope of the present disclosure.

With regards to the definitions provided herein, unless stated otherwise, or implicit from context, the defined terms and phrases include the provided meanings. Unless explicitly stated otherwise, or apparent from context, the terms and phrases below do not exclude the meaning that the term or phrase has acquired by a person skilled in the relevant art. The definitions are provided to aid in describing particular embodiments, and are not intended to limit the claimed invention, because the scope of the invention is limited only by the claims. Furthermore, unless otherwise required by context, singular terms shall include pluralities and plural terms shall include the singular.

All publications discussed and/or referenced herein are incorporated herein in their entirety.

Any discussion of documents, acts, materials, devices, articles or the like which has been included in the present specification is solely for the purpose of providing a context for the present disclosure. It is not to be taken as an admission that any or all of these matters form part of the prior art base or were common general knowledge in the field relevant to the present disclosure as it existed before the priority date of each claim of this application.

Throughout this disclosure, unless specifically stated otherwise or the context requires otherwise, reference to a single step, composition of matter, group of steps or group of compositions of matter shall be taken to encompass one and a plurality (i.e., one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Those skilled in the art will appreciate that the disclosure herein is susceptible to variations and modifications other than those specifically described. It is to be understood that the disclosure includes all such variations and modifications. The disclosure also includes all of the examples, steps, features, methods, compositions, coatings, processes, and coated substrates, referred to or indicated in this specification, individually or collectively, and any and all combinations or any two or more of said steps or features.

The term "and/or", e.g., "X and/or Y" shall be understood to mean either "X and Y" or "X or Y" and shall be taken to provide explicit support for both meanings or for either meaning.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

As used herein, the term "about", unless stated to the contrary, typically refers to +/−10%, for example +/−5%, of the designated value.

It is to be appreciated that certain features that are, for clarity, described herein in the context of separate embodiments, may also be provided in combination in a single embodiment. Conversely, various features that are, for brevity, described in the context of a single embodiment, may also be provided separately or in any sub-combination.

Throughout the present specification, various aspects and components of the invention can be presented in a range format. The range format is included for convenience and should not be interpreted as an inflexible limitation on the scope of the invention. Accordingly, the description of a range should be considered to have specifically disclosed all the possible sub-ranges as well as individual numerical values within that range, unless specifically indicated. For example, description of a range such as from 1 to 5 should be considered to have specifically disclosed sub-ranges such as from 1 to 3, from 1 to 4, from 1 to 5, from 2 to 4, from 2 to 5, from 3 to 5 etc., as well as individual and partial numbers within the recited range, for example, 1, 2, 3, 4, 5, 5.5 and 6, unless where integers are required or implicit from context. This applies regardless of the breadth of the disclosed range. Where specific values are required, these will be indicated in the specification.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Throughout this specification, the term "consisting essentially of" is intended to exclude elements which would materially affect the properties of the claimed composition.

The terms "comprising", "comprise" and "comprises" herein are intended to be optionally substitutable with the terms "consisting essentially of", "consist essentially of", "consists essentially of", "consisting of", "consist of" and "consists of", respectively, in every instance.

Herein the term "about" encompasses a 10% tolerance in any value or values connected to the term.

The reference to "substantially free" generally refers to the absence of that compound or component in the composition other than any trace amounts or impurities that may be present, for example this may be an amount by weight % in the total composition of less than about 1%, 0.1%, 0.01%, 0.001%, or 0.0001%. The compositions as described herein may also include, for example, impurities in an amount by weight % in the total composition of less than about 5%, 4%, 3%, 2%, 1%, 0.5%, 0.1%, 0.01%, 0.001%, or 0.0001%. For example, this may be an amount by vol. % in the total gaseous stream of less than about 0.001%, or 0.0001%. For example, the gaseous streams as described herein may also include, for example, impurities in an amount by vol. % in the total gaseous stream of less than about 0.01%, 0.001%, or 0.0001%. An example of such an impurity is the amount of methane ($CH_4$) that may be present in air, being present in an amount of less than 0.0005 vol. %.

Herein "weight %" may be abbreviated to as "wt. %".

The term "alkyl" includes straight-chained, branched, and cyclic alkyl groups and includes both unsubstituted and substituted alkyl groups. In one example, the alkyl groups are straight-chained and/or branched, and optionally interrupted by 1-3 cyclic alkyl groups. Unless otherwise indicated, the alkyl groups typically contain from 1 to 20 carbon atoms. The alkyl groups may for example contain carbon atoms from 1 to 12, 1 to 10, 1 to 8, 1 to 6 or 1 to 4. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cyclo heptyl, adamantyl, and norbornyl, and the like. Unless otherwise noted, alkyl groups may be mono- or polyvalent. The alkyl groups may be optionally substituted and/or optionally interrupted by one or more heteroatoms. The alkyl groups may be referred to as "-alkyl-" in relation to use as a bivalent or polyvalent linking group.

The term "alkylsilyl" represents an alkyl group that is linked to the rest of the molecule through the silicon atom, which may be substituted with up to three independently selected alkyl groups in which each alkyl group is as defined supra.

Silica-Based Aerogels

The present disclosure relates to a silica-based microporous aerogel that can be provided in a wide range of morphologies. Illustrative examples of suitable morphologies may include particles, powders, pellets, beads, coatings, sheets/layers, cast blocks, cylinders, discs, porous membranes and monoliths. For example, the silica-based aerogel may be provided as a plurality of pellets. For example, the silica-based aerogel may be provided as a film/coating layer, a gel layer where the gaseous stream may be flowed thereon or through the layer. Such layers may be a provided as a rolled sheet or a 3D substrate. Alternatively, the silica-based aerogel layer may also be provided as a monolith comprising a plurality of porous channels, wherein the gaseous stream flows through. Other layer or coating morphologies and geometries are also applicable.

In one embodiment or example, the silica-based aerogel may comprise a plurality of particles. The term "particle" (also referred to as "particulate") refers to the form of discrete solid units. The units may take the form of flakes, fibres, agglomerates, granules, pellets, powders, beads, spheres, pulverized materials or the like, as well as combinations thereof. The particles may have any desired shape including, but not limited to, cubic, rod like, polyhedral, spherical or semi-spherical, rounded or semi-rounded, angular, irregular, and so forth. The particle morphology can be determined by any suitable means such as optical microscopy.

In some embodiments or examples, the aerogel may be a plurality of particles, powders, pellets, beads, granules, coatings, or sheets/layers. In some embodiments or examples, the particles, powders, pellets, beads, granules, coatings, or sheets/layers may be a composition which further comprises optional additives selected from the group comprising metal-organic frameworks, nanoparticles, nanomagnetic particles, other porous materials, binders, buffers or combinations thereof. For example, the silica-based aerogel may be provided as a plurality of particles, powders, pellets. In one example, the silica-based aerogel may be provided as a plurality of pellets. In an embodiment, the silica-based aerogel together with at least one additive (e.g. binder), and optionally a lubricant, may be pressed or extruded together to form shapes/pellets to form a composite. The inventors have found that selection of binder can be a determining factor on whether the aerogel composition can be pressed or extruded, and even further have found that the amount of binder added to the composition will depend on the final application or use. The aerogel composite may be of any suitable size and/or shape. In some embodiments or examples, the silica-based aerogel composite may have an average pellet size.

The metal organic framework may be selected from the group comprising TIF-SIX-3-Ni, TIF-SIX-3-Ni, CuBTC, Mg-MOF-74, Mg-MOF-74-ED, Nb-OFFIVE, or combinations thereof. The nanoparticles may be selected from the group comprising carbon-based nanoparticles (e.g. fullerenes and carbon nanotubes), metal based nanoparticles (e.g. alkali and noble metals), ceramic nanoparticles, polymeric nanoparticles, lipid-based nanoparticles, quantum dots, silica nanoparticles, graphene, or combinations thereof. The nano-magnetic particles may be selected from the group comprising iron oxides, ferrite, or combinations thereof. The binders may be selected from the group comprising cellulose-based polymers, silane-based polymers, cellulose-siloxane-based polymers, polyglycol-based polymers, epoxy-based polymers, colloidal silica, polyvinyl pyrrolidone, polyvinyl alcohol, polyethylene imine, or combinations thereof. The binders may be selected from commercial binders. It will be appreciated that other components may form part of the commercial binder. In an example, the binders may include other components such as a lubricant. A lubricating agent may be used as required to adjust the viscosity of the aerogel formulation to, for example, an extrudable material. For example, the other components may include dicalcium phosphate, silicon dioxide, dextrose monohydrate and magnesium stearate. The buffers may be selected from the group comprising $(NH_4)_2CO_3$, $NH_4CH_3CO_2$, $NH_3$, $NH_4HCO_3$, carbon dioxide.

The aerogel particles may be of any suitable size and/or shape and/or morphology. In some embodiments or examples, the silica-based aerogel particles may have an average particle size. For spherical silica-based aerogel particles, the particle size is the diameter of the particles. For non-spherical silica-based aerogel particles, the particle size is the longest cross-section dimension of the particles. In some embodiments or examples, the silica-based aerogel particles may have an average particle size in a range from about 10 nm to about 2000 nm, for example from about 10 nm to about 1000 nm. The silica-based aerogel particles may have an average particle size of at least about 10, 20, 50, 100, 200, 300, 400, 500, 700, 1000, 1500, or 2000 nm. In other embodiments or examples, the silica-based aerogel particles may have an average particle size of less than about 2000, 1500, 1000, 700, 500, 400, 300, 200, 100, 50, 20, or 10 nm. Combinations of these particle size values to form various ranges are also possible, for example the silica-based aerogel particles may have an average particle size of between about 30 nm to about 70 nm, about 30 nm to about 80 nm, for example about 20 nm to about 100 nm. The average particle size can be determined by any means known to the skilled person, such as scanning electron microscopy, dynamic light scattering, optical microscopy or size exclusion methods (such as graduated sieves). In an example, the method of measuring the average particle size may be scanning electron microscopy. The silica-based aerogel particles may have a controlled average particle size and can maintain their morphology in a range of different environments and shear conditions, for example while in contact with a gaseous stream and/or moist or dry environments.

In another embodiment, the silica-based aerogel may be self-supporting. The term "self-supporting" as used herein refers to the ability of the silica-based aerogel to maintain its morphology in the absence of a support material (e.g. scaffold). For example, the silica-based aerogel may comprise a plurality of particles, wherein the particles maintain their morphology in the absence of a scaffold support. The self-supported nature of the silica-based aerogel may provide certain advantages, for example allows particles of aerogel to be contacted with the gaseous stream using a fluidized bed reactor. Accordingly, in one embodiment or example, the silica-based aerogel does not comprise a separate support structure, such as a separate porous support structure. This does not preclude from the aerogel itself being porous in nature. Thus it will be understood that, where the silica-based aerogel is "self-supporting", there is no support material (e.g. scaffold) exogenous to the aerogel.

In yet another embodiment, the silica-based aerogel may be provided as layer within a column, wherein the gaseous stream may be flowed through the column and passes through the silica-based aerogel layer. The layer may not be limited to any particular aerogel morphology. In one example, a suitable column may be packed with a plurality of silica-based aerogel particles to form a packed-bed with sufficient interstitial space between adjacent particles to allow a flow of gas therethrough. Alternatively, the silica-based aerogel may be provided in flow with the gaseous stream (e.g. a fluidised bed reactor).

In yet another embodiment, the silica-based aerogel may be provided as a coating composition on a substrate. In some embodiments or examples, the substrate may be planar, for example a planar sheet. In a particular example, the substrate may be a flexible sheet. A planar substrate provides a two sided element onto which the silica-based aerogel coating composition can be applied. Each substrate may be coated with the silica-based aerogel coating composition on two opposing sides. The planar substrate can have any configuration. In some embodiments or examples, the planar substrate may comprise a flat solid surface. In other embodiments or examples, the planar substrate may comprise one or more apertures, designed to assist gas flow through and around the substrate. In a particular embodiment or example, the substrate may comprise a mesh, for example, micro wire mesh. The use of a mesh provides a multitude of apertures, (e.g. micro size apertures), thereby providing a high surface area on which the silica-based aerogel coating composition can be applied, whilst also providing a suitable flow path having a reasonably low pressure drop across the substrate (relative to the size and configuration of the mesh) compared to other configurations, for example, packed beds.

The present disclosure provides a silica-based aerogel that is a microporous aerogel. The aerogel may preferably have low mesoporosity, whilst maintaining an excellent microporosity (pores diameter $<2$ nm). In some embodiments, the microporous aerogel may have a plurality of pores and at least 50% of the pores have a diameter of less than about 2 nm. Preferably, at least 60% of the pores have a diameter of less than about 2 nm. More preferably, at least 70% of the pores have a diameter of less than about 2 nm. Even more preferably, at least 80% of the pores have a diameter of less than about 2 nm. In some embodiments or examples, the porosity of the silica-based aerogel may be less than about 2 nm. The pore size may be less than about 1.8 nm. It will be understood that a microporous aerogel differs from a mesoporous aerogel and a macroporous aerogel. A mesoporous aerogel contains pores with diameters between 2 and 50 nm and a macroporous aerogel contains pores larger than 50 nm in diameter. In some embodiments or examples, the silica-based aerogel may have a pore size in a range of from about 0.1 nm to about 2 nm, for example from about 0.2 nm to about 2 nm. The silica-based aerogel may have a pore size (nm) of at least about 0.1, 0.2, 0.5, 1, 1.2, 1.4, 1.6, 1.8 or 2. In other embodiments or examples, the silica-based aerogel may have a pore size (nm) of less than about 2, 1.8, 1.6, 1.4, 1.2, 1, 0.5, 0.2 or 0.1. Combinations of these pore size values to form various ranges are also possible, for example the silica-based aerogel may have a pore size of between about 0.1 nm to about 1.8 nm, about 0.5 nm to about 2 nm, for example about 1 nm to about 2 nm. The pore size can be determined by any means known to the skilled person, such as gas adsorption experiments, mercury intrusion, and capillary flow porometry. In an example, the method of measuring the pore size may be using Positron Annihilation Lifetime Spectroscopy (PALS). It has been found that microporous aerogels with pores of 2 nm and less are produced during the one-pot synthesis described herein. It has also been found that aerogels with pores of 2 nm and less are most suitable for carbon dioxide capture from the atmosphere (DAC) as well as carbon dioxide in enclosed environments (DACi).

In some embodiments or examples, the silica-based aerogel may have a surface area in a range of from about 0.1 $m^2/g$ to about 500 $m^2/g$, for example from about 2 $m^2/g$ to about 200 $m^2/g$. The silica-based aerogel may have a surface area ($m^2/g$) of at least about 0.1, 0.2, 0.5, 1, 2, 3, 4, 5, 10, 20, 50, 100, 200 or 500. In other embodiments or examples, the silica-based aerogel may have a surface area ($m^2/g$) of less than about 500, 200, 100, 50, 20, 10, 5, 4, 3, 2, 1, 0.5, 0.2 or 0.1. Combinations of these surface area values to form various ranges are also possible, for example the silica-based aerogel may have a surface area of between about 0.1 $m^2/g$ to about 500 $m^2/g$, about 2 $m^2/g$ to about 200 $m^2/g$, for example about 3 $m^2/g$ to about 150 $m^2/g$.

In some embodiments or examples, the density of the aerogel may be in a range of from about 0.02 $g/cm^3$ to about 0.6 $g/cm^3$, for example from about 0.05 $g/cm^3$ to about 0.5 $g/cm^3$. The density of the silica-based aerogel may be at least about 0.02, 0.05, 0.1, 0.15, 0.2, 0.25, 0.3, 0.35, 0.4, 0.45, 0.5, 0.55 or 0.6 $g/cm^3$. In other embodiments or examples, the density of the silica-based aerogel may be less than about 0.6, 0.55, 0.5, 0.45, 0.4, 0.35, 0.3, 0.25, 0.2, 0.15, 0.1, 0.05 or 0.02 $g/cm^3$. Combinations of these density values to form various ranges are also possible, for example the silica-based aerogel may have a density of between about 0.02 g/$cm^3$ to about 0.6 g/$cm^3$, about 0.05 g/$cm^3$ to about 0.5 g/$cm^3$, about 0.15 $m^2$/g to about 0.4 g/$cm^3$, for example, about 0.2 $m^2$/g to about 0.6 $m^2$/g, or about 0.3 $m^2$/g to about 0.6 $m^2$/g. Higher density aerogels would be most suited for application where weight is a consideration. Formulations with high density can be used for $CO_2$ adsorption-desorption devices that may fit into restricted spaces or environments. These types of devices can be typically used in space, aerospace, underwater vehicles or platforms. For example in aerospace or space applications where aerogels can be used to capture $CO_2$ from atmospheric air. Formulations with low density may be suitable when space is not an issue. For example, DAC units to be placed in greenhouses or power plants involved in the conversion of $CO_2$ to methane.

In some embodiments or examples, the content of amino group from the amino alkyl silane unit may be effective for providing free amine groups for facilitating carbon dioxide ($CO_2$) capture, wherein the free amine content may be less than about 60 mol %. In some embodiments or examples, the content of amino alkyl silane group may be in a range of from about 10 mol % to about 60 mol %, for example from about 20 mol % to about 40 mol %. The free amine content may be at least about 10, 15, 20, 25, 30, 35, 40, 45, 50, 55 or 60 mol %. In other embodiments or examples, the free amine content may be less than about 60, 55, 50, 45, 40, 35, 30, 25, 20, 15 or 10 mol %. Combinations of these free amine content values to form various ranges are also possible, for example the free amine content may have a mol % value of between about 10 mol % to about 60 mol %, about 15 mol % to about 50 mol %, for example about 20 mol % to about 40 mol %. While the amino group from the amino alkyl silane unit is effective for providing free amine groups for facilitating carbon dioxide ($CO_2$) capture, the methyl groups from the amino alkyl silane unit provide the required hydrophobicity. In other words, one of the advantages of the present disclosure is that the silica-based aerogels can operate in various relative humidity environments due to the hydrophobicity which enables the aerogels when adsorbing $CO_2$ from air not to compete for the adsorption of water. Unlike Zeolite 13X or TIF-SIX, the inventors have surprisingly found that the microporous aerogels, as described herein, do not provide good water adsorption properties, rendering them far superior for selective adsorption of $CO_2$.

In some embodiments or examples, the reaction product of the at least one amino substituted silane, at least one silicate, and optionally at least one alkyl substituted silane to form the silica-based aerogel comprises a siloxane backbone with a plurality of pendant groups selected from amino alkyl groups and alkyl groups. It will be appreciated that due to the hydrophobic amino alkyl groups and the alkyl groups present in the siloxane backbone, and only three siloxane bonds available per silicon atom, the silica-based aerogels, as described herein, may be hydrophobic and may generally have a lower cross-linking density and higher deformability than those derived from the conventional tetraalkoxysilanes. These advantageous characteristics may provide greater potential for further engineering the fine structures of the silica-based aerogels for achieving low volume shrinkage by the drying process without the use of further solvent exchange and surface modification. In some embodiments or examples, the reaction product of the at least one amino substituted silane, at least one silicate, and optionally at least one alkyl substituted silane to form the silica-based aerogel may undergo hydrolysis and condensation reactions to form polyalkylsiloxane network structures. These hydrolysis and condensation reactions may be responsible for the microstructures of the silica-based aerogel. In an embodiment or example, the reaction product may comprise a siloxane backbone with a plurality of pendant groups selected from amino alkyl groups and alkyl groups, wherein the molar ratio of pendant groups to siloxane backbone on a molecular weight basis may be at least 60%. The molar ratio of pendant groups to siloxane backbone on a molecular weight basis may be in a range of from about 60% to about 160%, for example from about 80% to about 140%. The molar ratio of pendant groups to siloxane backbone on a molecular weight basis may be at least about 60, 65, 70, 75, 80, 85, 90, 95, 100, 110, 120, 130, 140, 150 or 160%. In other embodiments or examples, molar ratio of pendant groups to siloxane backbone on a molecular weight basis may be less than about 160, 150, 140, 130, 120, 110, 100, 90, 95, 90, 85, 80, 75, 70, 65 or 60%. Combinations of these molar ratio values to form various ranges are also possible, for example the molar ratio of pendant groups to siloxane backbone on a molecular weight basis may have a % value of between about 60% to about 160%, about 65% to about 150%, for example about 70% to about 140%.

In an embodiment, the amino substituted silane may be according to Formula 1: $R^1Si(OR^2)_n$-L-$NH_2$, wherein: $R^1$ may be selected from $C_{1-6}$alkyl or is absent; $R^2$ may be a $C_{1-6}$alkyl; L is a —$C_{1-6}$alkyl- linker group between the silicon and nitrogen atoms; and n may be 2 or 3. The amino substituted silane may have a % loading of at least about 40 mol % based on the total weight of the aerogel formulation. The amino substituted silane may have a % loading of less than about 60 mol % based on the total weight of the aerogel formulation.

In an embodiment, the alkyl substituted silane may be according to Formula 2: $R^5_mSi(OR^6)_n$, wherein: $R^5$ and $R^6$ may each independently selected from $C_{1-6}$alkyl; and m may be 1 and n may be 3 or m and n may each be 2. The alkyl substituted silane may have a % loading of at least about 10 mol % based on the total weight of the aerogel formulation. The alkyl substituted silane may have a % loading of less than about 40 mol % based on the total weight of the aerogel formulation.

In an embodiment, the silicate may be according to Formula 3: $Si(OR^7)_4$, wherein: $R^7$ may be $C_{1-6}$alkyl. The silicate may have a % loading of at least about 20 mol % based on the total weight of the aerogel formulation. The silicate may have a % loading of less than about 40 mol % based on the total weight of the aerogel formulation.

The content of amino silane group may be effective for providing free amine groups for facilitating carbon dioxide ($CO_2$) capture, wherein the free amine content may be less than about 60 mol % based on the total weight of the aerogel formulation. In one embodiment or example, the amino substituted silane may be 3-aminopropyl (diethoxy) methyl silane having a % loading of between about 40 and about 60 mol % based on the total aerogel formulation.

In an embodiment or example, the aerogel may comprise or consist of a reaction product of at least one amino substituted silane, at least one silicate, and optionally at least one alkyl substituted silane.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 40 mol %, the alkyl substituted silane is triethoxymethylsilane with a % loading of about 40 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (triethoxy)silane with a % loading of about 40 mol %, the alkyl substituted silane is triethoxymethylsilane with a % loading of about 40 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 40 mol %, the alkyl substituted silane is triethoxymethylsilane with a % loading of about 20 mol %, and the silicate is tetraethyl orthosilicate with a % loading of about 40 mol %.

In an embodiment or example, the microporous aerogel may comprise or consist of a reaction product of an amino substituted silane, an alkyl substituted silane and a silicate, wherein, the amino substituted silane is 3-aminopropyl (triethoxy)silane with a % loading of about 40 mol %, the alkyl substituted silane is triethoxymethylsilane with a % loading of about 20 mol %, and the silicate is tetraethyl orthosilicate with a % loading of about 40 mol %.

In an embodiment or example, the microporous aerogel may comprise or consist of a reaction product of an amino substituted silane and an alkyl substituted silane, wherein, the amino substituted silane is 3-aminopropyl(diethoxy) methylsilane with a % loading of about 40 mol %, and the alkyl substituted silane is triethoxymethylsilane with a % loading of about 60 mol %.

In an embodiment or example, the microporous aerogel may comprise or consist of a reaction product of an amino substituted silane and an alkyl substituted silane, wherein, the amino substituted silane is 3-aminopropyl(triethoxy) silane with a % loading of about 40 mol %, and the alkyl substituted silane is triethoxymethylsilane with a % loading of about 60 mol %.

In an embodiment or example, the microporous aerogel may comprise or consist of a reaction product of an amino substituted silane, an alkyl substituted silane and a silicate, wherein, the amino substituted silane is 3-aminopropyl (triethoxy)silane with a % loading of about 60 mol %, the alkyl substituted silane is triethoxymethylsilane with a % loading of about 20 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 40 mol %, the alkyl substituted silane is triethoxy(ethyl)silane with a % loading of about 40 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (triethoxy)silane with a % loading of about 40 mol %, the alkyl substituted silane is triethoxy(ethyl)silane with a % loading of about 40 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 40 mol %, the alkyl substituted silane is dimethyldiethoxysilane with a % loading of about 40 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 40 mol %, the alkyl substituted silane is a mixture of triethoxymethylsilane with a % loading of about 20 mol % and dimethyldiethoxysilane with a % loading of about 20 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 60 mol %, the alkyl substituted silane is dimethyldiethoxysilane with a % loading of about 10 mol %, and the silicate is tetraethyl orthosilicate with a % loading of about 30 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 40 mol %, the alkyl substituted silane is dimethyldiethoxysilane with a % loading of about 30 mol %, and the silicate is tetraethyl orthosilicate with a % loading of about 30 mol %.

In an embodiment or example, the microporous aerogel may comprise or consist of a reaction product of an amino substituted silane, an alkyl substituted silane and a silicate, wherein, the amino substituted silane is 3-aminopropyl (triethoxy)silane with a % loading of about 40 mol %, the alkyl substituted silane is a mixture of triethoxymethylsilane with a % loading of about 20 mol % and dimethyldiethoxysilane with a % loading of about 20 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 40 mol %, the alkyl substituted silane is a mixture of triethoxymethylsilane with a % loading of about 20 mol % and triethoxy (ethyl)silane with a % loading of about 20 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 60 mol %, the alkyl substituted silane is triethoxymethylsilane with a % loading of about 20 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (triethoxy)silane with a % loading of about 60 mol %, the alkyl substituted silane is triethoxymethylsilane with a % loading of about 20 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 60 mol %, the alkyl substituted silane is a mixture of triethoxymethylsilane with a % loading of about 10 mol % and triethoxy (ethyl)silane with a % loading of about 10 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 50 mol %, the alkyl substituted silane is a mixture of triethoxymethylsilane with a % loading of about 15 mol % and triethoxy (ethyl)silane with a % loading of about 15 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 50 mol %, the alkyl substituted silane is triethoxymethylsilane with a % loading of about 25 mol %, and the silicate is tetraethyl orthosilicate with a % loading of about 25 mol %.

In an embodiment or example, the microporous aerogel may comprise or consist of a reaction product of an amino substituted silane and a silicate, wherein, the amino substituted silane is 3-aminopropyl(diethoxy)methylsilane with a % loading of about 60 mol %, and the silicate is tetraethyl orthosilicate with a % loading of about 40 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 60 mol %, the alkyl substituted silane is triethoxy(ethyl)silane with a % loading of about 20 mol %, and the silicate is tetraethyl orthosilicate with a % loading of about 20 mol %.

In an embodiment or example, the microporous aerogel may comprise or consist of a reaction product of an amino substituted silane, an alkyl substituted silane and a silicate, wherein, the amino substituted silane is 3-aminopropyl (diethoxy)methylsilane with a % loading of about 40 mol %, the alkyl substituted silane is triethoxymethylsilane with a % loading of about 40 mol % and triethoxy(ethyl)silane with a % loading of about 20 mol %.

Amino Substituted Silane

The $CO_2$ may be captured from the gaseous stream by being absorbed into a silica-based aerogel. For example, the $CO_2$ may be absorbed into the silica-based aerogel by a chemical or physical process. In some embodiments, the amino substituted silane may comprise functional groups capable of binding and $CO_2$. For example, owing to its porous nature, on contact with the silica-based aerogel, the low $CO_2$ concentration gas can pass through the interstitial pores within the silica-based aerogel and react and bind to the functional groups on the amino substituted silane. In some embodiments or examples, the amino substituted silane is capable of absorbing $CO_2$ when contacted with a low $CO_2$ concentration gaseous stream. Suitable amino substituted silanes that are capable of absorbing $CO_2$ include one or more of the amino substituted silane described herein. In some embodiments or examples, the amino substituted silane may absorb $CO_2$ by a chemical or physical process. In some embodiments or examples, the amino substituted silane comprises functional groups capable of binding to $CO_2$. For example, the amino substituted silane may comprise one or more amine groups, such as a primary amine ($-NH_2$). Such amine groups are $CO_2$-phillic and readily react and bind with $CO_2$. In some embodiments or examples, the amino substituted silane comprises one or more amine groups, such as for example an 3-aminopropyl (diethoxy) methyl silane.

In some embodiments or examples, the amino substituted silane may comprise between about 10 mol % to 50 mol % primary amine ($-NH_2$) groups (also referred to herein as "free amine content"). The mol % of primary amine ($-NH_2$) groups may be at least about 10, 15, 20, 25, 30, 35, 40, 45 or 50. In other embodiments or examples, the mol % of primary amine ($-NH_2$) groups may be less than about 50, 45, 40, 35, 30, 25, 20, 15 or 10. Combinations of these mol % values to form various ranges are also possible, for example the mol % of primary amine ($-NH_2$) groups may have a value of between about 10 mol % to about 50 mol %, about 15 mol % to about 45 mol %, for example about 20 mol % to about 40 mol %.

In some embodiments or examples, the amino substituted silane may comprise at least one or more aliphatic amine groups (e.g. an amine wherein no aromatic ring groups are directly bound to the nitrogen atom of the amine).

In some embodiments or examples, the amino substituted silane is according to Formula 1:

$$R^1_mSi(OR^2)_n\text{-}L\text{-}NH_2 \quad \text{Formula 1}$$

wherein:

$R^1$ may be $C_{1-6}$alkyl or absent;

$R^2$ may be $C_{1-6}$alkyl;

L is a $-C_{1-12}$alkyl- linker group between the silicon and nitrogen atoms; and n may be 2 or 3. It will be appreciated that n is 2 when $R^1$ is present, and when $R^1$ is absent, n is 3.

In some embodiments or examples, the amino substituted silane may comprise a $C_{1-6}$alkyl which may be provided by any alkyl as described above or herein having a 1 to 6 atom chain.

In some embodiments or examples, the amino substituted silane may comprise a $C_{1-4}$alkyl which may be provided by any alkyl as described above or herein having a 1 to 4 atom chain.

The alkyl groups of the amino substituted silane may comprise between 1 and 4 carbon atoms. The alkyl groups may be methyl, ethyl, propyl, n-butyl, t-butyl or other higher carbon alkyl groups. In some embodiments or examples, the amino substituted silane may be selected from the group comprising or consisting of 3-aminopropyl (diethoxy) methyl silane, 3-aminopropyl-triethoxysilane, 3-aminopropyl-trimethoxysilane, N-(2-aminoethyl)-3-aminopropyltriethoxysilane, or a combination thereof. For example, the amino substituted silane may be selected from the group comprising or consisting of 3-aminopropyl (diethoxy) methyl silane or 3-aminopropyl-triethoxysilane.

Alkyl Substituted Silane

The alkyl silane group is effective for enabling an element of hydrophobicity and microporosity. In other words, one of the advantages of the present disclosure is that the silica-based aerogels can operate in various relative humidity environments due to the hydrophobicity which enables the aerogels when adsorbing $CO_2$ from air not to compete for the adsorption of water. Furthermore, the silica-based aerogel may comprise an alkyl silane group which enables the microporosity of the silica-based aerogel to effectively create a more open structure with micro-sized pores which may increase the accessibility of $CO_2$ to the reactive functional groups on the amino substituted silane described above.

In some embodiments or examples, the alkyl substituted silane is according to Formula 2:

$R^5{}_mSi(OR^6)_n$ Formula 2 wherein:

$R^5$ and $R^6$ are each independently selected from $C_{1-6}$alkyl;

m may be 1 and n may be 3 or m and n may each be 2.

In some embodiments or examples, the alkyl substituted silane may comprise a $C_{1-6}$alkyl which may be provided by any alkyl as described above or herein having a 1 to 6 atom chain.

The alkyl groups of the alkyl substituted silane may comprise between 1 and 6 carbon atoms. The alkyl substituted silanes may also have additional functional groups. The alkyl groups may be methyl, ethyl, propyl, n-butyl, t-butyl or other higher carbon alkyl groups. The alkyl substituted silanes of the present disclosure may contain mono, di or tri alkyl groups and may be selected from the group consisting of methyltrimethoxysilane, methyltriethoxysilane, ethyltrimethoxysilane, ethyltriethoxysilane, propyltrimethoxysilane, propyltriethoxysilane, dimethyldimethoxysilane, dimethyldiethoxysilane, diethyldiethoxysilane, diethyldimethoxysilane, trimethylmethoxysilane, trimethylethoxysilane, triethylmethoxysilane, triethylethoxysilane, tripropyhuethoxysilane, tripropylethoxysilane, (3,3,3-trifluoropropyl)trimethoxysilane, (3,3,3-trifluoropropyl)triethoxysilane, and a combination thereof.

Silicate

The silicate may be included in the silica-based aerogel matrix and may produce complex structures with unique properties relevant to the resulting silica-based aerogel effective for $CO_2$ capture. The silicate is according to Formula 3:

$Si(OR^7)_4$ Formula 3 wherein:

$R^7$ is $C_{1-6}$alkyl.

In some embodiments or examples, the silicate may comprise a $C_{1-6}$alkyl which may be provided by any alkyl as described above or herein having a 1 to 6 atom chain.

The alkyl groups of the silicate may comprise between 1 and 6 carbon atoms. The alkyl groups may be methyl, ethyl, propyl, n-butyl, t-butyl or other higher carbon alkyl groups. The silicate of the present disclosure may be selected from a tetraalkoxy silane. For example, the silicate may be tetramethoxysilane, tetraethoxysilicate, or combinations thereof.

Process for Preparing a Silica-Based Aerogel

In some embodiments or examples, there is provided a process for preparing a microporous aerogel. In particular, the present disclosure provides a novel process for preparing a silica-based aerogel, as described herein, from the reaction product of at least one amino substituted silane, at least one silicate, and optionally at least one alkyl substituted silane. In some embodiments, the process for preparing a silica-based microporous aerogel, wherein the microporous aerogel comprises a plurality of pores and at least 50% of the pores have a diameter of less than about 2 nm, may comprise or consist of: (i)(a) mixing an aqueous solution comprising at least one amino substituted silane, at least one silicate, and optionally at least one alkyl substituted silane, optionally a buffer, optionally one or more additives, and a solvent system, to form a wet-gel matrix; and (ii) drying the wet-gel matrix to provide a dried silica-based aerogel, with the proviso that drying the wet-gel matrix does not involve supercritical $CO_2$. In some embodiments or examples, step (i) further comprises step (i)(b) rinsing the wet-gel matrix. Rinsing the wet-gel enables solvent exchange and the removal of by-products within the pores of the materials. One or more advantages of the present process according to at least some embodiments or examples as described herein is that the process is a scalable one pot synthesis with short reaction times (e.g. approx. 6 hours for some formulations compared to 48 hours or more) and gelation times (e.g. approx. 5 to 30 minutes) to prepare microporous aerogel capable of $CO_2$ capture. The synthesis and washing steps require an oven or water bath and rudimentary reaction vessels. No specialised gasses or pressure vessels are necessary for the described process, and the typical density of the preferred candidates may be in the range of 0.3 to 0.6 g/mL, allowing smaller volume of aerogel to be used in practical manifestations of a carbon capture apparatus. The financial advantages in both synthesis cost and equipment costs are greatly advantageous. This is somewhat unlike previous processes, e.g. U.S. Pat. No. 9,931,612 B2 (Aspen), where mesoporous aerogel synthesis involves lengthy, multi-step processes and supercritical drying. For example, Aspen describes aerogel synthesis involving at least a two-step sol gel process, and solvent removal using supercritical $CO_2$ extraction. For example, (i) preparing two separate sols at different temperature and times containing the precursors, step (ii) combining the two separate sols, (iii) allowing gelation to occur within 2 days, and (iv) supercritical drying using liquid $CO_2$.

In some embodiments or examples, the at least one amino substituted silane and at least one alkyl substituted silane may be hydrolysed in an acidic medium (e.g. an organic acid, such as hydrochloric acid or phosphoric acid) prior to step (ii).

For example, in step (i) mixing an aqueous solution comprising at least one amino substituted silane, at least one silicate and optionally at least one alkyl substituted silane, optionally a buffer, optionally one or more additives, and a solvent system, to form a wet-gel matrix, may proceed at ambient temperature for at least 24 hours or may be heated to between about 60° C. and about 80° C. for about 6 hours. In step (i)(b) rinsing the wet-gel matrix in a sufficient amount of water to exchange solvent (e.g. ethanol) with water allows the wet-gel matrix to dry (in step (ii)) to form an open porous gel (e.g. a dried silica-based aerogel). Failure to remove the solvent may result in a "hard" gel with poor performance. The wet-gel matrix rinsed in sufficient amounts of water to remove the solvent can be dried at room temperature and heated between about 80° C. and 100° C. to remove any residual water.

In some embodiments or examples, the process may be a sol gel process and step (ii) may comprise or consists of: (a1) optionally heating the wet gel matrix to obtain a gel; and (a2) drying the gel by solvent evaporation and/or heat treatment to provide a dried silica-based aerogel.

In other embodiments or examples, the process may comprise an alternate step (ii) which may comprise: (b1) wherein the wet gel matrix may be applied to a substrate to form a wet-gel film coating the substrate; and (b2) drying the wet-gel film by solvent evaporation and/or heat treatment to provide a dried silica-based coated substrate. In an embodiment or example, the drying step (ii) may be vacuum drying or freeze drying. Preferably, the drying step is vacuum drying. It will be appreciated that the drying step (ii) does not involve supercritical $CO_2$.

In step (i) an alcogel or step (a1) a sol gel (e.g. a colloidal solution) may be formed from the process that gradually evolves towards the formation of a gel-like diphasic system containing both the liquid phase and the solid phase whose morphologies may range from discrete particles to continuous polymer networks (ageing process). In some embodiments or examples, the particle density may be low such that an amount of liquid may need to be removed initially for the gel-like properties to be recognized. In another embodiment or example, centrifugation may be used to accelerate the process of phase separation and gel formation to form the aged alcogel or aged sol gel. Removal of the remaining liquid (solvent) phase may require a drying step (for example, step (ii) and step (a2)).

It will be appreciated that pore size may primarily be determined by the concentration of the amino substituted silane and the alkyl substituted silane, and the gelation conditions. The higher concentration of the amino substituted silane and the alkyl substituted silane the denser the alcogel or sol gel may be with smaller pore sizes. Under the same concentration of the amino substituted silane and the alkyl substituted silane, faster gelation at a higher temperature may involve accelerated chemical reactions and cluster aggregation, leading to relatively larger voids (or pores) in the silica-based aerogel, while slower gelation at a lower temperature may give rise to smaller voids (or pores). On the other hand, the siloxane network structure formed upon gelation may need to be further developed and strengthened, so that during the drying process, the network structure may be able to maintain the integrity of the network. This strengthening and stiffening effect may be realized through the ageing process, where many of the unreacted —OR and —OH groups may continue to condense and form Si—O—Si bonds.

The addition of the silicate may form covalent bonds to four other silicon atoms thereby increasing the rigidity of the siloxane network structure. The amino substituted silane and the alkyl substituted silane may form only two or three covalent bonds in the siloxane network structure allowing flexibility.

Prior to step (a1) and (b1) the wet-gel matrix may be heated to a suitable temperature and maintained at the temperature (ageing process). In some embodiments or examples, the wet-gel matrix may be heated in a range between about 20° C. and about 100° C. The temperature of the wet-gel matrix may be at least about 20, 25, 30, 35, 40, 45, 50, 55, 60, 65, 70, 75, 80, 85, 90, 95 or 100° C. The temperature of the wet-gel matrix may be less than about 100, 95, 90, 85, 80, 75, 70, 65, 60, 55, 50, 45, 40, 35, 30, 25 or 20° C. Combinations of these heating temperatures are also possible, for example between about 20° C. to about 30° C., about 25° C. to about 80° C., or about 75° C. to about 85° C.

At least according to some embodiments or examples as described herein, the wet-gel matrix may be heated to the desired temperature by immersing the reaction vessel in an oven at the required temperature and the solution allowed to reach the required temperature.

At least according to some embodiments or examples as described herein, the wet-gel matrix may be maintained at the temperature in step (a1) and (b1) for about 3 hours to about 24 hours. The wet-gel matrix may be maintained at the temperature of step (a1) and (b1) for at least about 3, 6, 9, 12, 15, 18, 21 or 24 hours. The wet-gel matrix may be maintained at the temperature of step (a1) and (b1) for less than 24, 21, 18, 15, 12, 9, 6 or 3 hours. Combinations of these times are also possible, for example between about 6 hours and about 12 hours.

In some embodiments or examples, the wet-gel matrix may then be cooled to ambient temperature for step (a1) and (b1). In an embodiment or example, the wet-gel matrix may be cooled to ambient temperature.

In an example, after formation of the wet-gel may, residual solvent and organic reaction products may be removed to avoid plasticizing the wet-gel matrix. These are interchanged with water by breaking up the matrix and soaking in at least 10 times excess of water, for no less than 1 hour. The water interchange may protect the wet-gel matrix from collapsing and also may allow any unreacted silanes to form Si—O—Si bonds. Insufficient interchange of water may result in gels that do not resemble typical aerogels dried using traditional methods. Exchange of a solvent (e.g. ethanol) becomes less important when a freeze-drying method or other reduced pressure drying processes are used. The incorporation of amino substituted silanes such as those of Formula 1 (e.g. 3-aminopropyl(diethoxy) methyl silane) means that the solvated matrix still has plastic properties, unlike the traditional aerogels where all the silicon atoms are covalently bound to no fewer than three other oxygen atoms.

When evaporating the solvent in air during drying of the wet-gel matrix, the wet-gel matrix is likely to undergo contraction and cracking caused by differences in capillary force and solvent extraction rate at an air/liquid interface during the drying process, and a super-critical drying process is conventionally used to suppress this. However, supercritical drying is performed at high pressure and increases manufacturing costs, thereby providing an obstacle in commercialization of aerogels. For example, U.S. Pat. No. 9,931,612 B2 (Aspen) discloses a two-step process for the formation of mesoporous aerogels by first forming two different sols and then mixing the sols to form a gel and then using supercritical $CO_2$ drying. Supercritical $CO_2$ drying is generally used to remove any solvent in the pores of the mesoporous aerogel where the gel is subjected to liquid $CO_2$, followed by heating the $CO_2$ liquid-filled gels under pressure until the liquid converts to a supercritical fluid. It will be appreciated that this is a major draw-back for the Aspen process as it is not an environmentally friendly solution to introduce $CO_2$ into the pores to replace the solvent when the purpose of the aerogel is to capture $CO_2$ from air. Another key difference is the two-step process results in the formation of mesoporous gels where the pore sizes are much larger. It has been found that mesoporous gels are less efficient for selective adsorption of $CO_2$ and more suitable for use where higher concentrations of $CO_2$ are present, like for capture of $CO_2$ in flue gas where $CO_2$ levels are from about 12-14%.

One or more advantages of the present process according to at least some embodiments or examples as described herein is that the wet-gel matrix may be dried to obtain a dried silica-based aerogel by minimising the effects previously observed with other drying processes. The drying process described by the present disclosure may be performed in various advantageous ways, including reduced pressure drying, ambient pressure or in a vacuum drying, freeze drying, or various combinations thereof. Preferably, vacuum drying or freeze drying.

For step (ii) the wet-gel matrix may be dried at a temperature suitable to produce a dried silica-based aerogel. In an example, when the wet-gel matrix is dried using reduced pressure drying, the drying equipment may be controlled at about 40 to about 60° C., or about 55° C., the initial drying pressure may be ambient atmospheric pressure, and the vacuum pump may be turned on to start vacuum drying (−80 kPa) for at least about 4 hours, 6 hours, 8 hours, 10 hours, 12 hours, 14 hours, 16 hour, 18 hours, 20 hours, 22 hours or 24 hours, to produce the dry silica-based aerogel. In another example, when the wet-gel matrix is dried using a freeze-drying process, the wet-gel matrix is maintained under typical freeze-drying conditions for at least about 4 hours, 6 hours, 8 hours, 10 hours, 12 hours, 14 hours, 16 hour, 18 hours, 20 hours, 22 hours or 24 hours, to produce the dry silica-based aerogel. In yet another example, when the wet-gel matrix is dried using ambient pressure or in an oven, the temperature may be controlled at about 40° C. to about 60° C., or about 50° C. and the wet-gel matrix is maintained under ambient pressure or in a vacuum for at least about 4 hours, 6 hours, 8 hours, 10 hours, 12 hours, 14 hours, 16 hour, 18 hours, 20 hours, 22 hours or 24 hours, to produce the dry silica-based aerogel.

In some embodiments or examples, the amino substituted silane may be of Formula 1, as described herein. In some embodiments or examples, the alkyl substituted silane may be of Formula 2, as described herein. In some embodiments or examples, the silicate may be of Formula 3, as described herein.

In some embodiments or examples, the solvent may be water, a non-aqueous solvent, or a combination thereof. A variety of non-aqueous solvents may be used in step (i)(a) and step (i)(b) of the process, including alcohols containing between 1 and 6 carbon atoms. In an embodiment or example, the solvent may be selected from methanol, ethanol, propanol, butanol, isobutyl alcohol, t-butyl alcohol, pentanol, hexanol, and combinations thereof. In one embodiment or example, ethanol may be used as the solvent. For example, ethanol may be used in combination with water in the process. Water in various ratios may also be involved to accomplish the sol-gel reactions. Water may also be a product of some of these reactions. The ratios and solvents may be adjusted so that precipitation or phase separation can be avoided.

In some embodiments or examples, the process may further comprise step (iii) an activation step. The silica-based aerogels prepared by the process may be activated at temperature in a range or about 80° C. to about 160° C. The activation temperature may be at least about 80, 90, 100, 110, 120, 130, 140, 150 or 160° C. The activation temperature may be less than about 160, 150, 140, 130, 120, 110, 100, 90 or 80° C. Combinations of these activation temperatures are possible, for example the activation temperature may be between about 80° C. to about 160° C., between about 90° C. to about 150° C., or between about 100° C. to about 140° C.

In some embodiments or examples, the one or more additives may be selected from a buffer, a binder, optionally a metal organic framework (MOF), and a nanoparticle. The total amount of an additive when present, may be less than 50% of the aerogel formulation. A MOF, when present as an additive will be less than 10% of the aerogel formulation, preferably less than 5%. In some embodiments or examples, the silica-based aerogel prepared by the process may be a plurality of particles, powders, pellets, beads, granules, coatings, or sheets/layers. In some embodiments or examples, the particles, powders, pellets, beads, granules, coatings, or sheets/layers may be a composition and further comprise optional additives selected from the group comprising metal-organic frameworks, nanoparticles, nanomagnetic particles, binders, buffers or combinations thereof. In an embodiment, the MOF when present is used as a surface modification agent after aerogel formation, to modify the surface of the aerogel, for the purpose of making beads or pellets. In another embodiment or example, the silica-based aerogel prepared by the process may be provided as a plurality of pellets. The pellets may further comprise optional additives selected from the group comprising metal-organic frameworks, nanoparticles, nanomagnetic particles, binders, buffers or combinations thereof. In an example, the pellets may comprise or consist of the silica-based aerogel prepared by the process in combination with a binder and an optional lubricant. The binder may be selected from the group comprising cellulose-based polymers, silane-based polymers, cellulose-siloxane-based polymers, polyglycol-based polymers, epoxy-based polymers, colloidal silica, polyvinyl pyrrolidone, polyvinyl alcohol, polyethylene imine, or combinations thereof. The binders may be selected from commercial binders. It will be appreciated that other components may form part of the commercial binder. In an example, the binders may include other components such as a lubricant. A lubricating agent may be used as required to adjust the viscosity of the aerogel formulation to, for example, an extrudable material. For example, the other components may include dicalcium phosphate, silicon dioxide, dextrose monohydrate and magnesium stearate.

In some embodiments or examples, the amount of additive may be in a range between about 1 to about 50 wt. % based on the total aerogel composition. The amount of additive may be at least about 1, 5, 10, 15, 20, 25, 30, 35, 40, 45 or 50 wt. %. The amount of silicate may be less than about 50, 45, 40, 35, 30, 25, 20, 15, 10, 5, or 1 wt. %. Combinations of these amounts are possible, for example the amount of additive may be between about 10 wt. % to about 50 wt. %, between about 15 wt. % to about 45 wt. %, or between about 20 wt. % to about 40 wt. %. For example, the amount of a binder may be in a range between about 10 wt. % to about 50 wt. %, between about 15 wt. % to about 45 wt. %, or between about 20 wt. % to about 40 wt. %, based on the total aerogel composition.

In a further embodiment or example, the silica-based aerogel may be in the form of a composite, wherein the composite may be prepared by pressing a mixture consisting of the dried silica-based aerogel, a binder, and optionally a lubricant, into a pellet. In a further embodiment or example, an aerogel composite may comprise or consist of: (i) an aerogel comprising a reaction product of an amino substituted silane, an alkyl substituted silane and a silicate, according to any one of the embodiments or examples described herein, or a combination thereof; (ii) one or more additives, wherein the additive has a % loading of about 5 to about 35 wt %; (iii) optionally a lubricant; and (iii) optionally a solvent. In yet a further embodiment or example, an aerogel composite may comprise or consist of: (i) an aerogel comprising a reaction product of an amino substituted silane, an alkyl substituted silane and a silicate, according to any one of the embodiments or examples described herein, or a combination thereof; (ii) one or more additives, wherein the additive has a % loading of about 5 to about 35 wt. %; and (iii) optionally a lubricant.

In some embodiments, the composite may be prepared by (c1) pressing a mixture consisting of an aerogel according to any one or more of the embodiments or examples described herein, optionally a lubricant, and one or more additives into a pellet, wherein the one or more additives has a % loading of about 5 to about 35 wt. %; or (c2) liquid extrusion of a mixture consisting of an aerogel according to any one or more of the embodiments or examples described herein, one or more additives, optionally a lubricant, and a solvent, to provide a viscous paste, wherein the one or more additives has a % loading of about 5 to about 35 wt. %. The one or more additives may be selected from a binder, optionally a metal organic framework (MOF), and a nanoparticle. In a particular embodiment, the one or more additives may be a binder. The binders may be selected from the group comprising cellulose-based polymers, silane-based polymers, cellulose-siloxane-based polymers, polyglycol-based polymers, polyvinyl pyrrolidone, polyvinyl alcohol, polyethylene imine, bentonite, graphite, or combinations thereof. It will be appreciated that when a combination of any two or more aerogels according to any one or more of the embodiments or examples described herein are used in the process to prepare a composite, the composite may be referred to as a mixed aerogel composite.

In another example, the silica-based aerogel may be in the form of a composite, wherein the composite may be prepared by liquid extrusion of a mixture consisting of the dried silica-based aerogel, a binder, and optionally a lubricant, to provide a viscous paste. In yet another example, the silica-based aerogel may be in the form of a composite, wherein the composite may be prepared by liquid extrusion of a mixture consisting of the dried silica-based aerogel, a binder, an optional lubricant, and a solvent, to provide a viscous paste, which may be used as a coating on a substrate, for example.

In some embodiments or examples, the one or more additives may be selected from a binder, optionally a metal organic framework (MOF), surfactant, and a nanoparticle. An additive when present, may be less than 35%, preferably less than 10% of the aerogel formulation. In some embodiments or examples, the silica-based aerogel prepared by the process may be a plurality of particles, powders, pellets, beads, granules, coatings, or sheets/layers. In some embodiments or examples, the particles, powders, pellets, beads, granules, coatings, or sheets/layers may be a composition and further comprise optional additives selected from the group comprising metal-organic frameworks, nanoparticles, nano-magnetic particles, binders, or combinations thereof. In an embodiment, the MOF when present is used as a surface modification agent after aerogel formation, to modify the surface of the aerogel, for the purpose of making beads or pellets.

In some embodiments, composite pellets can be prepared by mixing the dried aerogel, as described herein, with about 5 to about 35 wt. % of an additive (e.g. a binder) and an optional lubricant. In another embodiment, a composite paste can be prepared by mixing the dried aerogel, as described herein, with about 5 to about 35 wt. % of an additive (e.g. a binder), an optional lubricant, and a solvent (e.g. an aqueous solution of ethanol and water). The resultant viscous paste can be used to form composite pellets by liquid extrusion or further diluted as required for use as a coating on a substrate.

The % loading of additive (e.g. binder) may be at least about 5, 10, 15, 20, 25, 30 or 35 wt. %. In other embodiments or examples, the % loading of additive (e.g. binder) may be less than about 35, 30, 25, 20, 15, 10 or 5 wt. %. Combinations of these values to form various ranges are also possible, for example the % loading of additive (e.g. binder) may between about 5 wt. % to about 30 wt. %, about 8 wt. % to about 25 wt. %, for example about 10 wt. % to about 20 wt. %.

In one embodiment or example, the silica-based aerogel prepared by the process may be self-supporting. As mentioned above, the term "self-supporting" as used herein refers to the ability of the silica-based aerogel to maintain its morphology in the absence of a support material (e.g. scaffold). For example, the silica-based aerogel prepared by the process may comprise a plurality of particles, wherein the particles maintain their morphology in the absence of a scaffold support. The self-supported nature of the silica-based aerogel may provide certain advantages, for example allows particles of aerogel to be contacted with the gaseous stream using a fluidized bed reactor. Accordingly, in one embodiment or example, the silica-based aerogel does not comprise a separate support structure, such as a separate porous support structure. Thus it will be understood that, where the silica-based aerogel is "self-supporting", there is no support material (e.g. scaffold) exogenous to the aerogel.

In other embodiments or examples, the silica-based aerogel prepared by the process may be provided as layer within a column, wherein the gaseous stream is flowed through the column and passes through the silica-based aerogel layer. The layer is not limited to any particular silica-based aerogel morphology. In one example, a suitable column may be packed with a plurality of silica-based aerogel particles to form a packed-bed with sufficient interstitial space between adjacent particles to allow a flow of gas therethrough. Alternatively, the silica-based aerogel may be provided in flow with the gaseous stream (e.g. a fluidised bed reactor).

In another embodiment or example, the silica-based aerogel prepared by the process may be provided as a coating composition on a substrate. In some embodiments or examples, the substrate may be planar, for example a planar sheet. In a particular example, the substrate may be a flexible sheet. A planar substrate provides a two sided element onto which the silica-based aerogel coating composition can be applied. Each substrate may be coated with the silica-based aerogel coating composition on two opposing sides. The planar substrate can have any configuration. In some embodiments or examples, the planar substrate may comprise a flat solid surface. In other embodiments or examples, the planar substrate may comprise one or more apertures, designed to assist gas flow through and around the substrate. In a particular embodiment or example, the substrate may comprise a mesh, for example, micro wire mesh. The use of a mesh provides a multitude of apertures, (e.g. micro size apertures), thereby providing a high surface area on which the silica-based aerogel coating composition can be applied, whilst also providing a suitable flow path having a reasonably low pressure drop across the substrate (of course relative to the size and configuration of the mesh) compared to other configurations, for example, packed beds.

In some embodiments or examples, the amount of amino substituted silane may be in a range between about 10 to about 80 wt. % based on the total aerogel. The amount of amino substituted silane may be at least about 10, 15, 20, 25, 30, 35, 40, 45, 50, 55, 60, 65, 70, 75 or 80 wt. %. The amount of amino substituted silane may be less than about 80, 75, 70, 65, 60, 55, 50, 45, 40, 35, 30, 25, 20, 15 or 10 wt. %. Combinations of these amounts are possible, for example the amount of amino substituted silane may be between about 10 wt. % to about 60 wt. %, between about 20 wt. % to about 50 wt. %, between about 35 wt. % to about 45 wt. %, or between about 40 wt. % to about 60 wt. %.

In some embodiments or examples, the amount of alkyl substituted silane may in a range between about 10 to about 80 wt. % based on the total aerogel. The amount of alkyl substituted silane may be at least about 10, 15, 20, 25, 30, 35, 40, 45, 50, 55 60, 65, 70, 75 or 80 wt. %. The amount of alkyl substituted silane may be less than about 80, 75, 70, 65, 60, 55, 50, 45, 40, 35, 30, 25, 20, 15 or 10 wt. %. Combinations of these amounts are possible, for example the amount of alkyl substituted silane may be between about 10 wt. % to about 60 wt. %, between about 15 wt. % to about 65 wt. %, or between about 20 wt. % to about 40 wt. %.

In some embodiments or examples, the amount of silicate may be in a range between about 10 to about 50 wt. % based on the total aerogel. The amount of silicate may be at least about 10, 15, 20, 25, 30, 35, 40, 45, 50, 55 60, 65, 70, 75 or 80 wt. %. The amount of silicate may be less than about 80, 75, 70, 65, 60, 55, 50, 45, 40, 35, 30, 25, 20, 15 or 10 wt. %. Combinations of these amounts are possible, for example the amount of silicate may be between about 10 wt. % to about 50 wt. %, between about 15 wt. % to about 45 wt. %, or between about 20 wt. % to about 40 wt. %.

Low $CO_2$ Concentration Gaseous Streams

The process of the present disclosure can capture $CO_2$ from $CO_2$ concentration gaseous streams. For example, the process can capture $CO_2$ from a low $CO_2$ concentration atmosphere. Examples of low concentration gaseous streams include the atmosphere (e.g. ambient air), ventilated air (e.g. air conditioning units and building ventilation), green-house type environment where $CO_2$ is adsorbed at a particular time and used at a different time, and partly closed systems which recycle breathing air (e.g. submarines, space craft, air craft or rebreathers).

The microporous aerogels, as described herein, are most suitable for adsorption of $CO_2$ from air comprising low levels of $CO_2$. Preferably, the microporous aerogels can be used for direct $CO_2$ capture applications. The microporous aerogels are suitable for adsorption of $CO_2$ from air less than 10,000 ppm (10% $CO_2$), preferably less than 7,000 ppm of $CO_2$ (7% $CO_2$), more preferably less than 5000 ppm of $CO_2$ (5% $CO_2$), and even more preferably less than 500 ppm (0.5% $CO_2$). The microporous aerogels are also suitable for adsorption of $CO_2$ from air comprising less than 50 ppm (0.05% $CO_2$). For example, the microporous aerogels are suitable for use in direct air capture of $CO_2$ from the atmosphere having approximately 0.04% of $CO_2$ or where $CO_2$ levels are between about 360 ppm and about 412 ppm. The microporous aerogels can also be used to adsorb $CO_2$ and purify air in enclosed environments having $CO_2$ levels of at less than about 2.5% or in enclosed environments with higher $CO_2$ levels of up to about 7% or less.

Preferably, selectivity for $CO_2$ from a gaseous stream comprising water is greater than 50%. For example, the microporous aerogels can be used to adsorb $CO_2$ from air comprising less than 500 ppm of $CO_2$ and $H_2O$ concentrations at least 1000 ppm with greater than 50% selectivity for $CO_2$ than $H_2O$.

In some embodiments or examples, the low $CO_2$ concentration gaseous stream may have a $CO_2$ concentration of less than about 200,000 parts per million (ppm). In one embodiment or example, the low $CO_2$ concentration gaseous stream may have a $CO_2$ concentration of less than 150,000, 100, 000, 75,000, 50,000, 25,000, 20,000, 10,000, 7,000, 5,000, 4,000, 1,000, 900, 800, 700, 600, 500, 400, 300, 200 or 100 ppm. In another embodiment or example, the low $CO_2$ concentration gaseous stream may have a $CO_2$ concentration of between about 100 ppm to about 100,000 ppm, about 400 ppm to about 20,000 ppm, about 3,000 ppm to about 150,000 ppm, about 4,000 ppm to about 5,000 ppm, about 100 ppm to about 10,000 ppm, about 100 ppm to about 1,000 ppm, or about 100 ppm to about 500 ppm. In one embodiment, the low $CO_2$ concentration gaseous stream may have a $CO_2$ concentration of between about 200 ppm to about 500 pm, or about 400 ppm to about 500 ppm, or about 400 ppm to about 450 ppm.

It will be understood that 1 ppm equates to 0.0001 vol. %. For example, a gaseous stream having a $CO_2$ concentration of less than about 100,000 ppm equates to 10.0 vol. % of $CO_2$ in the gaseous stream. Thus in some embodiments or examples, the low $CO_2$ concentration gaseous stream may have a $CO_2$ concentration of less than about 20, 15, 10, 7.5, 5, 2.5, 1, 0.5, 0.1, 0.09, 0.08, 0.07, 0.06, 0.05, 0.04, 0.03, 0.02 or 0.01 vol. %. In another embodiment or example, the low $CO_2$ concentration gaseous stream may have a $CO_2$ concentration of between about 0.01 vol. % to about 15 vol. %, about 3 vol. % to about 15 vol. %, about 4 vol. % to about 5 vol. %, 0.1 vol. % to about 2 vol. %, about 0.01 vol. % to about 1 vol. %, about 0.01 vol. % to about 0.1 vol. %, or 0.01 vol. % to about 0.05 vol. %. In one embodiment or example, the low $CO_2$ concentration gaseous stream may have a $CO_2$ concentration of between about 0.02 vol. % to about 0.05 vol. %, such as about 0.04 vol. %.

In one embodiment or example, the low $CO_2$ concentration gaseous stream may have a $CO_2$ concentration the same as in ambient air (e.g. the atmosphere). Thus in one embodiment, the low $CO_2$ concentration gaseous stream may have a $CO_2$ concentration of about 400 ppm to about 450 ppm $CO_2$, for example about 400 ppm to 415 ppm as in ambient air in most locations around the world. Accordingly, in one embodiment, the process is for direct air capture (DAC).

In one embodiment or example, the process is for direct air capture in indoor sealed environments (DACi). Thus, the $CO_2$ concentration gaseous stream may have a $CO_2$ concentration of up to 2,000 ppm.

In one embodiment or example, the process is for direct air capture of exhaled breath in masks or personal protective equipment (DACp). Thus, the $CO_2$ concentration gaseous stream may have a $CO_2$ concentration of about 4,000 ppm to about 5,000 ppm.

In one embodiment or example, the process is for direct air capture in external power plants (DACex). Thus, the $CO_2$ concentration gaseous stream may have a $CO_2$ concentration of about 3,000 ppm to about 150,000 ppm.

In one embodiment or example, the gaseous stream may comprise less than 100 ppm (i.e. 0.01 vol. %) hydrocarbon gas. For example, the gaseous stream may comprise less than about 100, 75, 50, 25, 20, 15, 10, 5, 4, 3, or 2 ppm hydrocarbon gas. The term 'hydrocarbon gas' will be understood to refer to a gaseous mixture of hydrocarbon compounds including, but not limited to methane, ethane, ethylene, propane, and other C3+ hydrocarbons. For example, it will be understood by a person skilled in the art that ambient air comprises methane as a minor impurity (e.g. 2 ppm/0.0002 vol. %), and that ambient air therefore may comprise less than 3 ppm hydrocarbon gas. The low $CO_2$ concentration gaseous stream may comprise predominantly of nitrogen makes up the major vol. % proportion in the gaseous stream. For example, the low $CO_2$ concentration gaseous stream may comprise at least about 50 vol. % nitrogen, for example at least about 70 vol. % nitrogen. In one embodiment, the low $CO_2$ concentration gaseous stream comprises about 78 vol. % nitrogen (e.g. ambient air).

The low $CO_2$ concentration gaseous stream may comprise an amount of water (e.g. the gaseous stream is damp/moist for example a humid gaseous stream). For example, the low $CO_2$ concentration gaseous stream may comprise between about 1 vol. % to about 10 vol. % water. Alternatively, the low $CO_2$ concentration gaseous stream may be a dry gaseous stream.

In an alternate embodiment, the process can capture $CO_2$ from a high $CO_2$ concentration gaseous stream or atmosphere. For example, the high $CO_2$ concentration gaseous stream or atmosphere may have a $CO_2$ concentration of 925 mbar (100 vol. %).

In some embodiments or examples, the gaseous stream originates from a ventilation system, for example building ventilation or air conditioning. In other embodiments or examples, the gaseous stream originates from a closed, or at least partially closed system, designed to recycle breathing gas, for example in a submarine, space craft, or air craft. It will be appreciated that the silica-based aerogels of the present disclosure can also absorb $CO_2$ from gaseous streams with higher $CO_2$ concentrations, highlighting the versatility of the silica-based aerogels for a wide range of air capture applications. In an example, the effectiveness of the silica-based aerogels to capture $CO_2$ at high concentrations at 100 vol. % $CO_2$ concentrations (e.g. 925 mbar) has been found by the inventors to be surprising. In another example, the effectiveness of the silica-based aerogels to capture $CO_2$ at concentrations equivalent to flue gas conditions (e.g. external power plants) with 15 vol. % $CO_2$ concentrations (e.g. 150 mbar) has also been found by the inventors to be surprising. In another example, the effectiveness of the silica-based aerogels to capture $CO_2$ in indoor sealed environments with up to 2 vol. % $CO_2$ concentrations (e.g. 2,000 ppm) has also been found by the inventors to be surprising. It will be appreciated that a $CO_2$ concentration of less than 2 vol. % in indoor sealed environments can include, for example, a room, submarine, space craft air craft, or any other enclosed environment. In yet another example, the effectiveness of the silica-based aerogels to capture $CO_2$ from exhaled breath in masks/personal protective equipment at concentrations of about 4 to 5 vol. % $CO_2$ concentrations (e.g. about 4,000 ppm to about 5,000 ppm) has also been found by the inventors to be surprising. For example, the effectiveness of the silica-based aerogels to capture $CO_2$ at relatively low concentrations of 0.04 vol. % (e.g. 400 ppm) has been found by the inventors to be particularly surprising. It will be appreciated that $CO_2$ concentrations of 0.04 vol. % or less than 500 ppm refers to direct air capture from the atmosphere (DAC).

The low $CO_2$ concentration gaseous stream or atmosphere is contacted with the silica-based aerogel. The gaseous stream may have a suitable flow rate to contact (e.g. pass through) the silica-based aerogel. Alternatively, the gaseous stream may come into contact with the silica-based aerogel without any back pressure or flow rate being applied (e.g. the gaseous stream may organically diffuse into the silica-based aerogels upon contact). In some embodiments or examples, the gaseous stream may be an atmosphere surrounding the silica-based aerogels, for example a low $CO_2$ concentration atmosphere, such as when the silica-gel based aerogel is configured to a greenhouse, for example. In some embodiments, the gaseous stream passes through the silica-based aerogel (e.g. enters from a first side or face on the silica-based aerogel and exits from different side or face) or it may simply diffuse into the silica-based aerogel, for example when the silica-based aerogel is placed in an atmosphere, such as ambient air. As such, it will be understood that in some embodiments the gaseous stream does not need to be applied with a back pressure to essentially force the gaseous stream "through" the silica-based aerogel, although in some embodiments this may be desirable, such as when the silica-based aerogel is configured to a building ventilation system, for example. In one embodiment, the gaseous stream (e.g. atmosphere) diffuses into the silica-based aerogel upon contact with the silica-based aerogel.

In some embodiments or examples, the gaseous stream has no flow rate, e.g. 0 $m^3$/hour. In some embodiments or examples, the gaseous stream has a flow rate of between about 0.01 $m^3$/hour to about 1500 $m^3$/hour. The flow rate ($m^3$/hour) of the gaseous stream may be at least about 0.01, 0.05, 0.1, 0.5, 1, 5, 10, 20, 30, 40, 50, 60, 70, 80, 90, 100, 200, 300, 400, 500, 600, 700, 800, 900, 1000, or 1500. The flow rate ($m^3$/hour) of the gaseous stream may be less than about 1500, 1000, 900, 800, 700, 600, 500, 400, 300, 200, 100, 90, 80, 70, 60, 50, 40, 30, 20, 10, 5, 1, 0.5, 0.1, 0.05 or 0.01. Combinations of these flow rates are possible, for example the flow rate of the gaseous stream may be between about 0.01 $m^3$/hour to about 1500 $m^3$/hour, between about 5 $m^3$/hour to about 1000 $m^3$/hour, between about 10 $m^3$/hour to about 500 $m^3$ hour, between about 20 $m^3$/hour to about 200 $m^3$/hour, or between about 60 $m^3$/hour to about 1000 $m^3$/hour. In some embodiments or examples, increasing the flow rate of the gaseous stream as it contacts the silica-based aerogels may lead to a faster rate of $CO_2$ absorption and capture in the silica-based aerogels. For industrial scale applications, the flow rate of the gaseous stream may be up to 1000 $m^3$/hour. In some embodiments or examples, the gaseous stream has no flow rate (e.g. an ambient atmosphere).

The low $CO_2$ concentration gaseous stream may be at least partially dried to remove at least some of the moisture ($H_2O$) present in the gaseous stream prior to contacting with the silica-based aerogels. For example, the gaseous stream may be dried to a humidity of less than 10%, 8%, 6%, 4%, 2%, or 1%, or to a humidity between any two of these values, for example between about 1% and about 10%, about 1% and about 6%, about 1% and about 4%. The gaseous stream may be dried by any conventional means (e.g. passing through a hygroscopic material or contacted with a source of heat) and its humidity measured via protocols as described herein.

In some embodiments or examples, the low $CO_2$ concentration gaseous stream has an initial $CO_2$ concentration prior to contacting the silica-based aerogel, and has a final $CO_2$ concentration after contacting the silica-based aerogel (also referred to herein as an effluent gaseous stream and/or effluent $CO_2$ concentration). It will be appreciated that as $CO_2$ is absorbed into the silica-based aerogel from the gaseous stream, the concentration of $CO_2$ in the effluent stream will be lower than the initial $CO_2$ concentration of the gaseous stream prior to contact (e.g. passing through) with the silica-based aerogel.

The concentration of $CO_2$ in the gaseous stream can be measured by any suitable means, for example an gas chromatography-mass spectroscopy, isotopic analyser (e.g. using a G2201-i Isotopic Analyzer (PICARRO) and/or infrared spectrometer (e.g. an in-line calibrated cavity ring-down IR spectrometer). The concentration of $CO_2$ in the gaseous stream can be monitored by any suitable means, for example an SprintIR®-6S covering a range from 0-100% and K30 ambient sensor with a range of 0-1% $CO_2$.

Adsorption Apparatus

In some embodiments or examples, there is provided an adsorption apparatus for capturing carbon dioxide from a gaseous stream or atmosphere comprising: a chamber enclosing at least one silica-based aerogel, as described herein, the chamber comprising an inlet through which gaseous stream can flow to the silica-based aerogel and an outlet through which the effluent gaseous stream can flow out from the silica-based aerogel. The at least one silica-based aerogel may be located between the inlet and outlet of the chamber.

Fluid flow is typically required to move the gaseous stream from the inlet of the chamber, across the at least one silica-based aerogel enclosed and out of the chamber through the outlet. The fluid flow may be driven by at least one fluid flow device which drives a fluid flow from the inlet to the outlet of the adsorption apparatus. A variety of different fluid flow devices can be used. In some embodiments or examples, the fluid flow device comprises at least one fan or pump. In some embodiments or examples, the flow rate of the gaseous stream entering through the inlet, across the at least one silica-based aerogel, may be between about 0.01 $m^3$/hour and 1500 $m^3$/hour. The flow rate ($m^3$/hour) of the gaseous stream may be at least about 0.01, 0.05, 0.1, 0.5, 1, 5, 10, 20, 30, 40, 50, 60, 70, 80, 90, 100, 200, 300, 400, 500, 600, 700, 800, 900, 1000, or 1500. The flow rate ($m^3$/hour) of the gaseous stream may be less than about 1500, 1000, 900, 800, 700, 600, 500, 400, 300, 200, 100, 90, 80, 70, 60, 50, 40, 30, 20, 10, 5, 1, 0.5, 0.1, 0.05 or 0.01. Combinations of these flow rates are possible, for example the flow rate of the gaseous stream may be between about 0.01 $m^3$/hour to about 1500 $m^3$/hour, between about 5 $m^3$/hour to about 500 $m^3$/hour, between about 10 $m^3$/hour to about 200 $m^3$/hour, between about 20 $m^3$/hour to about 600 $m^3$/hour, or between about 60 $m^3$/hour to about 1000 $m^3$/hour. The flow rate of the gaseous stream through the chamber and across the at least one silane-based aerogel may be achieved with substantially no back pressure measurable through or across the silica-based aerogel. In an alternate embodiment or example, pressure variance or suction may be used to drive fluid flow of the gaseous stream through the device. For industrial scale applications, the flow rate of the gaseous stream may be up to 1000 $m^3$/hour.

The chamber may have any suitable configuration. In some embodiments or examples, the chamber comprises a chamber comprising an inlet at one end and an outlet at the opposite end. In an embodiment or example, a substrate, as described herein, can be located or otherwise packed within the chamber in a compacted manner to increase the surface area within that volume.

The apparatus may comprise a single or multiple chambers enclosing the silica-based aerogel, as described herein. In some embodiments or examples, the apparatus may comprise two or more chambers enclosing at least one silica-based aerogel connected in parallel to the gaseous stream. In another embodiment or example, the apparatus may comprise at least three chambers enclosing at least one silica-based aerogel in each chamber, wherein each chamber may be connected in parallel to the gaseous stream. In some embodiments or examples, the silica-based aerogel enclosed within the at least three chambers may be operated in different sections of the adsorption and regeneration cycle to produce a continuous flow of the effluent gaseous stream.

In some embodiments or examples, the process may be a cyclical method, where the steps of adsorbing the $CO_2$ in the silica-based aerogel enclosed by the chamber and releasing the $CO_2$ through operation of at least one desorption arrangement in a repetitive cycle so to continuously produce the effluent gaseous stream. The cycle time may depend on configuration of the adsorption apparatus, the configuration of the chamber(s), the type of desorption arrangement, the composition of the silica-based aerogel, breakthrough point, saturation point and characteristics of the particular silica-based aerogel, temperature, pressure and other process conditions. In some embodiments or examples, the cycle time may be about 10, 15, 20, 30, 45, 60 minutes (1 hour), 2, 5, 10, 24, 48 or 36 hours.

In some embodiments or examples, the desorption arrangement can take any number of forms depending on whether heat and/or reduced pressure is being used. In some embodiments or examples, the apparatus is designed for pressure swing adsorption, with desorption being achieved by reducing the pressure for example using a vacuum pump to evacuate the gas from around the chamber enclosing the silica-based aerogel. In other embodiments or examples, temperature swing adsorption is undertaken to collect the $CO_2$ from the silica-based aerogel. This can be achieved using direct heating methods, or in some cases using magnetic induction swing adsorption.

In some embodiments or examples, the desorption arrangement may comprise a temperature swing adsorption arrangement where the silica-based aerogel is heated. For example, operating at least one desorption arrangement heats the silica-based aerogel to a temperature of between about 60 to 140° C. The temperature for desorption may be at least about 60, 70, 80, 90, 100, 110, 120, 130 or 140° C. The temperature for desorption may be less than about 140, 130, 120, 110, 100, 90, 80, 70 or 60° C. Combinations of these temperatures are possible, for example the temperature for desorption may be between about 60° C. to about 140° C., between about 70° C. to about 130° C., or between about 80° C. to about 120° C.

The present disclosure provides a process where a gaseous stream containing a concentration of $CO_2$ is fed into adsorptive contact with the silica-based aerogel, as described herein. After the silica-based aerogel is charged with an amount of the $CO_2$ the desorption arrangement is activated forcing at least a portion of the $CO_2$ to be released from the silica-based aerogel. The desorbed silica-based aerogel can be collected using a secondary process.

In other words, the effluent gaseous stream from the outlet can flow to a variety of secondary processes. For example, for carbon dioxide capture, the adsorption apparatus of the present disclosure can be integrated with a liquefier and/or dry ice pelletiser to provide dry ice on-demand. In another example, the adsorption apparatus of the present disclosure can be integrated with a hydrogenation apparatus to convert carbon dioxide ($CO_2$) to methane. In yet another example, the adsorption apparatus of the present disclosure may be used to adsorb carbon dioxide ($CO_2$) and store it for use at a different time. This would be applicable in a green-house type environment where $CO_2$ is adsorbed at a particular time and used at a different time. In yet another example, the adsorption apparatus of the present disclosure may be particularly applicable for $CO_2$ in a confined space. For example, inside a submarine, space craft, air craft or other confined space like a room where the adsorption apparatus would be used to remove $CO_2$, and the apparatus capable of adsorbing and desorbing $CO_2$ in a continuous cycle. In another example, the adsorption apparatus of the present disclosure may be used to convert $CO_2$ to liquid fuels. In yet another example, the adsorption apparatus of the present disclosure may be included into swimming pools to modulate pH or injected into concrete (capture and store). In yet another example, the adsorption apparatus of the present disclosure may be used to aerate beverages, such as carbonated beverages and sparkling water, and find application in the brewing and/or bottling industries. In yet another example, the adsorption apparatus of the present disclosure may be used to control fruit and vegetable ripening.

It will be appreciated that the silica-based aerogel formulation for any given application may be chosen based on density of the aerogel. The silica-based aerogel formulations with high densities may be suitable for any device, preferably suitable for smaller devices. For example, aerogel formulations with high density can be used to prepare $CO_2$ adsorption-desorption devices that fit into restricted spaces or environments. These types of devices can be typically used in space, aerospace, underwater vehicles or platforms.

Whereas aerogel formulations with low density may be more suitable when space is not an issue. For example, DAC units placed in greenhouses or power plants involved in the conversion of $CO_2$ to methane.

The adsorption apparatus of the present disclosure is advantageously compact and can be located much closer to end users, thereby allowing disruptive supply opportunities and better customer value.

Processes for $CO_2$ Capture/Release and Regeneration of Silica-Based Aerogels

The $CO_2$ may be captured from the gaseous stream by being absorbed into a silica-based aerogel. In some embodiments or examples, the silica-based aerogel is capable of absorbing between about 10 mg of $CO_2$ per g of silica-based aerogel (mg/g) to about 300 mg/g $CO_2$. In some embodiments or examples, the silica-based aerogel is capable of absorbing at least about 10, 20, 30, 40, 50, 60, 70, 80, 90, 100, 120, 150, 200, 250 or 300 mg/g $CO_2$. In other embodiments or examples, the silica-based aerogel is capable of absorbing less than about 300, 250, 200, 150, 120, 100, 90, 80, 70, 60, 50, 40, 30, 20 or 10 mg/g $CO_2$. Combinations of these absorption values are possible, for example the silica-based aerogel is capable of absorbing between about 10 mg/g to about 80 mg/g $CO_2$, between about 20 mg/g to about 70 mg/g $CO_2$, or between about 100 mg/g to about 300 mg/g, or between about 200 mg/g to about 300 mg/g. For example, the silica-based aerogel is capable of absorbing about 2 mg/g at 0.02 mbar to about 100 mg/g at 1110 mbar (at 298K).

In some embodiments, at least about 50% of $CO_2$ may be removed from the gaseous stream (e.g. at least about 50% of $CO_2$ is absorbed into the silica-based aerogel from the gaseous stream). In some embodiments or examples, at least about 50%, 85%, 90%, 95%, 99% or 99.9% of $CO_2$ is removed from the gaseous stream. In some embodiments, between about 50% to about 99% of $CO_2$ is removed from the gaseous stream.

The gaseous stream contacts the silica-based aerogel (e.g. passes through a bed comprising the silica-based aerogel) resulting in an effluent gaseous stream following contact with the silica-based aerogel. As described above, before contact with the silica-based aerogel, the gaseous stream has an initial $CO_2$ concentration. After contact with the silica-based aerogel, the effluent gaseous stream has an effluent $CO_2$ concentration. The concentration of $CO_2$ in the effluent gaseous stream following contact with the silica-based aerogel may be measured to determine the concentration of $CO_2$ remaining in the gaseous stream.

In some embodiments or examples, over time, the concentration of $CO_2$ in the effluent gaseous stream following contact with the silica-based aerogel may increase indicating reduced or no more $CO_2$ absorption is taking place upon contact of the gaseous stream with the silica-based aerogel (e.g. indicating the silica-based aerogel is "spent" and little to no more $CO_2$ absorption is occurring). This can act as an indicator to replace and/or regenerate the silica-based aerogel to continue $CO_2$ capture. The concentration of $CO_2$ in the effluent gaseous stream may be measured by any suitable means, for example using an in-line calibrated cavity ring-down IR spectrometer.

In some embodiments or examples, the silica-based aerogel may be enclosed in a suitable chamber, wherein the chamber comprises one or more inlets through which the gaseous stream can flow to contact the silica-based aerogel enclosed therein, and one or more outlets through which the effluent stream can flow out from the chamber. Alternatively, the silica-based aerogel may be enclosed in a suitable chamber comprising one or more openings through which the gaseous stream can diffuse through (e.g. absent a back pressure/flow rate) to contact the silica-based aerogel enclosed therein. It will be appreciated that the chamber can take a number of forms provided the gaseous stream can access the silica-based aerogel. In one embodiment or example, the chamber may be a packed-bed column as described herein.

In some embodiments, the silica-based aerogel may be provided as a bed, wherein the contacting the gaseous stream with the silica-based aerogel comprises passing the gaseous stream through the bed comprising the silica-based aerogel. In one embodiment or example, the silica-based aerogel is provided as a packed-bed reactor. In other embodiments, the contacting the gaseous stream with the silica-based aerogel comprises introducing a flow of the silica-based aerogel into the gaseous stream, for example using a fluidised bed reactor.

The silica-based aerogel may be contacted with the gaseous stream for any suitable period of time, for example until the silica-based aerogel is spent and no more $CO_2$ absorption is occurring. In one embodiment or example, the silica-based aerogel is in contact with the gaseous stream until the concentration of $CO_2$ in the effluent gaseous stream is the same as the initial concentration of $CO_2$ of the gaseous stream. In some embodiments or examples, the silica-based aerogel is in contact with the gases stream for at least about 5, 10, 30, 60 seconds (1 minute), 10, 15, 20, 30, 45, 60 minutes (1 hour), 2, 5, 10, 24, 48 or 36 hours.

In some embodiments or examples, the silica-based aerogel provides various rates of $CO_2$ absorption. In one embodiment or example, the rate of $CO_2$ absorption can be measured by monitoring the $CO_2$ concentration of the effluent gaseous stream over time. For example, the concentration of $CO_2$ in the effluent gaseous stream may be less than about 50% of the initial $CO_2$ concentration after about 2 hours of contact with the silica-based aerogel. In some embodiments or examples, the concentration of $CO_2$ in the effluent gaseous stream may be less than about 5% of the initial $CO_2$ concentration after about 4 hours of contact with the silica-based aerogel (in other words at least about 95% of $CO_2$ is removed from the gaseous stream after 4 hours). Other rates of $CO_2$ absorption are also possible.

In some embodiments or examples, the stability of the silica-based aerogel can be measured by monitoring performance over time of the original composition. For example, after three capture-regeneration cycles the silica-based aerogel is capable of retaining its original composition to at least 80% of its original composition under high humidity and $CO_2$ concentration of 740 ppm. In another example, after three capture-regeneration cycles the silica-based aerogel is capable of retaining its original composition to at least 99% of its original composition under low humidity and low $CO_2$ concentration of 400 ppm. In yet another example, after three capture-regeneration cycles the silica-based aerogel is capable of retaining its original composition to at least 99% of its original composition under low humidity and high $CO_2$ concentration of 925 mbar. In some embodiments or examples, the silica-based aerogel is capable of retaining its original composition to at least 80%, 85%, 90%, 95%, 97% or 99% of its original composition under low or high humidity at low $CO_2$ concentration. The silica-based aerogels may be stable for at least about 2, 3, 5, 10, 15, 20, 50, 100, 150, 200, 250, 500, 1000 or 2000 capture-regeneration cycles. The silica-based aerogels may be stable for more than 50 capture-regeneration cycles.

The inventors have unexpectedly shown that the selectivity of $CO_2$ over $H_2O$ of the silica-based aerogels prepared herein are higher than in zeolites (e.g. Zeolite 13X) and MOFs (e.g. TIF-SIX as described in WO2020113281) when the $CO_2$ concentration is at about 400 ppm. The selectivity of $CO_2$ over $H_2O$ of the silica-based aerogels may be at least 2 times higher than in Zeolite 13X and TIF-SIX when the $CO_2$ concentration is at about 400 ppm. The selectivity of $CO_2$ over $H_2O$ of the silica-based aerogels may be at least 3 times higher than in Zeolite 13X and TIF-SIX when the $CO_2$ concentration is at about 400 ppm. The selectivity of $CO_2$ over $H_2O$ of the silica-based aerogels may be at least 4 times higher than in Zeolite 13X and TIF-SIX when the $CO_2$ concentration is at about 400 ppm.

The $CO_2$ after absorption in the silica-based aerogel can be released by breaking the bonds between the $CO_2$ and the amine groups. This can be achieved through using temperature (through heating) or pressure (through vacuum). This may involve heating the column containing the silica-based aerogel or passing through a hot gas stream (e.g. steam) or hot air. Such desorption may be provided by any suitable environment capable of providing a heated environment (e.g. temperature) or a pressurised environment (e.g. through vacuum), or a combination thereof, in contact with or surrounding the silica-based aerogel which can desorb at least some of the $CO_2$ absorbed within the silica-based aerogel. Such desorption environment can operate in an "on" or "off" state. For example, once the concentration of $CO_2$ in the effluent gaseous stream following contact with the silica-based aerogel has increased to a level indicating reduced or no more $CO_2$ absorption is taking place, the desorption environment may be switched "on" to desorb $CO_2$ from the silica-based aerogel.

The adsorption processes as disclosed herein may be conducted at ambient temperatures, for example ranging from about 10 to 40° C. For example, ambient temperature may be between 15 and 30° C., or 20 to 25° C. The processes may be conducted generally around typical atmospheric pressures (e.g. between about 20 and 100 kPa) or at low pressures (e.g. between about 0.01 and 0.05 kPa).

The desorption processes as disclosed herein may be conducted at temperatures, for example, ranging from about 80 to 180° C. For example, temperature may be between 90 and 160° C., or 100 to 140° C.

The processes using the silica-based aerogel as described herein are also suitable for use in environments with low or high humidity. Low humidity in this instance means partial water vapor pressures of less than about 5 mb. At about 21° C., this corresponds to a relative humidity of around 20% or less. High humidity in this instance means partial water vapor pressures of more than about 5 mb. At about 21° C., this corresponds to a relative humidity of greater than about 20%. Relative humidity is defined as follows.

$$\text{Relative Humidity} = \frac{\text{Actual vapor pressure}}{\text{Saturated vapor pressure}} \times 100\%$$

Saturated vapor pressures for water are well known and change depending on the temperature (Donald Ahrens, 1994, *Meteorology Today—an introduction to weather, climate and the environment* Fifth Edition—West Publishing Co). As a consequence, the water vapor pressure will change with temperature for a given relative humidity. An illustration of this is provided below (http://ww2010.atmos.uiuc.edu/%28Gh%29/guides/mtr/cld/dvlp/rh.rxml, downloaded December 2014).

| Temperature (° C.) | 20% Relative Humidity Partial Water Vapor Pressure (mb) | 80% Relative Humidity Partial Water Vapor Pressure (mb) | 100% Relative Humidity Saturated Water Vapor Pressure (mb) |
|---|---|---|---|
| 10 | 2.5 | 9.8 | 12.3 |
| 15 | 3.4 | 13.6 | 17.1 |
| 20 | 4.7 | 18.7 | 23.4 |
| 25 | 6.3 | 25.4 | 31.7 |
| 30 | 8.5 | 34.0 | 42.5 |
| 35 | 11.3 | 45.0 | 56.3 |

While the process is effective for use in environments with low humidity, it is also effective at a higher humidity where other treatments may not be effective. In other words, one of the advantages of the present process and silica-based aerogel are that they can be used across a relatively broad application window (e.g. combination of broad parameters of temperature, pressure and humidity), and in particular across a broad humidity range, even though a further particular advantage is its use at higher humidity.

The process may, for example, be performed at a relative humidity of less than about 90%, 80%, 70%, 60%, 50%, 40%, 30%, 20%, 18%, 16%, 14%, 12%, 10%, 8%, 6%, 4%, or 2%. The process may be performed at a relative humidity of greater than about 1%, 2%, 4%, 6%, 8%, 10%, 12%, 14%, 16%, 18%, 20%, 30%, 40%, 50%, 60%, or 70%. The process may be performed at a relative humidity of between any two of these values, for example between about 1% and about 90%, about 2% and about 50%, about 70% and about 80%, about 1% and about 30%, or about 2% and about 5%. It will be appreciated that the relative humidity for a given partial water vapor pressure depends on temperature. The partial water vapor pressure and temperature are independent variables and relative humidity (RH) is a dependent variable although there is a constraint that the relative humidity cannot exceed 100% at any particular temperature. For example, any one or more of the above relative humidity values may be provided where the temperature is between about 10 to 45° C., between about 15 and 40° C., or between about 20 to 35° C. The above relative humidity values may for example be where the temperature is at value of about 15° C., 16° C., 17° C., 18° C., 19° C., 20° C., 21° C., 22° C., 23° C., 24° C., 25° C., 26° C. 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., or 45° C. The application window for the process as presently disclosed may be any combination of the above RH and temperature ranges or values. For example, the application window may be where the RH is between about 1% and about 80% and a temperature range between about 15° C. and about 40° C.

The humidity may be provided by a partial water vapour pressure (in mb) of less than about 60, 50, 40, 30, 20, 15, 14, 13, 12, 11, 10, 9, 8, 7, 6, 5, 4, 3, or 2. The humidity may be provided by a partial water vapour pressure (in mb) of more than about 1, 2, 3, 4, 5, 6, 7, 8, 9, 10, 11, 12, 13, 14, 15, 20, 30, 40, 50, 60. The humidity may be provided by a partial water vapour pressure (in mb) between any two of these values, for example between about 1 and about 50, such as about 2 and about 25, such about 3 and about 15, such as about 4 and about 10. The humidity may be provided by a given temperature according to a temperature value or range as described above, although it will be appreciated that the temperature values are such that the humidity does not exceed 100% relative humidity or its partial vapour pressure does not exceed its saturated vapour pressure. The relative humidity at a given temperature for any of these partial water vapour pressure values may for example be less than about 90%, 80%, 70%, 60%, 50%, 40%, 30%, or 20%.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

EXAMPLES

In order that the disclosure may be more clearly understood, particular embodiments of the invention are described in further detail below by reference to the following non-limiting experimental materials, methodologies and examples.

Example 1 Summary of Leading Silica-Based Aerogels and their Gelation Properties The inventors have developed induced microporous aerogels based on various silanes ($SiO_2$) and in various combinations thereof (Table 1) for the purpose of direct air capture (DAC) of $CO_2$, as well as their performance for 0.5%, 1% and 100% $CO_2$ concentrations. The induced microporous aerogels are selective for $CO_2$ adsorption at ambient conditions (298K and 0.4 mbar). The microporous aerogels were designed with the intent of the following advantageous properties: microporosity, hydrophobicity, $CO_2$ selectivity, ambient $CO_2$ conditions for capture and the ability for regeneration.

TABLE 1

Various silane ($SiO_2$) groups used in the preparation of silica-based aerogels

| Abbreviation | Name | Structure |
|---|---|---|
| TEOS | Tetraethyl orthosilicate | 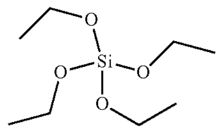 |
| APEMS | 3-Aminopropyl (diethoxy) methyl silane | 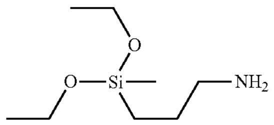 |
| APTES | 3-Aminopropyl (triethoxy) silane | 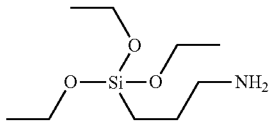 |

TABLE 1-continued

Various silane ($SiO_2$) groups used in the preparation of silica-based aerogels

| Abbreviation | Name | Structure |
|---|---|---|
| TEMS | Triethoxy methylsilane | 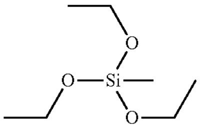 |
| TEES | Triethoxy(ethyl)silane | 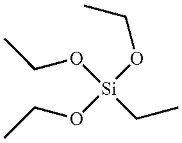 |
| DMDES | Dimethyldiethoxysilane | 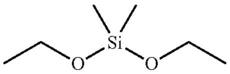 |

TABLE 2

A list of silica-based aerogels and their $CO_2$ uptake performance at 298K for 0.04% (Direct Air Capture 0.4 mbar), 0.5%, 1% and 100% $CO_2$ concentration

| | Composition $SiO_2$ Units (%) | | | | | | $CO_2$ Performance (Adsorption) (mmol/g) | | | |
|---|---|---|---|---|---|---|---|---|---|---|
| | | | | | | | DAC | | | |
| Candidate | APEMS | APTES | TEOS | TEMS | DMDES | TEES | 0.04% | 0.5% | 1% | 100% |
| A | 40 | | 20 | 40 | | | 0.75 | 1.31 | 1.41 | 2.04 |
| B | 40 | | 40 | 20 | | | 0.73 | 1.32 | 1.44 | 2.17 |
| C | 40 | | | 60 | | | 0.47 | 0.75 | 0.83 | 1.35 |
| D | | 60 | 20 | 20 | | | 0.47 | 0.71 | 0.79 | 1.47 |
| E | 40 | | 20 | | | 40 | 0.62 | 1.34 | 1.46 | 2.16 |
| F | 40 | | 20 | | 40 | | | 0.88 | 0.91 | 1.40 |
| G | 40 | | 20 | 20 | 20 | | | 1.24 | 1.37 | 1.91 |
| H | 60 | | 30 | | 10 | | | 1.39 | 1.49 | 1.72 |
| I | 40 | | 30 | | 30 | | | 0.98 | 1.16 | 1.78 |
| J | | 40 | 20 | 20 | 20 | | | 0.69 | 0.78 | 1.26 |
| K | 40 | | 20 | 20 | | 20 | 0.67 | 1.05 | 1.14 | 1.78 |
| L | 60 | | 20 | 20 | | | 0.63 | 1.31 | 1.42 | 2.02 |
| M | 60 | | 20 | 10 | | 10 | 0.62 | 1.44 | 1.56 | 2.15 |
| N | 50 | | 20 | 15 | | 15 | 0.84 | 1.24 | 1.39 | 2.02 |
| O | 50 | | 25 | 25 | | | 0.54 | 0.97 | 1.07 | 1.60 |
| P | 60 | | 40 | | | | 0.51 | 0.87 | 0.96 | 1.39 |
| Q | 60 | | 20 | | | 20 | 0.63 | 1.28 | 1.45 | 1.92 |
| R | 40 | | | 40 | | 20 | | 1.07 | 1.21 | 1.80 |
| TIFSIX | | | | | | | 0.555 | 1.057 | 1.142 | 1.58 |

* TIF-SIX (MOF) is included for comparison only

TABLE 3

Gelation properties for select silica-based aerogels

| Candidate | Level of gelation |
|---|---|
| A | High |
| B | High |
| C | Low/No - required addition water to initiate gelation |
| D | Medium - required freeze drying to initiate gelation |
| E | High |
| K | High |
| L | Medium/Low |
| M | Medium |
| N | Medium |
| O | Medium |
| P | Medium |
| Q | Medium |
| R | Low/No |
| S | Very low/No |
| T | Very low/No |

Example 2 General Process for the Preparation of Silica-Based Aerogels

All reagents were used as received without any purification. The remaining reagents were stored in an inert environment ($N_2$ filled glove bag) to avoid any hydrolysis of silanes.

A combination of any two of more of an amino substituted silane, an alkyl substituted silane, and a silicate may be added to an aqueous solution of ethanol and water. The aqueous solution comprising the silanes may be mixed to form a wet-gel matrix. A buffer (e.g. $NH_3$, $NH_4HCO_3$) or acid (e.g. HCl acid solution) may optionally be added to the wet gel matrix, and optionally followed by addition of a basic solution (e.g. NaOH solution). The wet-gel matrix may then be rinsed/soaked with water, and optionally heated at a slightly elevated temperature. The aqueous solution comprising the wet-gel matrix may be dried using a drying method to provide a dried silica-based aerogel.

Example 2a—Candidate A (i) To 3.6 mL of AR Grade ethanol is added the following: 8 mmoles (1.672 mL, 1.531 g) of 3-aminopropyl(diethyoxy) methylsilane (APEMS), 8 mmoles (1.594 mL, 1.426 g) of triethyoxy methylsilane (TEMS) and 4 mmoles (0.892 mL, 0.833 g) of triethyl orthosilicate (TEOS). Upon each addition the solution was manually swirled for 1 second to combine. To the combined solutions, 0.600 mL of water was added, the solution swirled to mix and the sealed container heated at 80° C. for 6 hours in an oven to form a gel. The sample was allowed to cool to room temperature overnight. The gel was then broken up into 10 mL of water and filtered through a porous frit. The gel was further soaked during multiple water rinses for 2 hours. The gel was then dried in a vacuum oven at ~50° C. overnight.

(ii) To 3.6 mL of AR Grade ethanol is added the following: 8 mmoles (1.672, 1.531 g) of 3-aminopropyl(diethyoxy) methylsilane (APEMS), 8 mmoles (1.594 mL, 1.426 g) of triethyoxy methylsilane (TEMS) and 4 mmoles (0.892 mL, 0.833 g) of triethyl orthosilicate (TEOS). Upon each addition the solution was manually swirled for 1 second to combine. To the combined solutions, 1.00 mL of 2M HCl was added, the solution swirled to mix and the sealed container heated at 60° C. overnight. The liquid was allowed to cool to room temperature and 1.00 mL of 2M NaOH was added, the solution swirled to mix and the sealed container heated at 60° C. overnight to form a gel. The gel was then broken up into 10 mL of water and filtered through a porous frit. The gel was further soaked during multiple water rinses for 2 hours. The gel was then dried in a vacuum oven at ~50° C. overnight.

(iii) To 3.6 mL of AR Grade ethanol is added the following: 8 mmoles (1.672, 1.531 g) of 3-aminopropyl(diethyoxy) methylsilane (APEMS), 8 mmoles (1.594 mL, 1.426 g) of triethyoxy methylsilane (TEMS) and 4 mmoles (0.892 mL, 0.833 g) of triethyl orthosilicate (TEOS). Upon each addition the solution was manually swirled for 1 second to combine. To the combined solutions, 0.600 mL of 2M $NH_3$ (aq) was added, the solution swirled to mix and the sealed container heated at 80° C. for 6 hours in an oven to form a gel. The sample was allowed to cool to room temperature overnight. The gel was then broken up into 10 mL of water and filtered through a porous frit. The gel was further soaked during multiple water rinses for 2 hours. The gel was then dried in a vacuum oven at ~50° C. overnight.

Example 2b—Candidate B

To 3.6 mL of AR Grade ethanol is added the following: 8 mmoles (1.672 mL, 1.531 g) of 3-aminopropyl(diethyoxy) methylsilane (APEMS), 4 mmoles (0.797 mL, 0.713 g) of triethyoxy methylsilane (TEMS) and 8 mmoles (1.784 mL, 1.667 g) of triethyl orthosilicate (TEOS). Upon each addition the solution was manually swirled for 1 second to combine. To the combined solutions, 0.600 mL of water was added, the solution swirled to mix and the sealed container heated at 80° C. for 6 hours in an oven to form a gel. The sample was allowed to cool to room temperature overnight. The gel was then broken up into 10 mL of water and filtered through a porous frit. The gel was further soaked during multiple water rinses for 2 hours. The gel was then dried in a vacuum oven at ~50° C. overnight.

Example 2c—Candidate C (i) To 4.0 mL of AR Grade ethanol is added the following: 8 mmoles (1.672 mL, 1.531 g) of 3-aminopropyl(diethyoxy) methylsilane (APEMS), 12 mmoles (2.297 mL, 2.139 g) of triethyoxy methylsilane (TEMS). 1.5 mL of water and 0.80 mL (~8 mmoles) of 32% hydrochloric acid were added. Upon each addition the solution was manually swirled for 1 second to combine. The combined solution remained at room temperature overnight. Solid NaOH (0.425 g, 10.6 mmoles) was added, the following day turning the solution cloudy, and 1.0 mL of water was added producing a clear solution. After 5 days the sediment was collected by centrifuge (5000 rpm) and rinsed in 10 mL of water, repeated five times. Gel was then dried in a vacuum oven at ~50° C. overnight.

(ii) To 3.6 mL of AR Grade ethanol is added the following: 8 mmoles (1.672 mL, 1.531 g) of 3-aminopropyl (diethyoxy)methylsilane (APEMS), and 12 mmoles (2.403 mL, 2.139 g) of triethyoxy methylsilane (TEMS). Upon each addition the solution was manually swirled for 1 second to combine. To the combined solutions, 0.600 mL of water was added, the solution swirled to mix and the sealed container heated at 80° C. for 6 hours in an oven to age. The aged solution was allowed to cool to room temperature. Then 20 mL of water was added allowing the gel to form. This product was filtered through a porous frit. The gel was further soaked during multiple water rinses for 2 hours. The gel was then dried in a vacuum oven at ~50° C. overnight.

(iii) To 4.5 mL of AR Grade ethanol is added the following: 20 mmoles (4.178 mL, 3.827 g) of 3-aminopropyl (diethyoxy)methylsilane (APEMS), 30 mmoles (5.977 mL, 5.349 g) of triethyoxy methylsilane (TEMS). 1.5 mL of water. Upon each addition the solution was manually swirled for 1 second to combine. The combined solution was heated at 60° C. overnight. The solution remained clear, and 20 mL of water was added turning the solution cloudy and was again heated at 60° C. overnight. The gel formed was then washed in at least 10 times excess water repeated three times. Gel was then dried in a vacuum oven at ~50° C. overnight.

Example 2d—Candidate D

To 3.6 mL of AR Grade ethanol is added the following: 12 mmoles (2.808 mL, 2.656 g) of 3-aminopropyl(triethyoxy) silane (APTES), 4 mmoles (0.797 mL, 0.713 g) of triethyoxy methylsilane (TEMS) and 4 mmoles (0.892 mL, 0.833 g) of triethyl orthosilicate (TEOS). Upon each addition the solution was manually swirled for 1 second to combine. 0.600 mL of water was added, the solution swirled to mix and the sealed container heated at 80° C. for 6 hours in an oven. The sample was allowed to cool to room temperature overnight. The gel was then broken up into 10 mL of water and filtered through a porous frit. The gel was further soaked during multiple water rinses for 2 hours. The gel was then dried in a freeze dryer overnight.

The gel was broken up into 10 mL of water and soaked for an hour, then allowed to settle and the water was decanted. This was repeated five times. The solid was finally collected by addition of ~50 mL of water and the total amount was freeze dried.

Example 2e—Candidate E

To 3.6 mL of AR Grade ethanol is added the following: 8 mmoles (1.672 mL, 1.5321 g) of 3-aminopropyl(diethyoxy) methylsilane (APEMS), 8 mmoles (1.720 mL) of triethoxy (ethyl)silane (TEES) and 4 mmoles (0.892 mL, 0.833 g) of triethyl orthosilicate (TEOS). Upon each addition the solution was manually swirled for 1 second to form a homogeneous solution. To this solution, 0.6 mL of water is added, and then incubated at 80° C. for 6 hours. The gel formed is broken up and rinsed in an excess of water and collected by filtration. Gel was dried in an oven at 55° C. at reduced pressure.

Example 2f—Candidate J

To 3.6 mL of AR Grade ethanol is added the following: 8 mmoles (1.39 mL, 1.43 g) of 3-aminopropyl(triethyoxy) silane(APTES), 4 mmoles (0.797 mL, 0.713 g) of triethyoxy methylsilane (TEMS), 4 mmoles (0.892 mL, 0.833 g) of triethyl orthosilicate (TEOS) and 4 mmoles (0.593 g, 0.685 mL) dimethyldiethoxysilane. Upon each addition the solution was manually swirled for 1 second to combine. 0.600 mL of water was added, the solution swirled to mix and the sealed container heated at 80° C. for 6 hours in an oven. The sample was allowed to cool to room temperature overnight. The gel was then broken up into 10 mL of water and filtered through a porous frit. The gel was further soaked during multiple water rinses for 2 hours. The gel was then dried in a freeze dryer overnight.

Example 2g—Candidate K

To 3.6 mL of AR Grade ethanol is added the following: 8 mmoles (1.672 mL, 1.5321 g) of 3-aminopropyl(diethyoxy) methylsilane (APEMS), 4 mmoles (0.797 mL, 0.713 g) of triethyoxy methylsilane (TEMS), 4 mmol (0.860 mL) of TEES, 4 mmoles (0.892 mL, 0.833 g) of triethyl orthosilicate (TEOS). Upon each addition the solution was manually swirled for 1 second to form a homogeneous solution. To this is added 0.6 mL of water, and then incubated at 80° C. for 6 hours. The gel formed is broken up and rinsed in an excess of water and collected by filtration. Gel was dried in an oven at 55° C. at reduced pressure (−80 kPa).

Example 2h—Candidate L

To 3.6 mL of AR Grade ethanol is added the following: 12 mmoles (2.507 mL, 2.296 g) of 3-aminopropyl(diethyoxy) methylsilane (APEMS), 4 mmoles (0.801 mL, 0.713 g) of triethyoxy methylsilane (TEMS) and 4 mmoles (0.887 mL, 0.833 g) of triethyl orthosilicate (TEOS). Upon each addition the solution was manually swirled for 1 second to combine. To the combined solutions, 0.600 mL of water was added, the solution swirled to mix and the sealed container heated at 80° C. for 6 hours in an oven to form a gel. The sample was allowed to cool to room temperature overnight. The gel was then broken up with 10 mL of water and then shaken for around 2 hours at 80 rpm. Later it was then filtered through a porous frit. The gel was further washed with water and shaken at 60 ppm for around 2 hours, and filtered through the frit. Repeat these washing procedure for three times. The gel was then dried in a vacuum oven at ~50° C. overnight or at room temperature in a fumehood until fully dried.

Example 2i—Candidate M

To 3.6 mL of AR Grade ethanol is added the following: 12 mmoles (2.507 mL, 2.296) of 3-aminopropyl(diethyoxy) methylsilane (APEMS), 2 mmoles (0.401 mL, 0.356 g) of triethyoxy methylsilane (TEMS), 2 mmoles (0.430 mL, 0.385 g) of triethoxy(ethyl)silane (TEES) and 4 mmoles (0.887 mL, 0.833 g) of triethyl orthosilicate (TEOS). Upon each addition the solution was manually swirled for 1 second to combine. To the combined solutions, 0.600 mL of water was added, the solution swirled to mix and the sealed container heated at 80° C. for 6 hours in an oven to form a gel. The sample was allowed to cool to room temperature. The gel was then broken up using 10 mL of water and then shaken for around 2 hours at 80 rpm. Later it was then filtered through a porous frit. The gel was further washed with water and shaken at 60 ppm for around 2 hours, and filtered through the frit. Repeat these washing procedure for three times. The gel was then dried in a vacuum oven at ~50° C. overnight or at room temperature in a fumehood until fully dried.

Example 2j—Candidate N

To 3.6 mL of AR Grade ethanol is added the following: 10 mmoles (2.089 mL, 1.913) of 3-aminopropyl(diethyoxy) methylsilane (APEMS), 3 mmoles (0.601 mL, 0.535 g) of triethyoxy methylsilane (TEMS), 3 mmoles (0.645 mL, 0.577 g) of triethoxy(ethyl)silane (TEES) and 4 mmoles (0.887 mL, 0.833 g) of triethyl orthosilicate (TEOS). Upon each addition the solution was manually swirled for 1 second to combine. To the combined solutions, 0.600 mL of water was added, the solution swirled to mix and the sealed container heated at 80° C. for 6 hours in an oven to form a gel. The sample was allowed to cool to room temperature. The gel is broken up and rinsed in an excess of water for three times and collected by filtration. The gel was then dried in a vacuum oven at ~50° C. overnight.

Example 2k—Candidate O

To 3.6 mL of AR Grade ethanol is added the following: 10 mmoles (2.089 mL, 1.913) of 3-aminopropyl(diethyoxy) methylsilane (APEMS), 5 mmoles (1.001 mL, 0.891 g) of triethyoxy methylsilane (TEMS), and 5 mmoles (1.108 mL, 1.042 g) of triethyl orthosilicate (TEOS). Upon each addition the solution was manually swirled for 1 second to combine. To the combined solutions, 0.600 mL of water was added, the solution swirled to mix and the sealed container heated at 80° C. for 6 hours in an oven to form a gel. The sample was allowed to cool to room temperature. The gel is broken up and rinsed in an excess of water for three times and collected by filtration. The gel was then dried in a vacuum oven at ~50° C. overnight.

Example 2l—Candidate P

To 3.6 mL of AR Grade ethanol is added the following: 12 mmoles (2.507 mL, 2.296) of 3-aminopropyl(diethyoxy) methylsilane (APEMS), and 8 mmoles (1.773 mL, 1.667 g) of triethyl orthosilicate (TEOS). Upon each addition the solution was manually swirled for 1 second to combine. To the combined solutions, 0.600 mL of water was added, the solution swirled to mix and the sealed container heated at 80° C. for 6 hours in an oven to form a gel. The sample was allowed to cool to room temperature overnight. The gel was then broken up using 10 mL of water and then shaken for around 2 hours at 80 rpm. Later it was then filtered through a porous frit. The gel was further washed with water and shaken at 60 ppm for around 2 hours, and filter through the frit. Repeat these washing procedure for three times. The gel was then dried in a vacuum oven at ~50° C. overnight or at room temperature in a fumehood until fully dried.

Example 2m—Candidate Q

To 3.6 mL of AR Grade ethanol is added the following: 12 mmoles (2.507 mL, 2.296) of 3-aminopropyl(diethyoxy) methylsilane (APEMS), 4 mmoles (0.860 mL, 0.769 g) of triethoxy(ethyl)silane (TEES) and 4 mmoles (0.887 mL, 0.833 g) of triethyl orthosilicate (TEOS). Upon each addition the solution was manually swirled for 1 second to combine. To the combined solutions, 0.600 mL of water was added, the solution swirled to mix and the sealed container heated at 80° C. for 6 hours in an oven to form a gel. The sample was allowed to cool to room temperature. The gel was then broken up using 10 mL of water and then shaken for around 2 hours at 80 rpm. Later it was then filtered through a porous frit. The gel was further washed with water and shaken at 60 ppm for around 2 hours, and filtered through the frit. Repeat these washing procedure for three times. The gel was then dried in a vacuum oven at ~50° C. overnight or at room temperature in a fumehood until fully dried.

Example 3 Performance and Characterisation Data

Figure 1B:
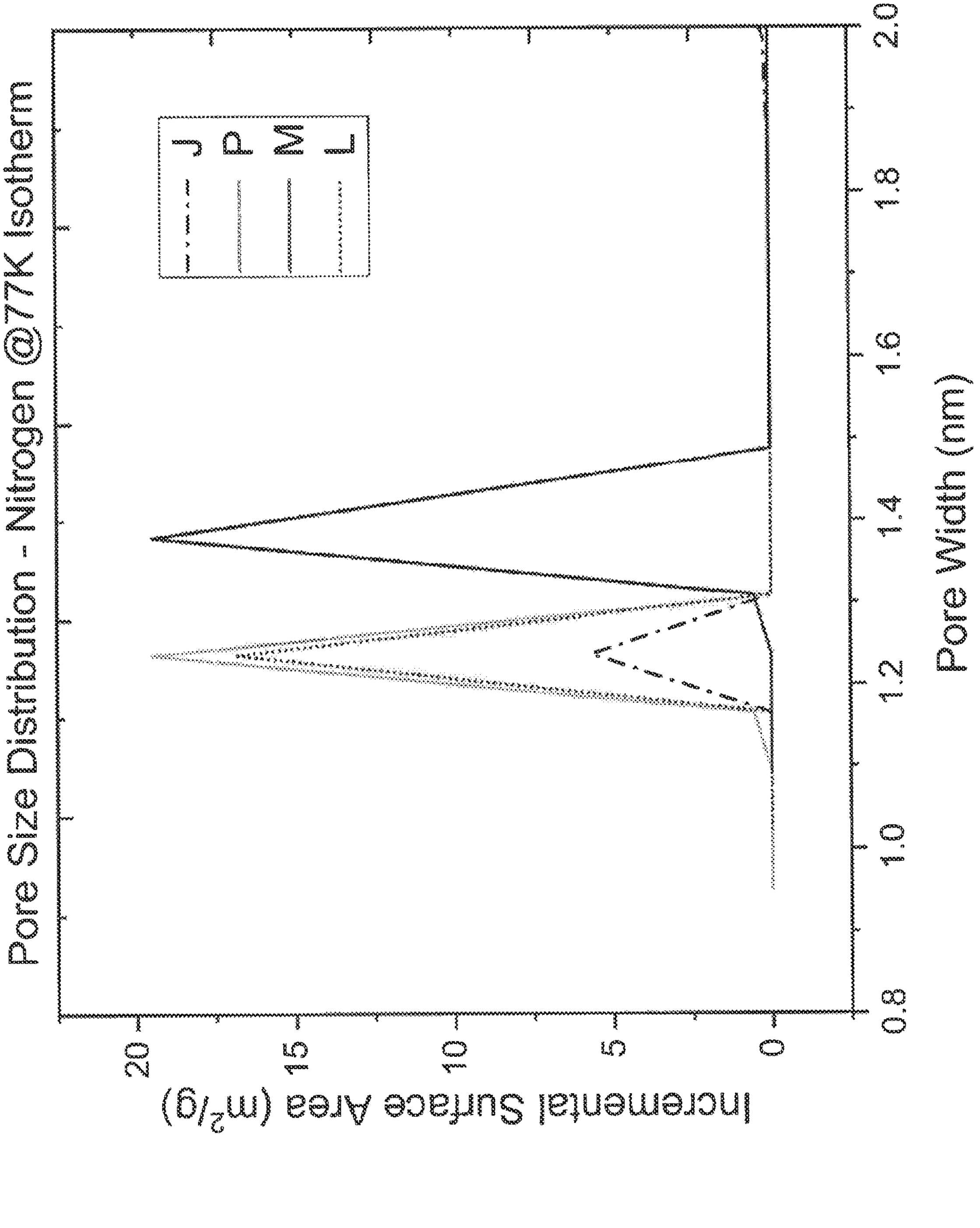
Figure 1C:
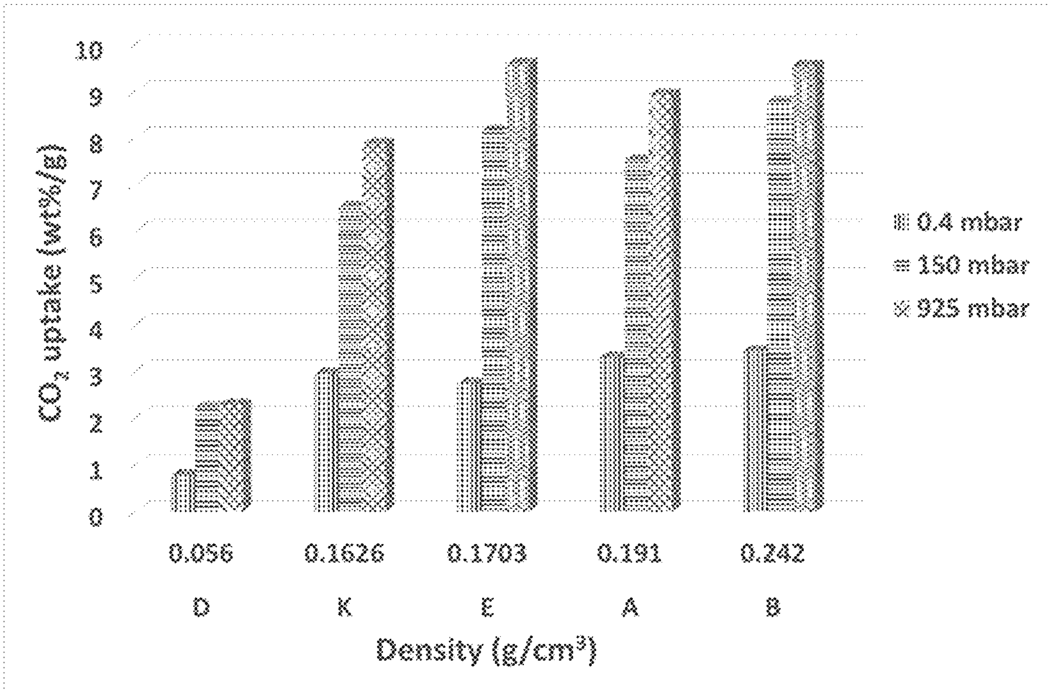
Figure 1D:
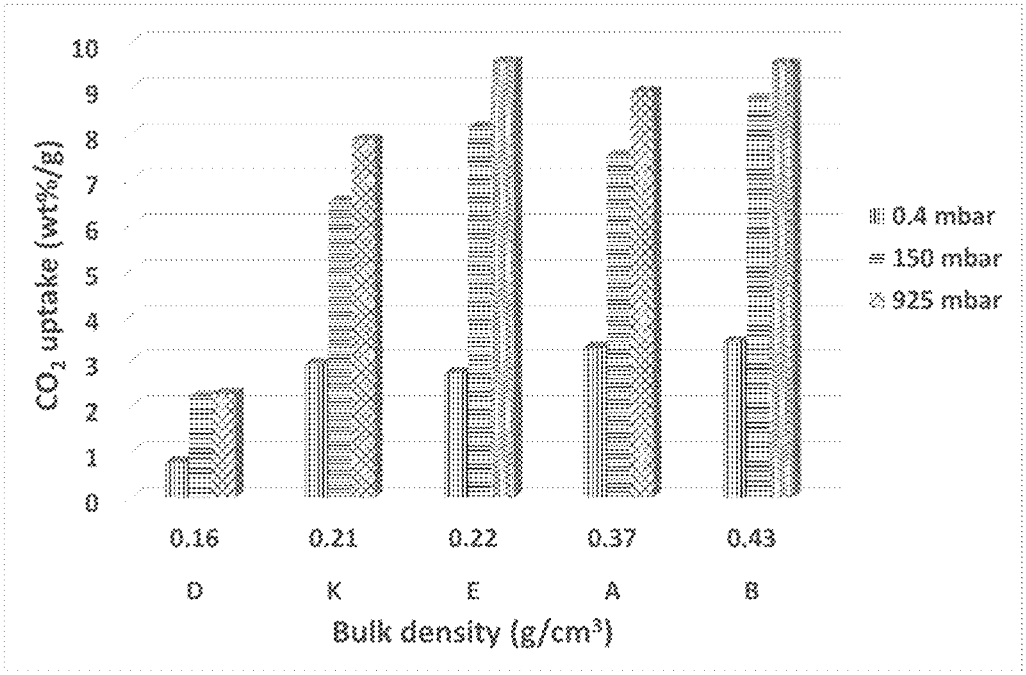
Figure 2:
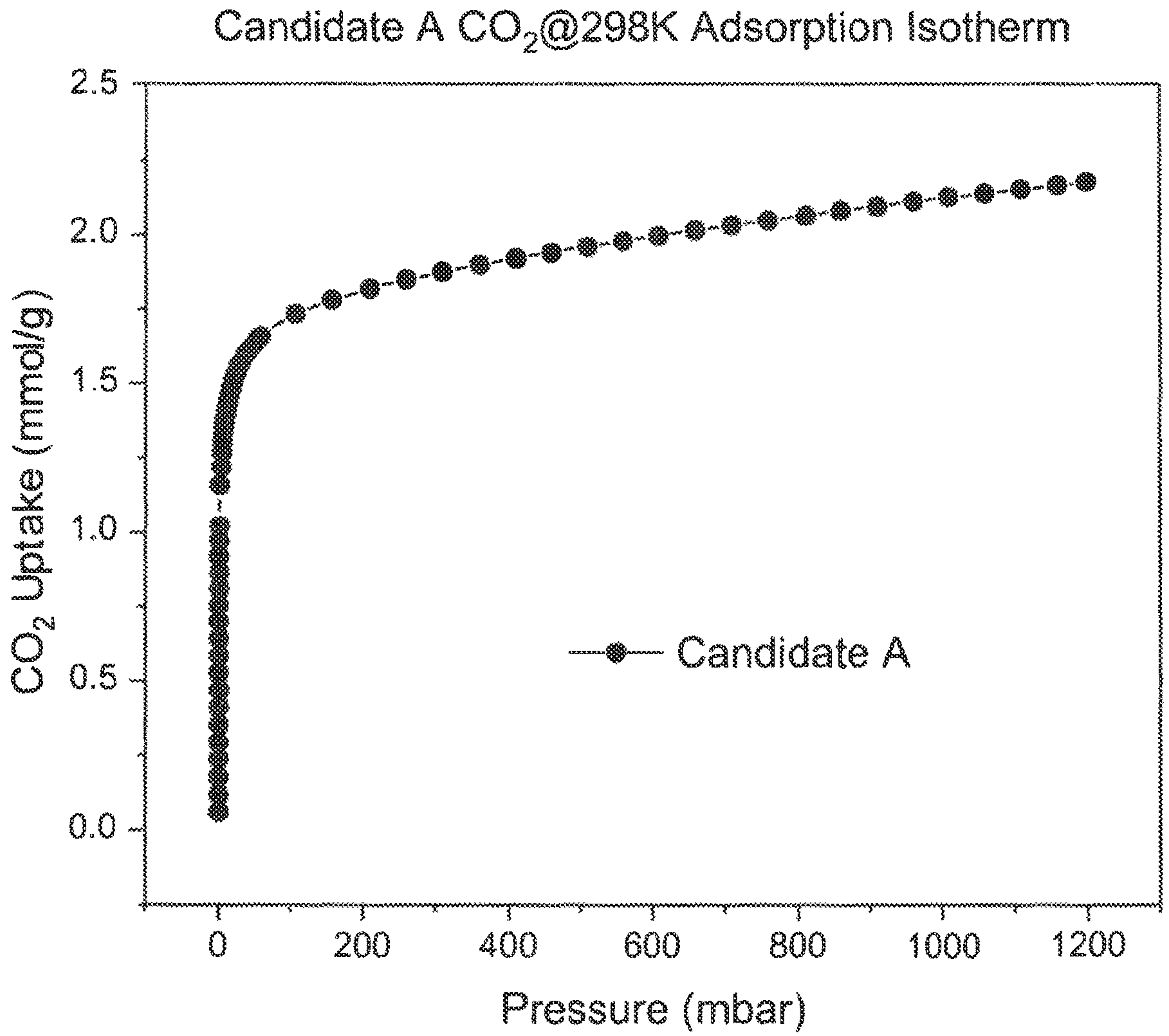
FIG. 2 shows a graph of a full $CO_2$ adsorption isotherm at 298K for the silica-based aerogel Candidate A. Important attributes of the isotherm are at the low-pressure uptake (<1 mbar). This is where direct air capture will occur, and the step uptake presented in the isotherm is an indication of a microporous material.
Figure 3:
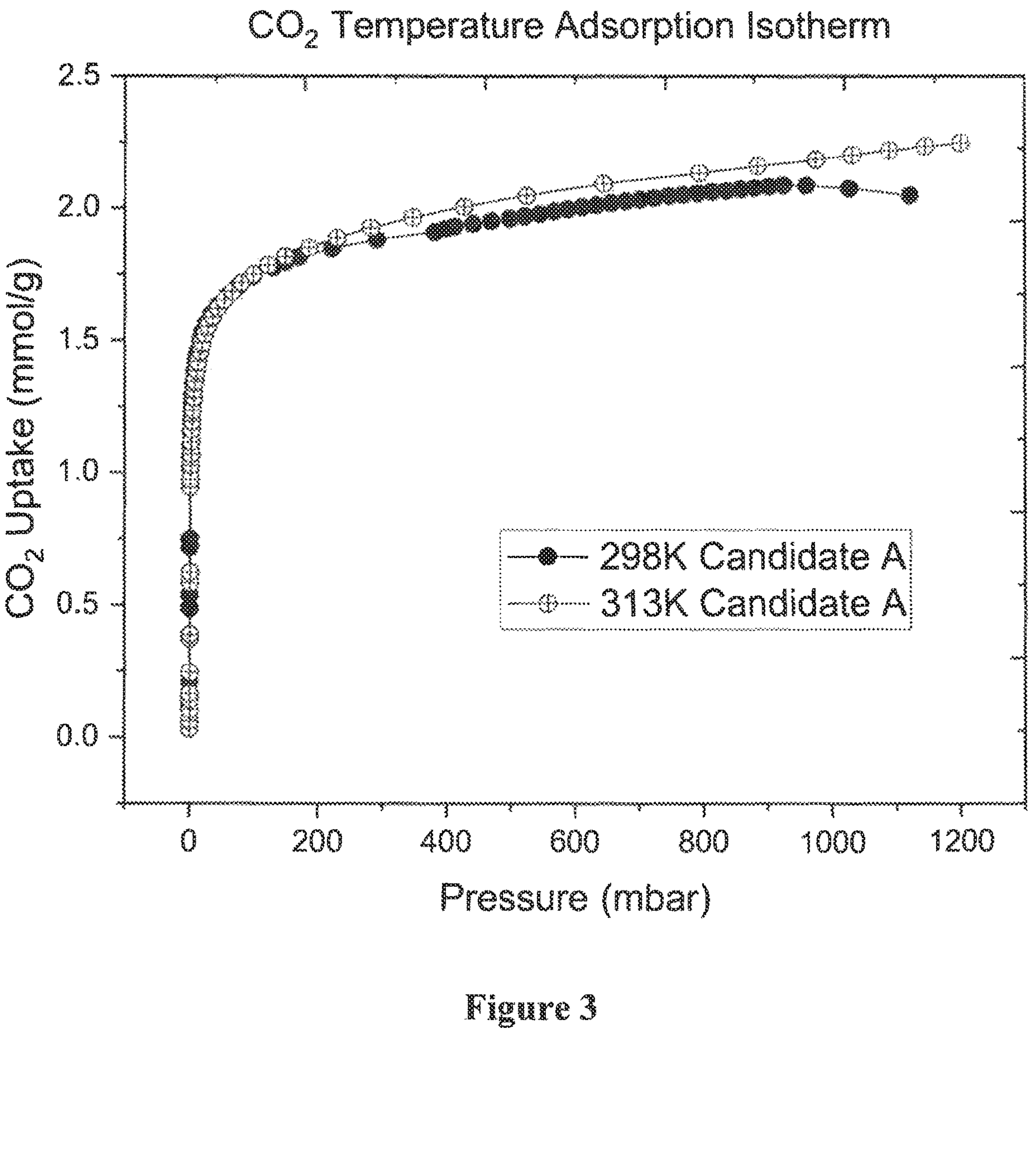
FIG. 3 shows a graph of a full $CO_2$ adsorption isotherm for the silica-based aerogel Candidate A operating at two temperatures, 313K and 298K. Candidate A can capture $CO_2$ at a higher temperature, increasing the material's operating conditions.
Figure 4:
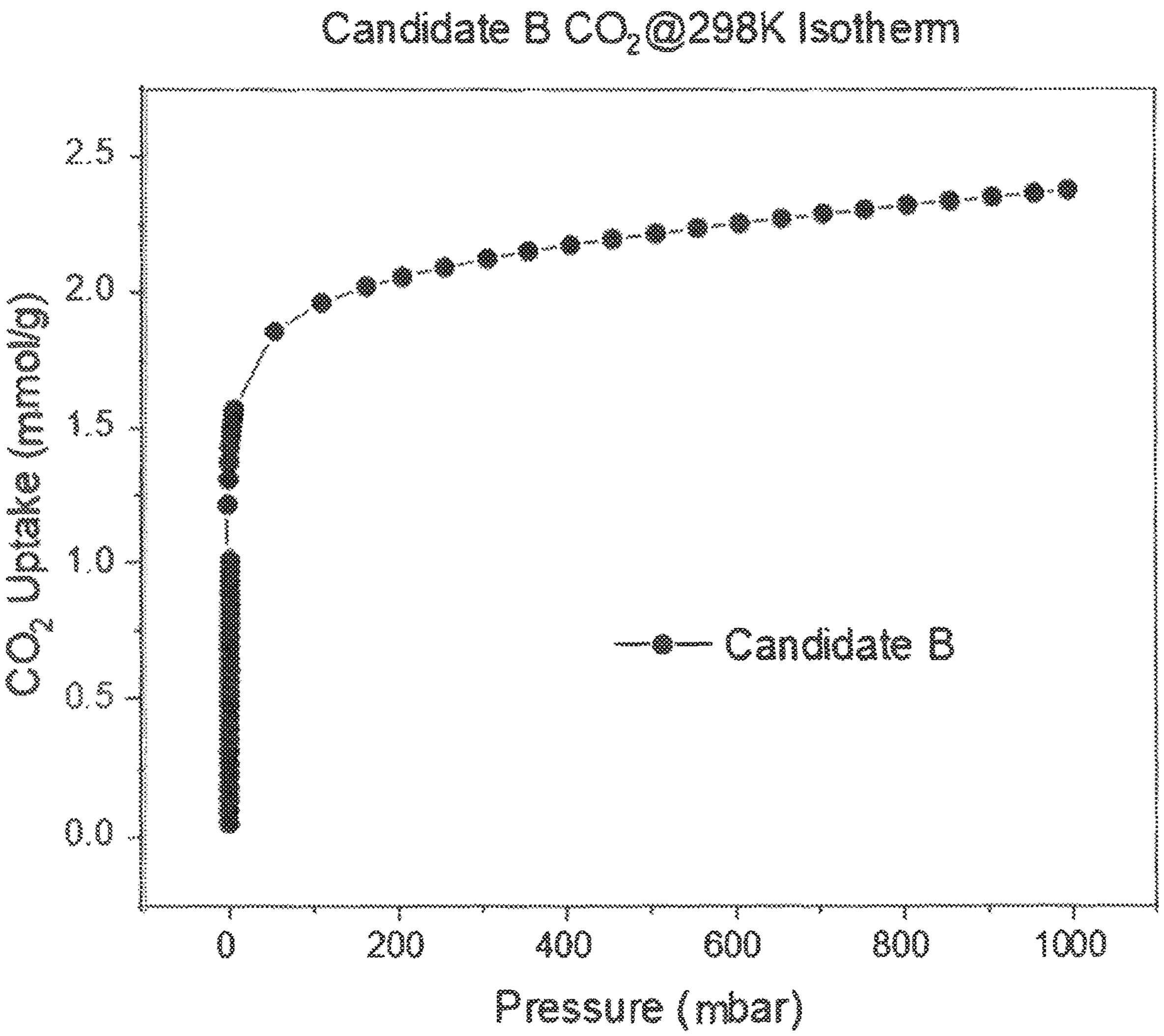
FIG. 4 shows a graph of a full $CO_2$ adsorption isotherm at 298K for the silica-based aerogel Candidate B. Important attributes of the isotherm are at the low-pressure uptake (<1 mbar). This is where direct air capture will occur, and the step uptake presented in the isotherm is an indication of a microporous material.
Figure 5:
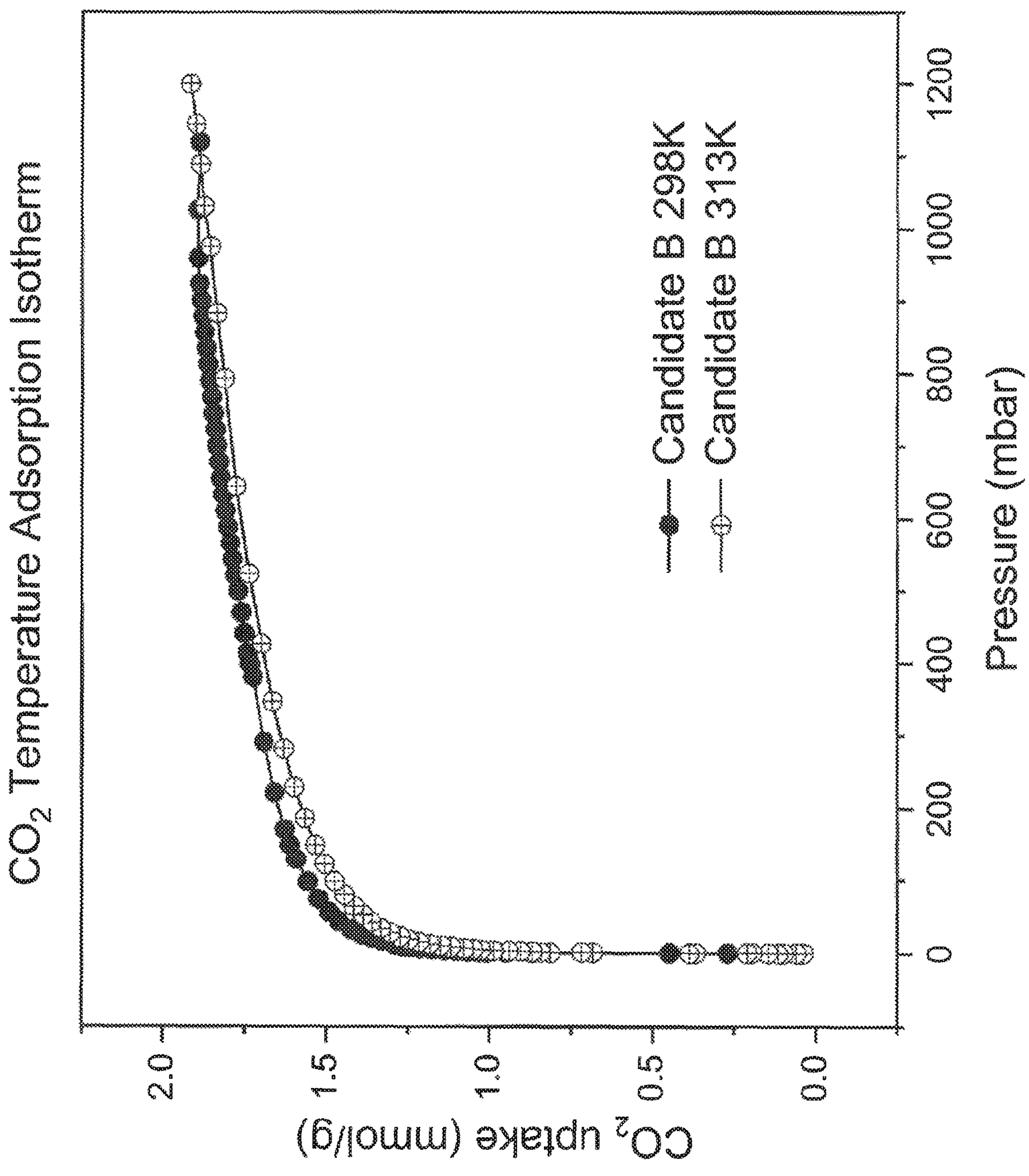
FIG. 5 shows a graph of a full $CO_2$ adsorption isotherm for the silica-based aerogel Candidate B operating at two temperatures, 313K and 298K. Candidate B can capture $CO_2$ at a higher temperature, increasing the materials operating conditions.
Figure 6:
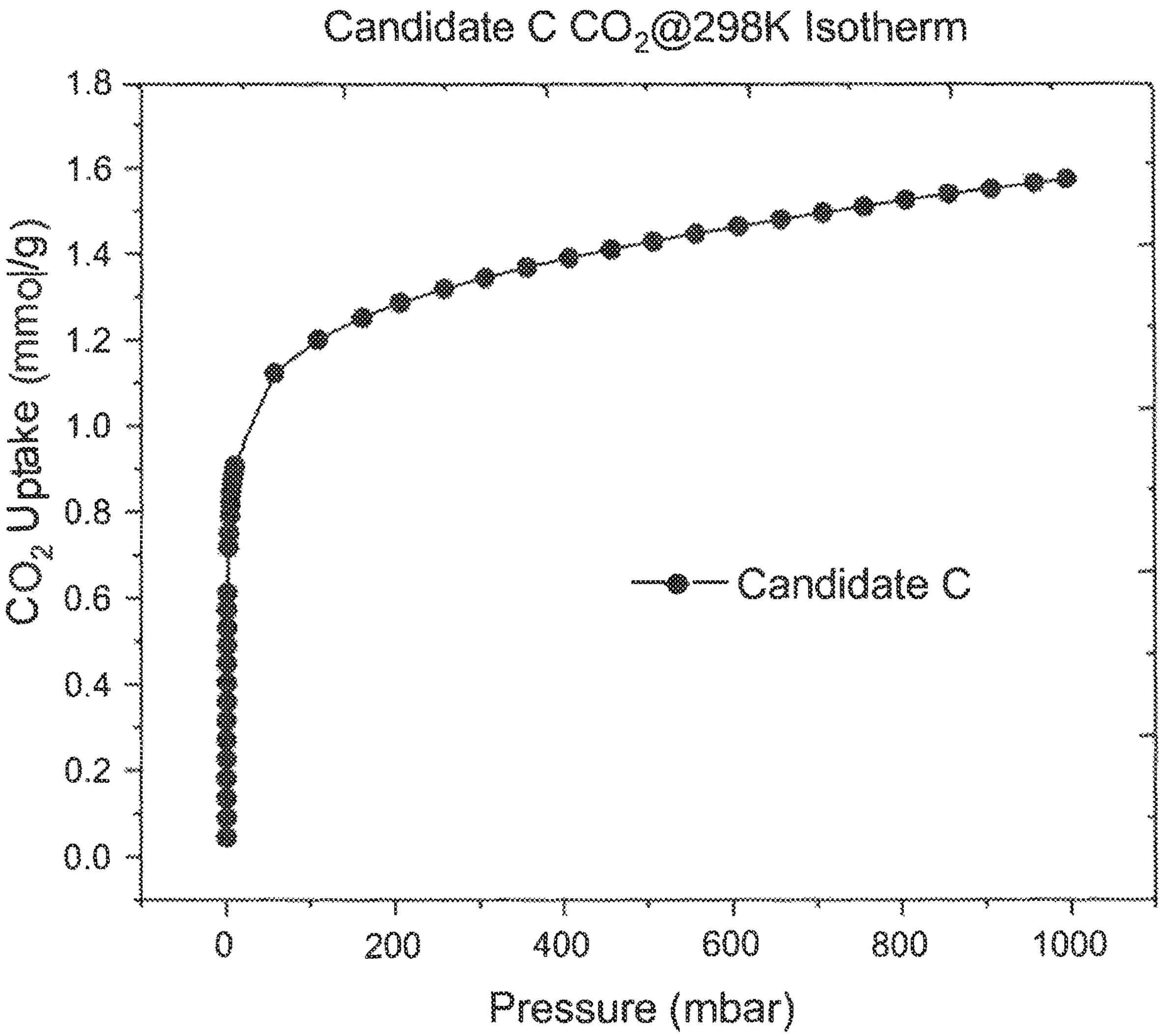
FIG. 6 shows a graph of a full $CO_2$ adsorption isotherm at 298K for the silica-based aerogel Candidate C.
Figure 7:
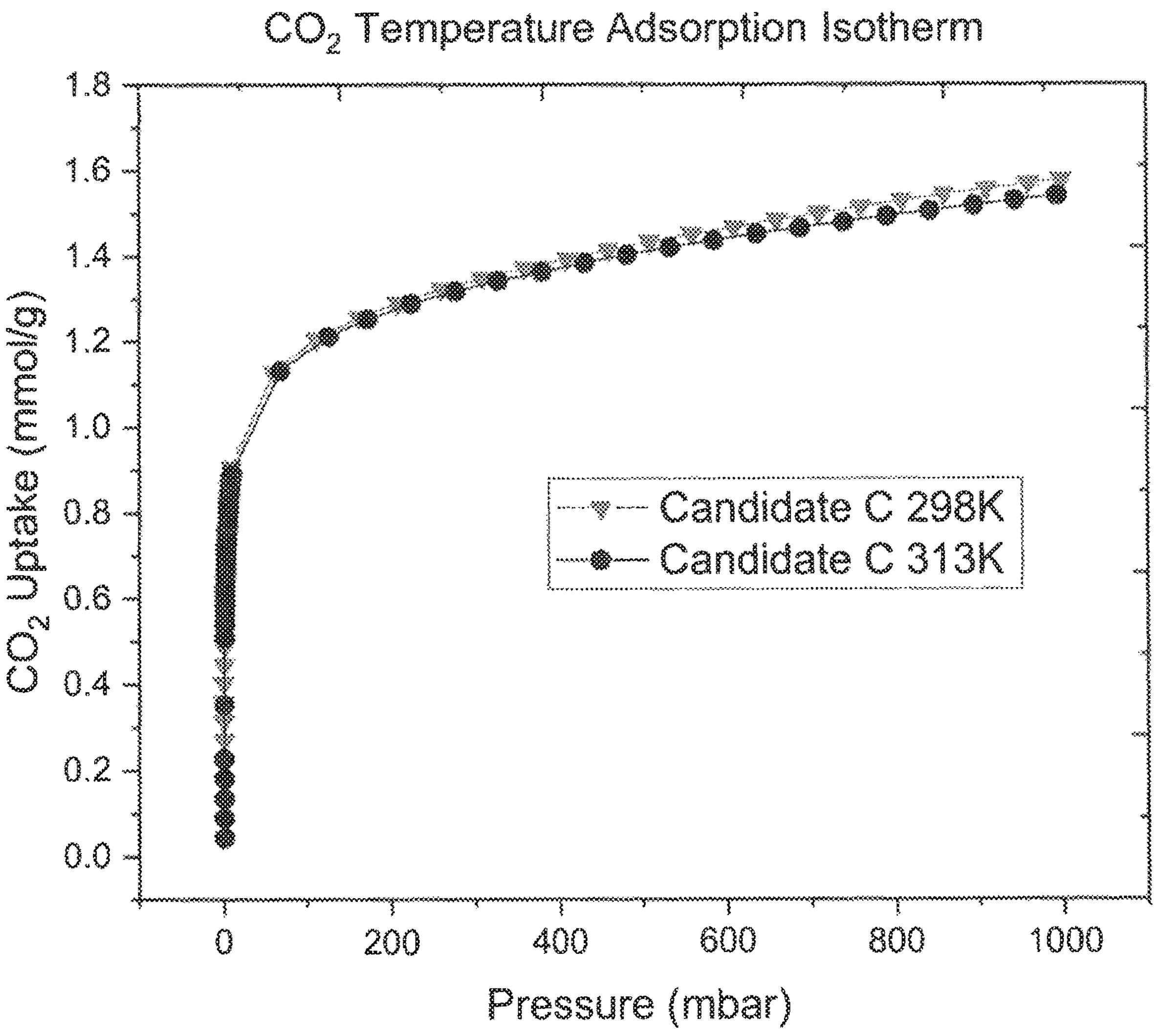
FIG. 7 shows a graph of a full $CO_2$ adsorption isotherm for the silica-based aerogel Candidate C operating at two temperatures, 313K and 298K. Candidate C can capture $CO_2$ at a higher temperature, increasing the materials operating conditions.
Figure 8:
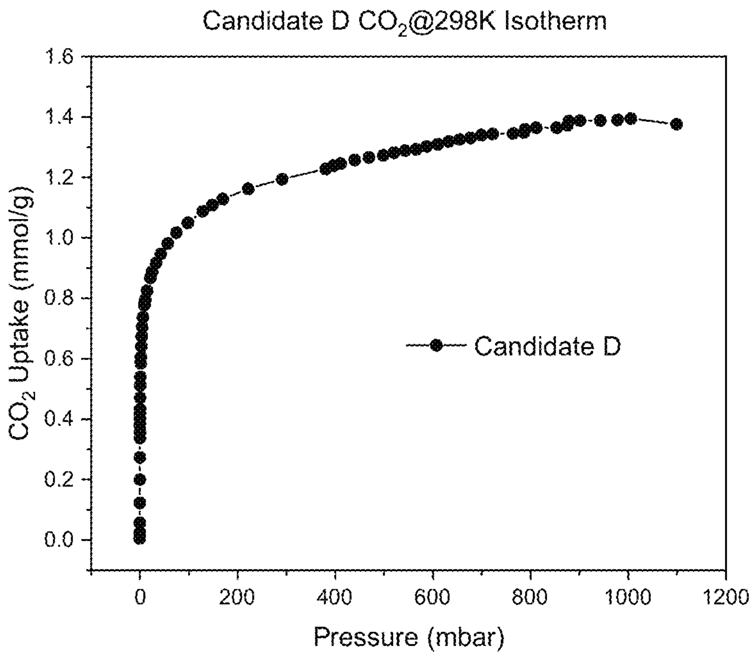
FIG. 8 shows a graph of a full $CO_2$ adsorption isotherm at 298K for the silica-based aerogel Candidate D.
Figure 9:
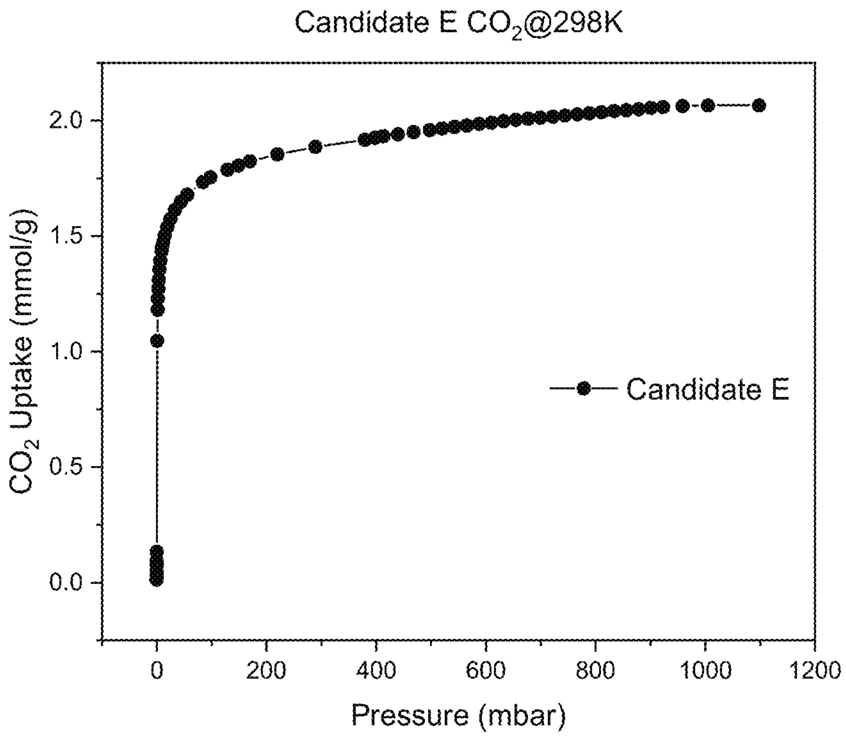
FIG. 9 shows a graph of a full $CO_2$ adsorption isotherm at 298K for the silica-based aerogel Candidate E.
Figure 10:
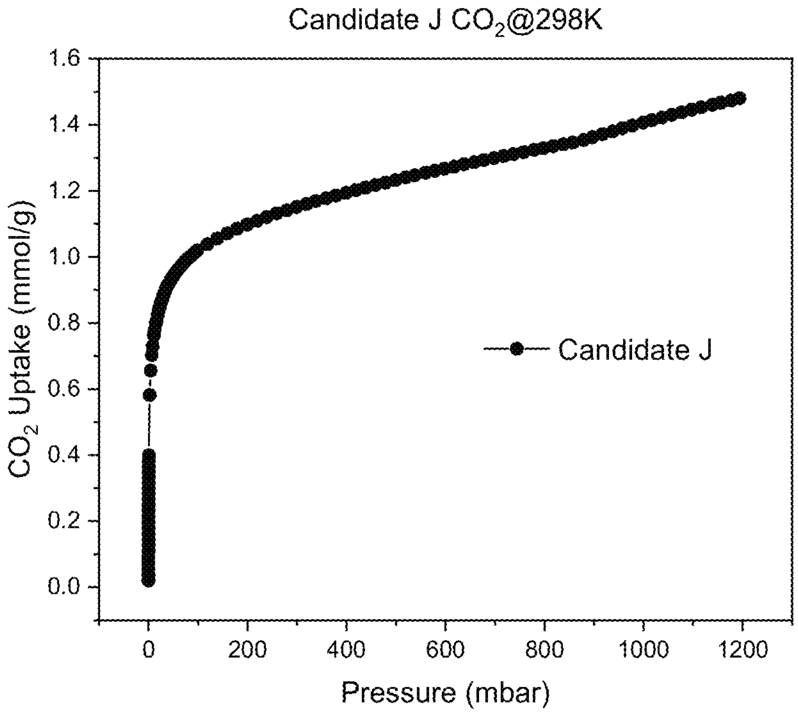
FIG. 10 shows a graph of a full $CO_2$ adsorption isotherm at 298K for the silica-based aerogel Candidate J.
Figure 11:
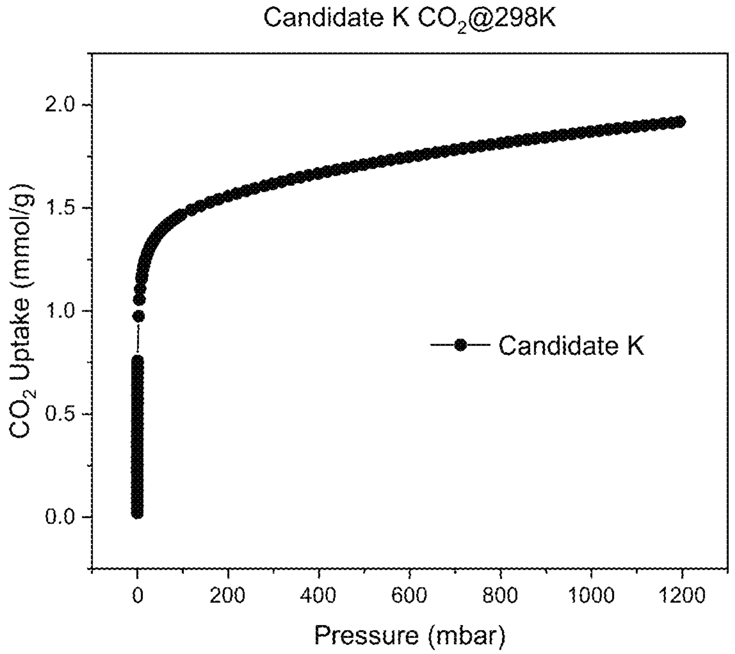
FIG. 11 shows a graph of a full $CO_2$ adsorption isotherm at 298K for the silica-based aerogel Candidate K.
Figure 12:
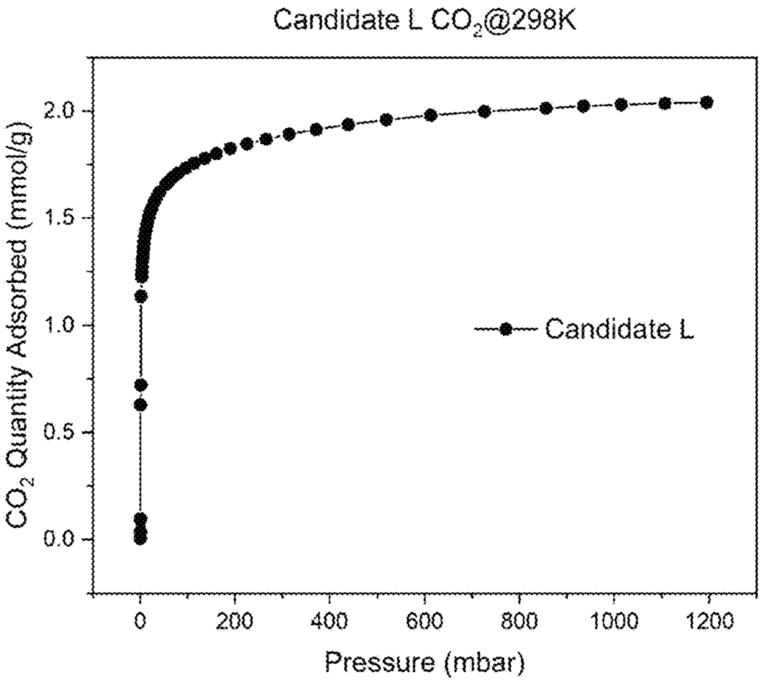
FIG. 12 shows a graph of a full $CO_2$ adsorption isotherm at 298K for the silica-based aerogel Candidate L.
Figure 13:
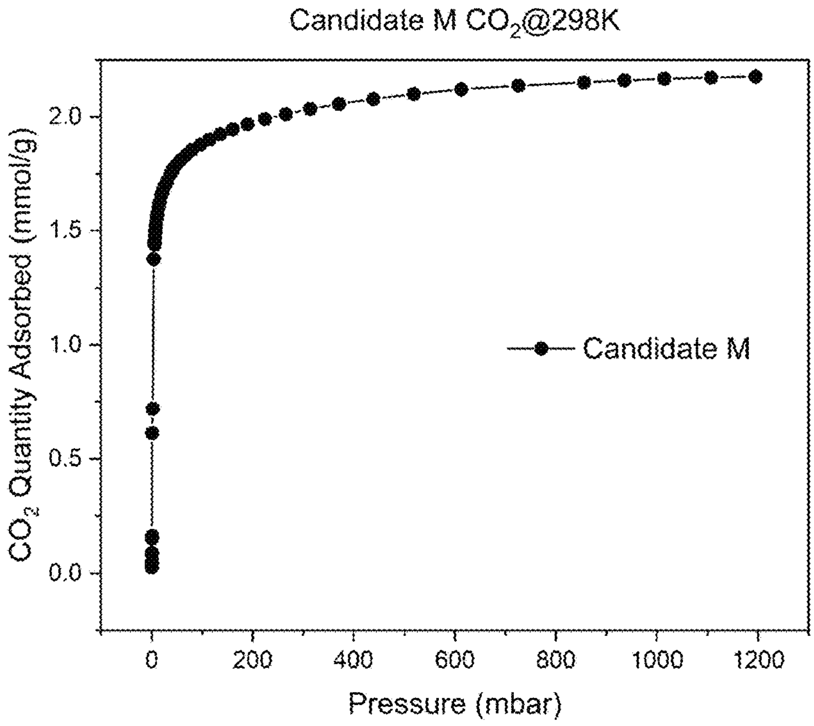
FIG. 13 shows a graph of a full $CO_2$ adsorption isotherm at 298K for the silica-based aerogel Candidate M.
Figure 14:
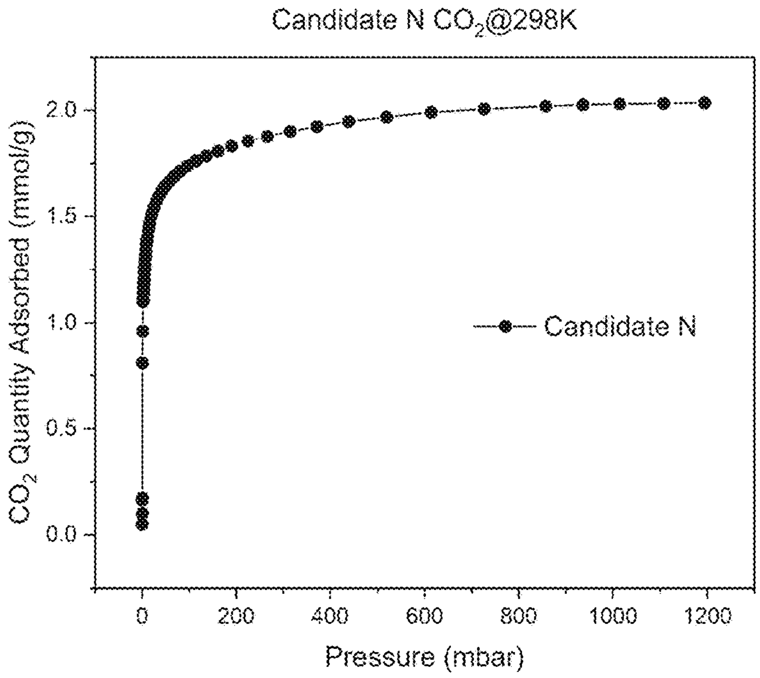
FIG. 14 shows a graph of a full $CO_2$ adsorption isotherm at 298K for the silica-based aerogel Candidate N.
Figure 15:
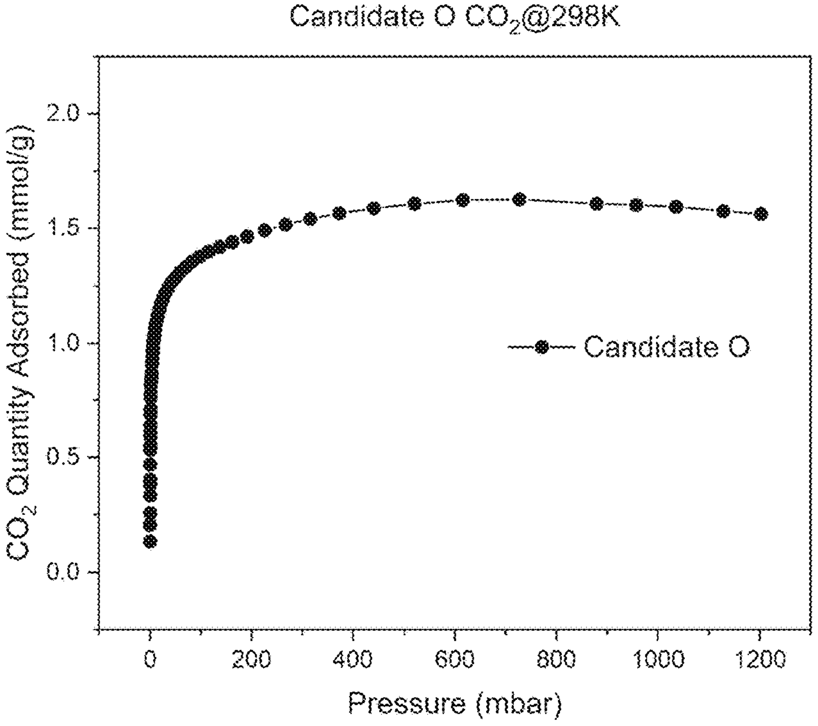
FIG. 15 shows a graph of a full $CO_2$ adsorption isotherm at 298K for the silica-based aerogel Candidate O.
Figure 16:
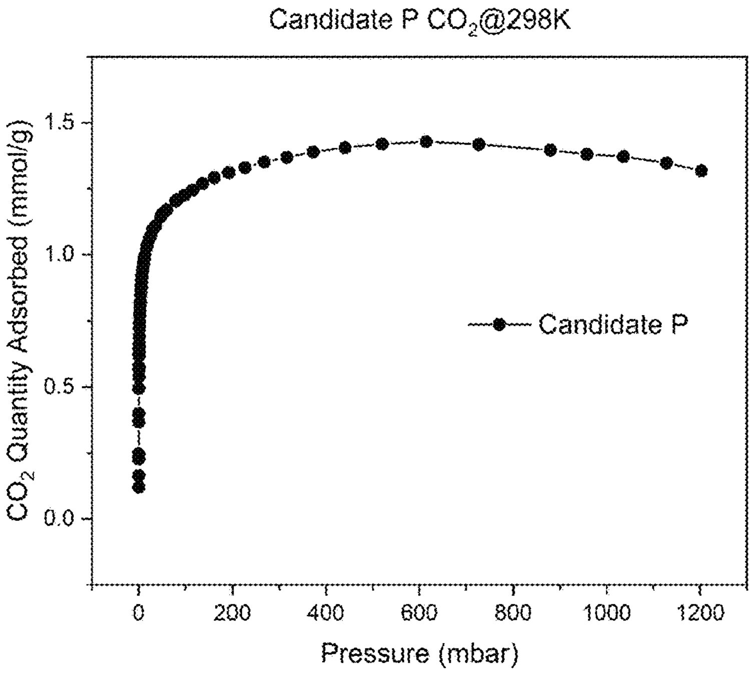
FIG. 16 shows a graph of a full $CO_2$ adsorption isotherm at 298K for the silica-based aerogel Candidate P.
Figure 17:
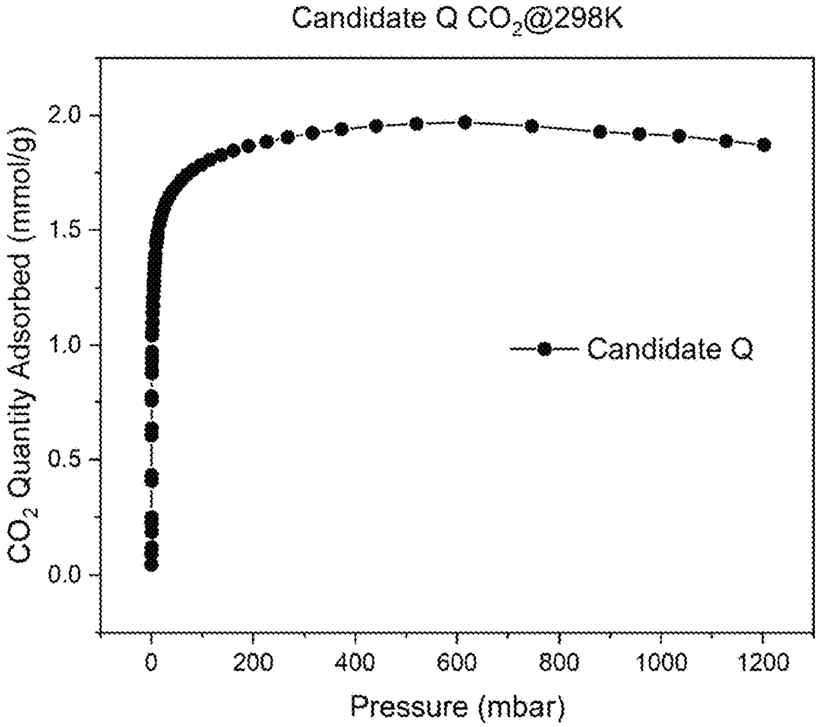
FIG. 17 shows a graph of a full $CO_2$ adsorption isotherm at 298K for the silica-based aerogel Candidate Q.
Figure 18:
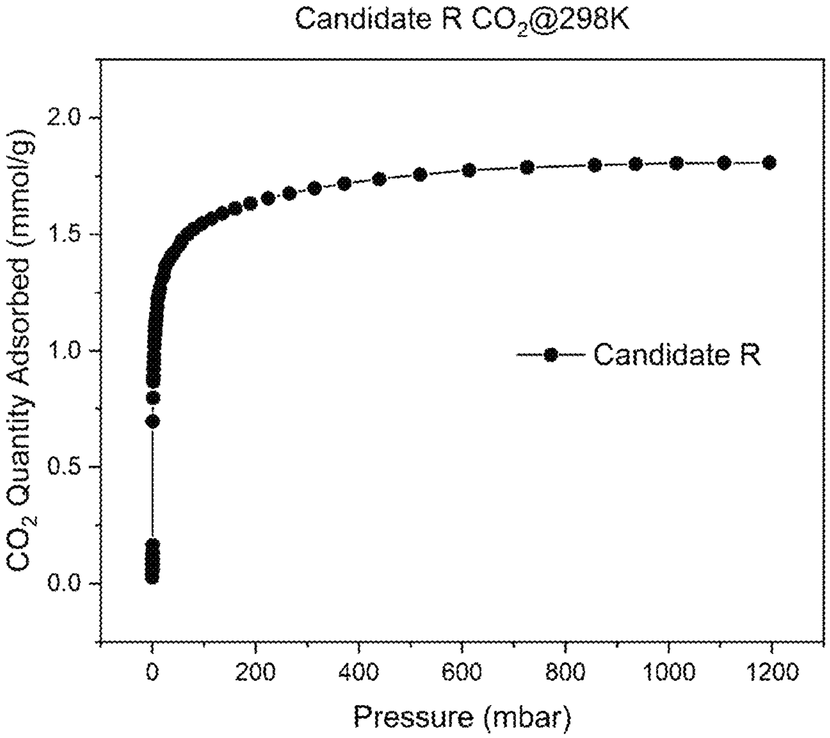
FIG. 18 shows a graph of a full $CO_2$ adsorption isotherm at 298K for the silica-based aerogel Candidate R.

The following performance measurements have been applied to the silica-based aerogels, as defined in Example 2, to determine their direct air capacities:

I. $CO_2$ gas adsorption
II. $H_2O$ vapour adsorption
III. $CO_2$ breakthrough testing
IV. $N_2$ gas adsorption to determine surface area
V. Adsorption and Desorption cycles The following characterisation methods have been applied to understand the materials structure:

i. PALS (Positron Annihilation Lifetime Spectroscopy)—the pore size distribution determined using PALS for candidates A, B, C and D is shown in FIG. 1*a*. The pore size distribution of J, P, M and L is shown in FIG. 1*b* and determined using $N_2$ gas.
ii. Density—the density vs $CO_2$ uptake relationship of candidates A, B, D, E and K at various pressures is shown in FIG. 1*c* (particle density) and FIG. 1*d* (bulk density).
iii. Thermal stability and activation profiling Example 3a—Performance Data I) $CO_2$ Gas Adsorption The information presented in this section highlights the performance of the silica-based aerogels to operate as an absorbent for direct air capture of $CO_2$. Table 6 summarises the properties of the top candidate aerogels, which includes BET surface area, density of the solid material and various performance capacities of $CO_2$ capture. As previously stated, for direct air capture, it is desirable for the aerogel to adsorb $CO_2$ at 0.4 mbar which is equivalent to 400 ppm of $CO_2$ in the atmosphere. The aerogels perform at ambient temperature, that being 298K and the $CO_2$ performance units are provided in mmol/g, mg/g and $CO_2$ wt %. It will be appreciated that Surface Area BET ($m_2$/g) provides information of the physical adsorption of gas, for example, $N_2$ gas on a solid surface of the candidate aerogel. Surface Area BET using $N_2$ gas requires the gas molecules to have access to accessible pores to determine the intrinsic surface area and porosity. Surface Area BET is not a performance indicator for $CO_2$ capacity of these aerogels, and in fact may be a general indicator of the level of micro porosity of the candidate aerogels. For example, the inventors have surprisingly found that surface area is not a measure of how well the aerogel will absorb $CO_2$. Unexpectedly, aerogels having low surface area provide excellent $CO_2$ adsorption.

As a performance guide, TIF-SIX was a benchmark and known to perform direct air capture of $CO_2$. These novel silica-based aerogel, as described herein, have surprisingly improved on the performance of TIF-SIX (See Table 2) for direct air capture.

The $CO_2$ adsorption performance details are provided for select silica-based aerogels in Table 4. All Candidate materials $CO_2$ isotherm plots at 298K are provided in FIGS. 2 to 18.

TABLE 4

Select silica-based aerogel properties which includes BET surface area, density and $CO_2$ wt. % uptake at various pressures from $CO_2$ gas adsorption isotherms

| | Properties | | | | | | | |
|---|---|---|---|---|---|---|---|---|
| | BET Surface Area | Density | $CO_2$ uptake 0.4 mbar | $CO_2$ uptake 0.4 mbar | $CO_2$ uptake 925 mbar | $CO_2$ Wt % @mbar* | | |
| Candidate | ($m^2$/g) | (g/$cm^3$) | (mmol/g) | (mg/g) | (mmol/g) | 0.4 | 150 | 925 |
| A | 48.13 | 0.191 | 0.747 | 31.95 | 2.026 | 3.29 | 7.52 | 8.91 |
| B | 16.99 | 0.242 | 0.780 | 27.30 | 2.166 | 3.43 | 8.77 | 9.53 |
| C | 36.25 | 0.416 | 0.472 | 20.778 | 1.560 | 2.07 | 5.47 | 8.86 |

TABLE 4-continued

Select silica-based aerogel properties which includes BET surface area, density and $CO_2$ wt. % uptake at various pressures from $CO_2$ gas adsorption isotherms

| | Properties | | | | | | | |
|---|---|---|---|---|---|---|---|---|
| | BET Surface Area | Density | $CO_2$ uptake 0.4 mbar | $CO_2$ uptake 0.4 mbar | $CO_2$ uptake 925 mbar | $CO_2$ Wt % @mbar* | | |
| Candidate | ($m^2$/g) | (g/$cm^3$) | (mmol/g) | (mg/g) | (mmol/g) | 0.4 | 150 | 925 |
| D | 140.72 | 0.056 | 0.467 | 20.57 | 1.181 | 0.78 | 2.22 | 2.27 |
| E | 11.16 | 0.1703 | 0.620 | 27.31 | 2.172 | 2.73 | 8.14 | 9.57 |
| G | | 0.271 | | | 1.914 | 0.64 | 3.42 | 3.82 |
| H | | 0.587 | | | 1.712 | 1.84 | 6.54 | 7.70 |
| J | 24.30 | | | | 1.21 | 1.60 | 4.40 | 5.49 |
| K | 20.11 | 0.1626 | 0.665 | 29.28 | 1.781 | 2.93 | 6.52 | 7.86 |
| L | 92.96 | 0.44 | 0.634 | 27.90 | 2.022 | 2.79 | 7.88 | 8.89 |
| M | 46.95 | 0.36 | 0.634 | 27.90 | 2.02 | 2.71 | 8.52 | 9.50 |
| N | 36.25 | 0.224 | 0.838 | 36.88 | 2.02 | 3.69 | 7.91 | 8.91 |
| O | 138.39 | 0.295 | 0.543 | 23.89 | 1.60 | 2.39 | 6.29 | 7.06 |
| P | 98.99 | 0.503 | 0.508 | 22.37 | 1.38 | 2.23 | 5.64 | 6.10 |
| Q | | 0.499 | 0.626 | 27.55 | 1.92 | 2.75 | 8.08 | 8.46 |
| R | 2.47 | 0.586 | | | 1.80 | 0.52 | 7.05 | 7.92 |

*0.4 mbar pressure is equivalent to atmospheric $CO_2$ 400 ppm in air, 150 mbar is equivalent to flue gas conditions with 15% $CO_2$ concentrations and 925 mbar is equivalent to 100% $CO_2$.

Example 3b Performance Data

II) $H_2O$ Vapour Adsorption

Figure 19:
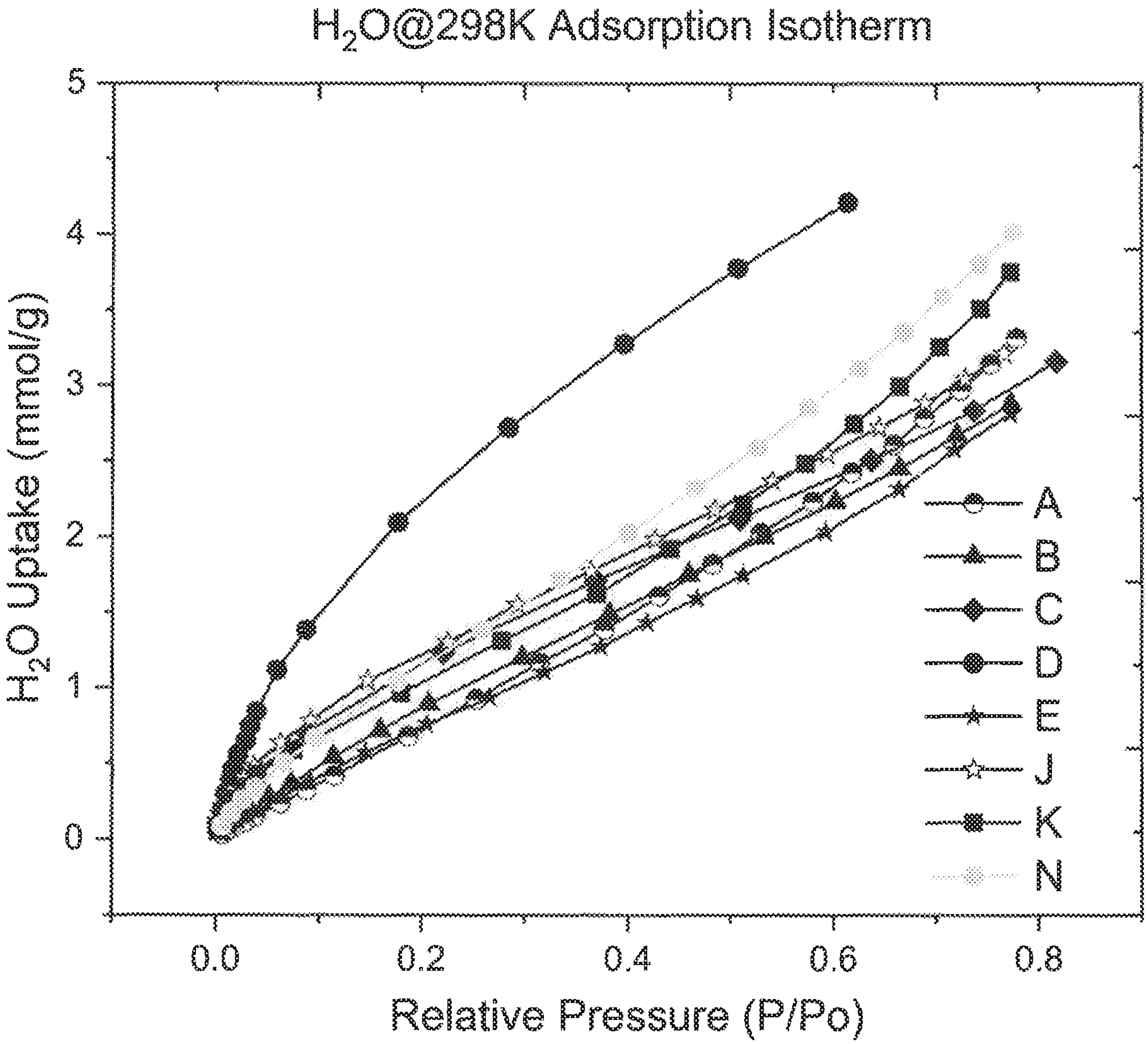
FIG. 19 shows a graph of $H_2O$ adsorption isotherms collected at 298K which show a decrease in water uptake when the content of TEMS and APEMS is increased. Candidate D only has a 20% loading of TEMS and no APEMS, giving rise to a higher uptake of $H_2O$ compared to the other candidate materials that have various loadings from 60-80% of either APEMS, TEMS, DMDES and/or TEES.

It is desirable for direct air capture that the aerogels comprise an element of hydrophobicity. This enables the materials when adsorbing $CO_2$ from air not to compete for the adsorption of water. This is a desired feature for the aerogels to operate in various relative humidity environments. The introduction of APEMS, TEMS, TEES and or DMDES was to enable two major improvements: 1) increase the hydrophobicity and 2) induce micro-porosity to form pores have a diameter less than 2 nm to enable for $CO_2$ selectivity over $H_2O$. Table 5 presents the $SiO_2$ units used in each silica-based aerogel. The $H_2O$ adsorption performance isotherms are provided in FIG. 19.

TABLE 5

Composition of $SiO_2$ unit of silica-based aerogels

| | Composition $SiO_2$ Units (%) | | | | | |
|---|---|---|---|---|---|---|
| Candidate | APEMS | APTES | TEOS | TEMS | DMDES | TEES |
| A | 40 | | 20 | 40 | | |
| B | 40 | | 40 | 20 | | |
| C | 40 | | | 60 | | |
| D | | 60 | 20 | 20 | | |
| E | 40 | | 20 | | | 40 |
| F | 40 | | 20 | | 40 | |
| G | 40 | | 20 | 20 | 20 | |
| H | 60 | | 30 | | 10 | |
| I | 40 | | 30 | | 30 | |
| J | | 40 | 20 | 20 | 20 | |
| K | 40 | | 20 | 20 | | 20 |
| L | 60 | | 20 | 20 | | |
| M | 60 | | 20 | 10 | | 10 |
| N | 50 | | 20 | 15 | | 15 |
| O | 50 | | 25 | 25 | | |
| P | 60 | | 40 | | | |
| Q | 60 | | 20 | | | 20 |
| R | 40 | | | 40 | | 20 |
| S | 70 | | 15 | 15 | | |
| T | 80 | | 10 | 10 | | |
| TIFSIX | | | | | | |

Example 3c Performance Data

III) $CO_2$ Breakthrough Testing

Figure 20:
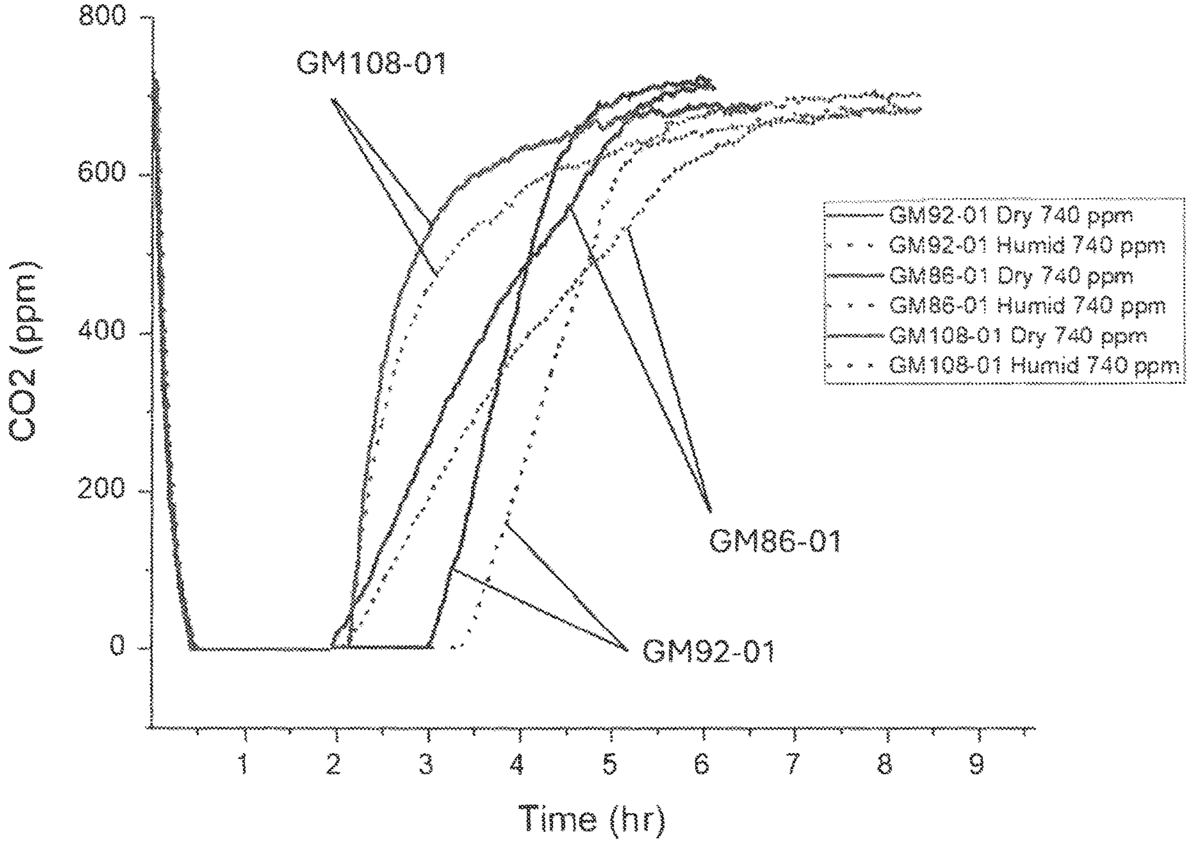
FIG. 20 shows a graph of $CO_2$ breakthrough curve of Candidate A (GM86-01), B (GM92-01) and D (GM108-01) performed at 740 ppm under dry and humid conditions (70-80% RH).
Figure 21:
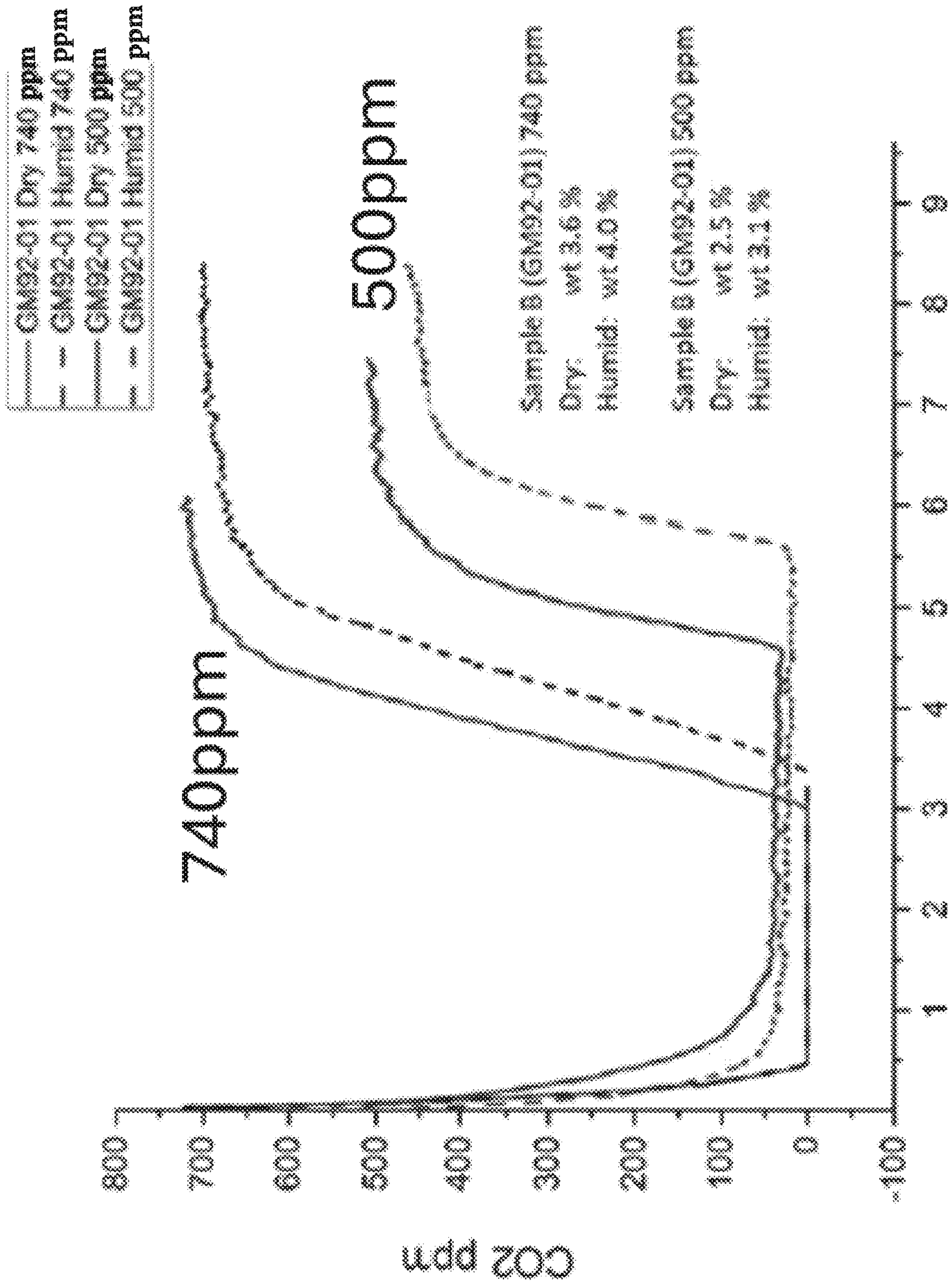
FIG. 21 shows a graph of $CO_2$ breakthrough curve of Candidate B performed at 500 ppm and 740 ppm under dry and humid conditions (70-80% RH).
Figure 22:
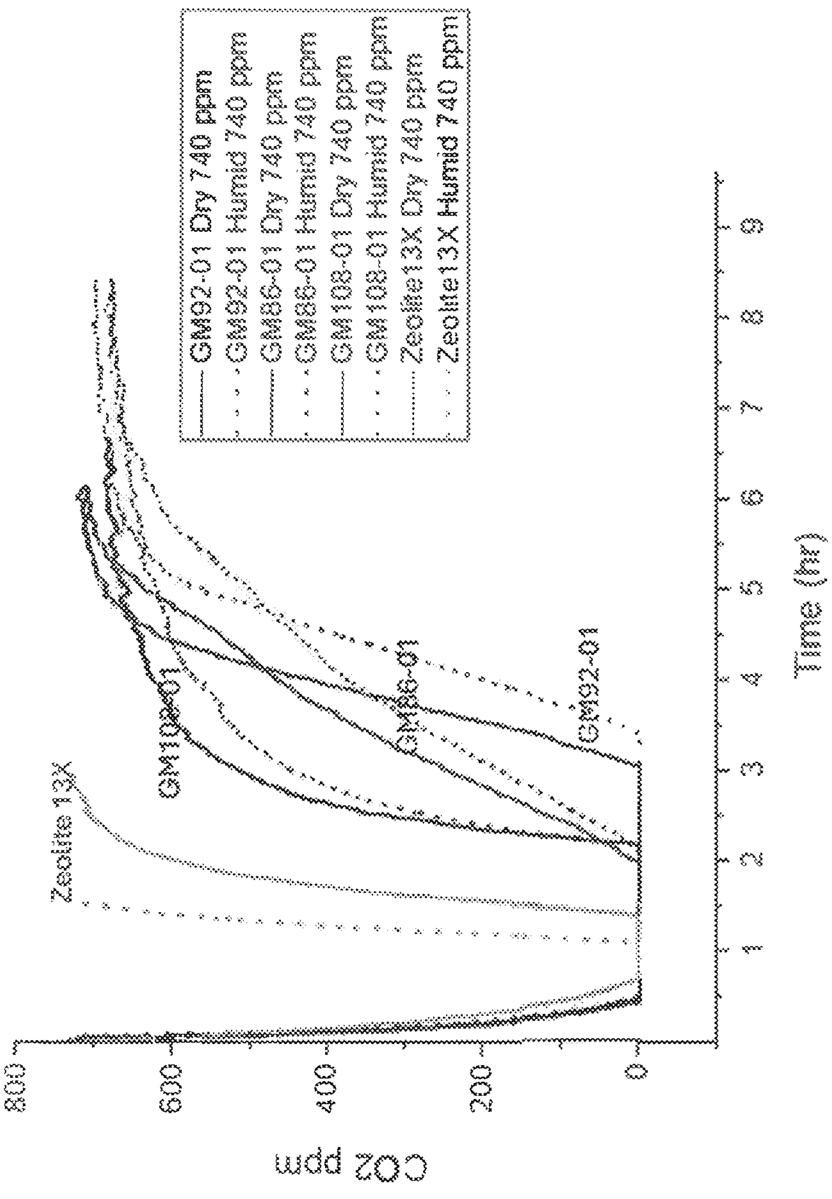
FIG. 22 shows a graph of $CO_2$ breakthrough curve of Candidates A (GM86-01), B (GM92-01), D (GM108-01) and Zeolite 13X performed at 740 ppm under dry and humid conditions (70-80% RH).
Figure 23:
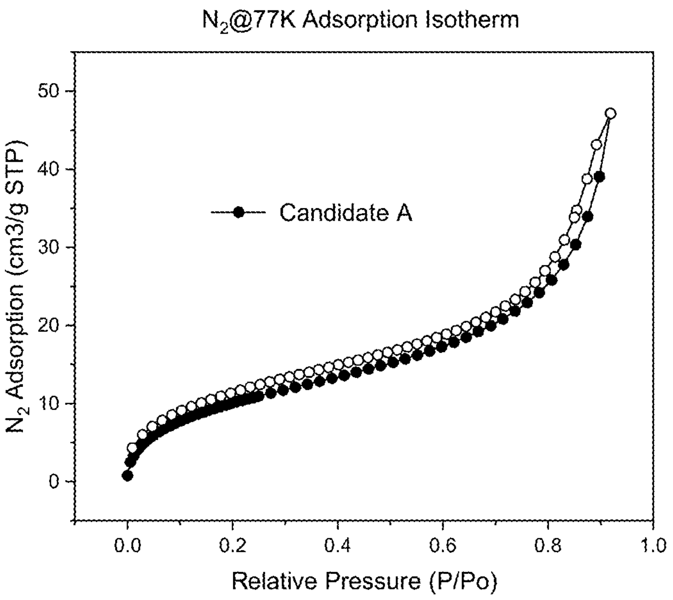
FIG. 23 shows a graph of $N_2$ adsorption isotherm at 77K of Candidate A. Closed circles are adsorption data points and open circles are desorption data points.
Figure 24:
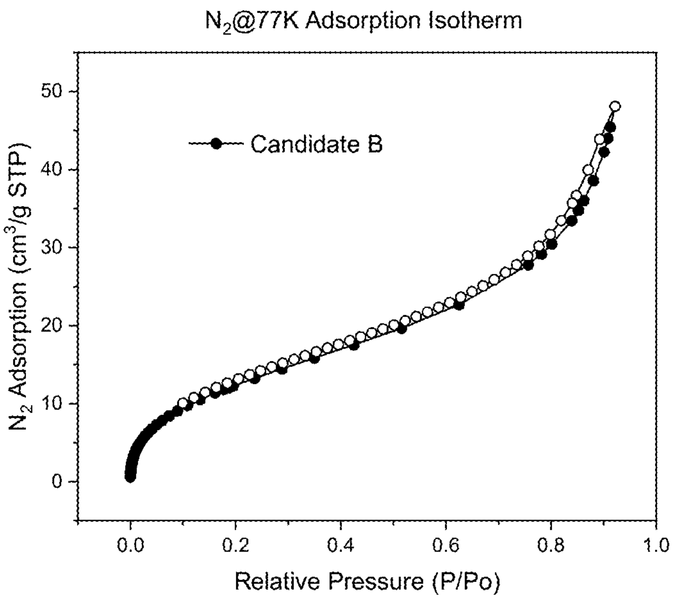
FIG. 24 shows a graph of $N_2$ adsorption isotherm at 77K of Candidate B. Closed circles are adsorption data points and open circles are desorption data points.
Figure 25:
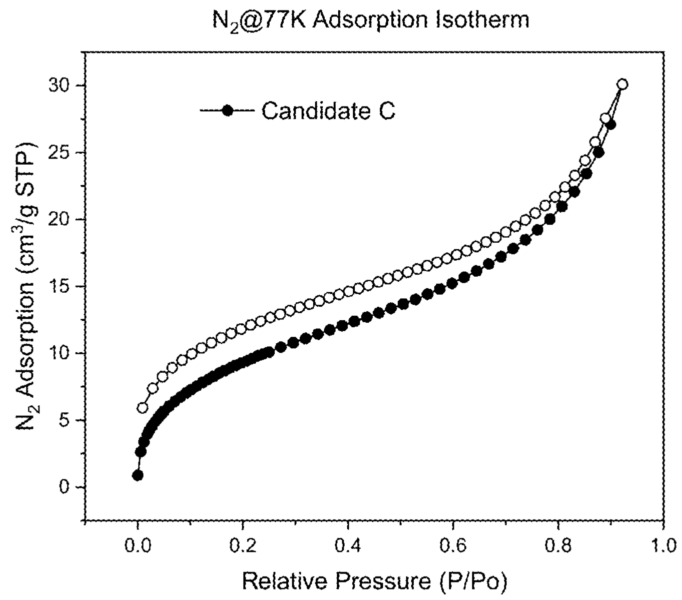
FIG. 25 shows a graph of $N_2$ adsorption isotherm at 77K of Candidate C. Closed circles are adsorption data points and open circles are desorption data points.
Figure 26:
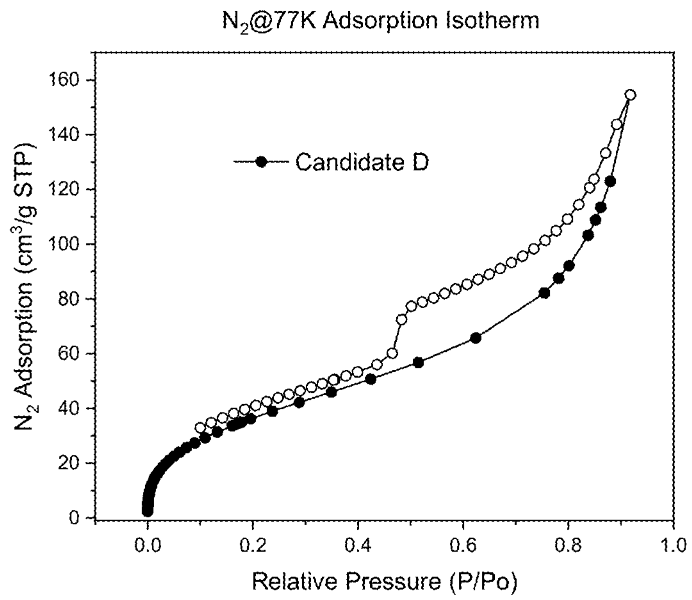
FIG. 26 shows a graph of $N_2$ adsorption isotherm at 77K of Candidate D. Closed circles are adsorption data points and open circles are desorption data points.
Figure 27:
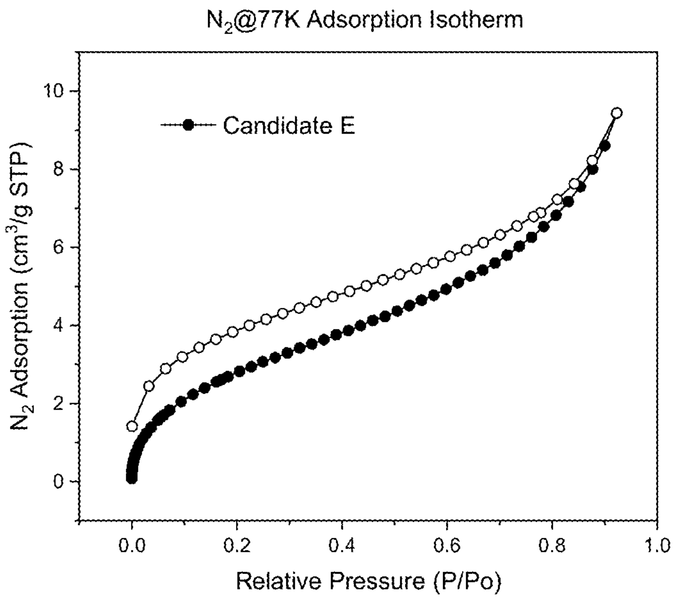
FIG. 27 shows a graph of $N_2$ adsorption isotherm at 77K of Candidate E. Closed circles are adsorption data points and open circles are desorption data points.
Figure 28:
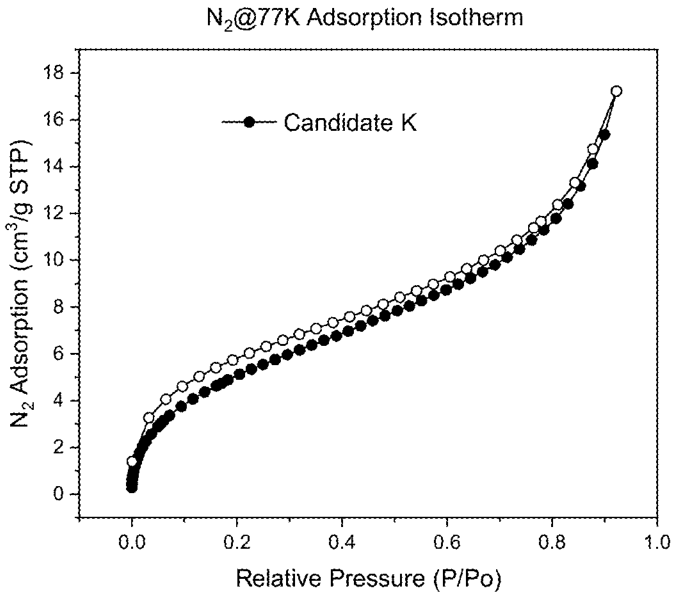
FIG. 28 shows a graph of $N_2$ adsorption isotherm at 77K of Candidate K. Closed circles are adsorption data points and open circles are desorption data points.

For dynamic performance testing, $CO_2$ breakthrough experiments were performed in dry and humid conditions. FIG. 20 presents the breakthrough curves of Candidate A, B and D at 740 ppm $CO_2$ concentration under dry and humid (70-80% RH) conditions. FIG. 21 presents the breakthrough curve for Candidate B at 500 ppm and 740 ppm under dry and humid (70-80% RH) conditions at 20 sccm flow rate. The increase concentration of $CO_2$ at 740 ppm shows a faster breakthrough time but higher $CO_2$ capacity. Table 6 provides the $CO_2$ wt. % capacities under dry and humid conditions performed at 400 ppm (DAC), 740 ppm, and 10,000 ppm. FIG. 22 presents breakthrough curves against a standard DAC material, Zeolite 13X. FIG. 22 and Table 6, unexpectedly shows that the microporous candidates outperforms Zeolite 13X, and more importantly can continue to capture $CO_2$ in the presence of humidity.

TABLE 6

Breakthrough $CO_2$ wt. % capacity of the silica-based aerogels

| | 400 ppm (DAC 0.04%) | | 740 ppm | | 10,000 ppm (1%) | |
|---|---|---|---|---|---|---|
| Candidate | DRY $CO_2$ wt % | HUMID $CO_2$ wt % | DRY $CO_2$ wt % | HUMID $CO_2$ wt % | DRY $CO_2$ wt % | HUMID $CO_2$ wt % |
| A | 2.8 | — | 2.4 | 2.6 | | |
| B | 3.5 | 3.7 | 3.6 | 4.0 | 4.6 | 4.6 |
| D | 1.7 | 1.6 | 3.1 | 3.0 | | |
| E | 3.5 | 3.8 | 4.9 | 5.9 | 5.2 | 5.4 |
| K | 3.7 | 4.2 | 4.9 | 5.8 | 3.7 | 4.1 |
| L | | | 3.8 | 4.1 | | |
| M | | | 3.7 | 4.1 | | |
| N | | | 3.6 | 4.0 | | |
| Zeolite (control) | — | — | 1.7 | 1.3 | — | — |
| TIF-SIX | 1.2 | 1.0 | | | | |

Example 3d Performance Data

IV) $N_2$ Gas Adsorption

The $N_2$ adsorption capacities were measured at 77K and from this data BET surface area could be determined. $N_2$ adsorption isotherms are provided in FIGS. 23-28 and Table 7 provides the BET surface areas of the candidate aerogels. From Table 7, there is a range of low BET surface areas, this could be the result of the pores not being accessible to $N_2$ as $N_2$ gas has a larger kinetic diameter of 3.64 Å compared to $CO_2$ gas with 3.3 Å diameter.

TABLE 7

BET surface area ranges of Candidate material, calculated from $N_2$ at 77K adsorption isotherms

| Candidate | BET Surface Area ($m^2/g$) |
|---|---|
| A | 48.13 |
| B | 16.99 |
| C | 36.25 |
| D | 140.72 |
| E | 11.16 |
| J | 24.30 |
| K | 20.11 |

Example 3e Performance Data

V) Adsorption $CO_2$ Cycles

Figure 29:
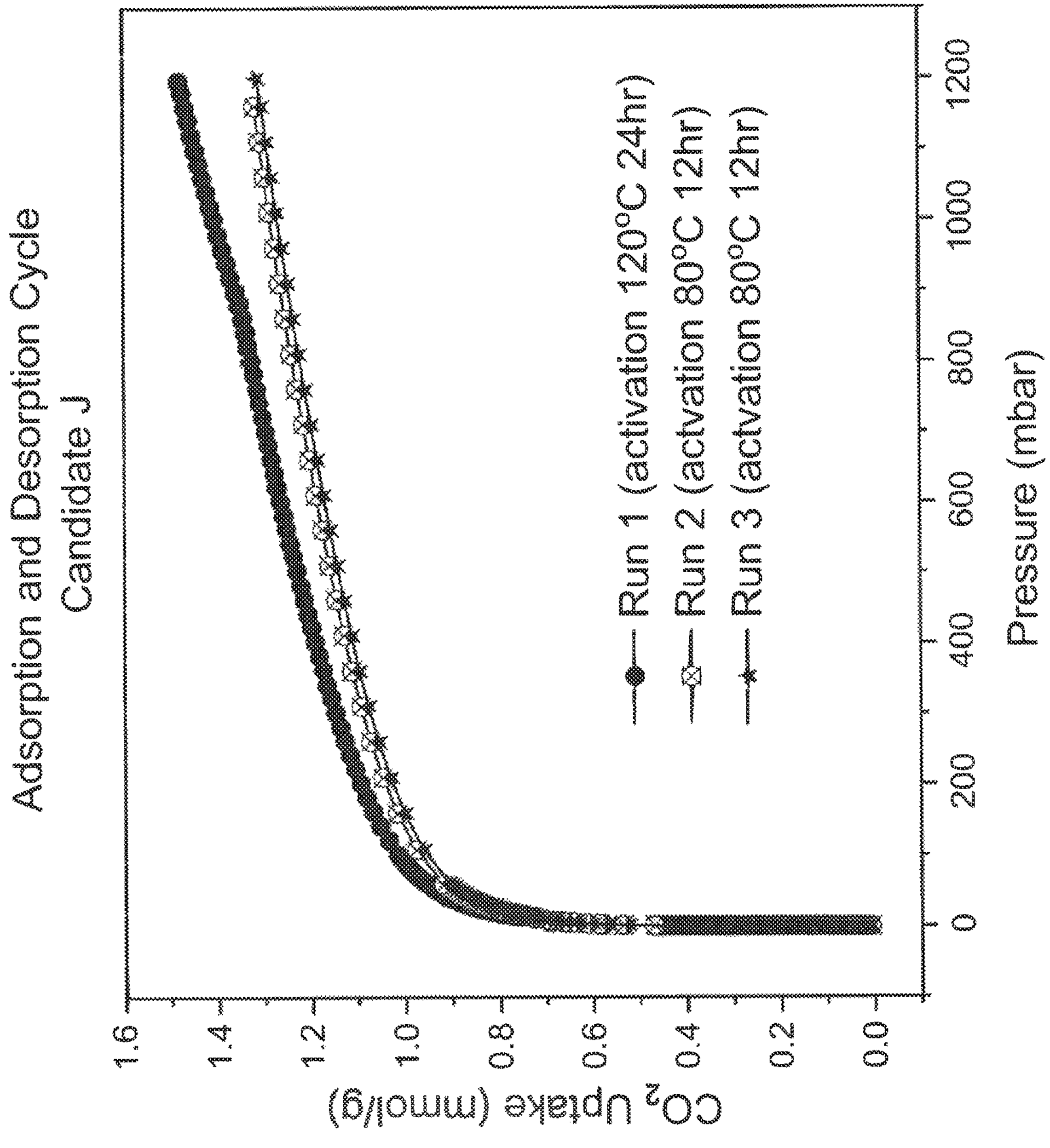
FIG. 29 shows a graph of $CO_2$ adsorption isotherm at 298K of Candidate J. This adsorption isotherm depicts the aerogels performance after consecutively adsorption runs am activation between each run. The aerogels performance at 0.4 mbar remained the same with a 10% loss in performance from the initial adsorption.
Figure 30:
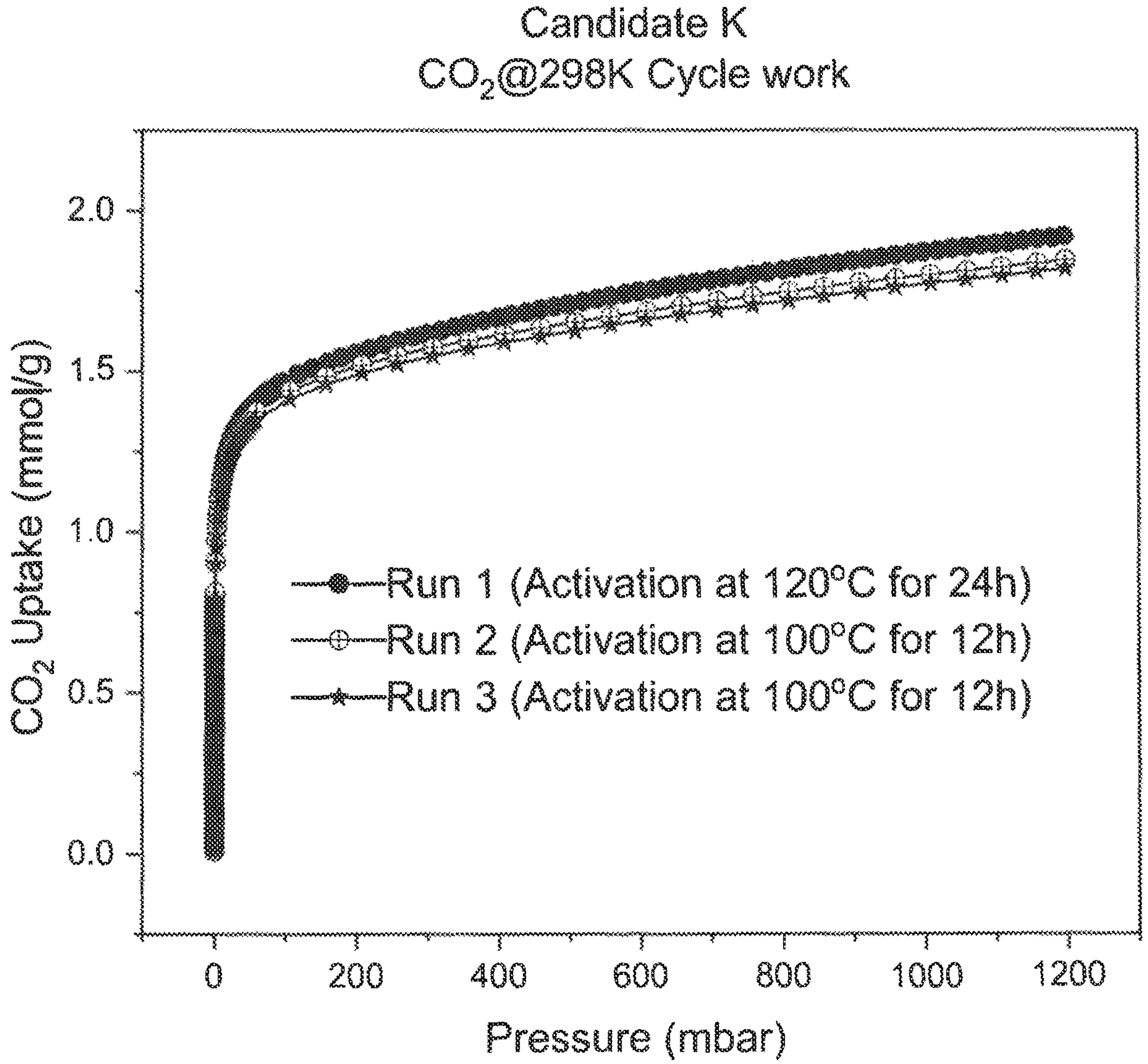
FIG. 30 shows a graph of $CO_2$ adsorption isotherm at 298K of Candidate K. This adsorption isotherm depicts the aerogels performance after consecutively adsorption runs am activation between each run. The aerogels performance at 0.4 mbar remained the same with a 1% loss in performance from the initial adsorption.
Figure 31:
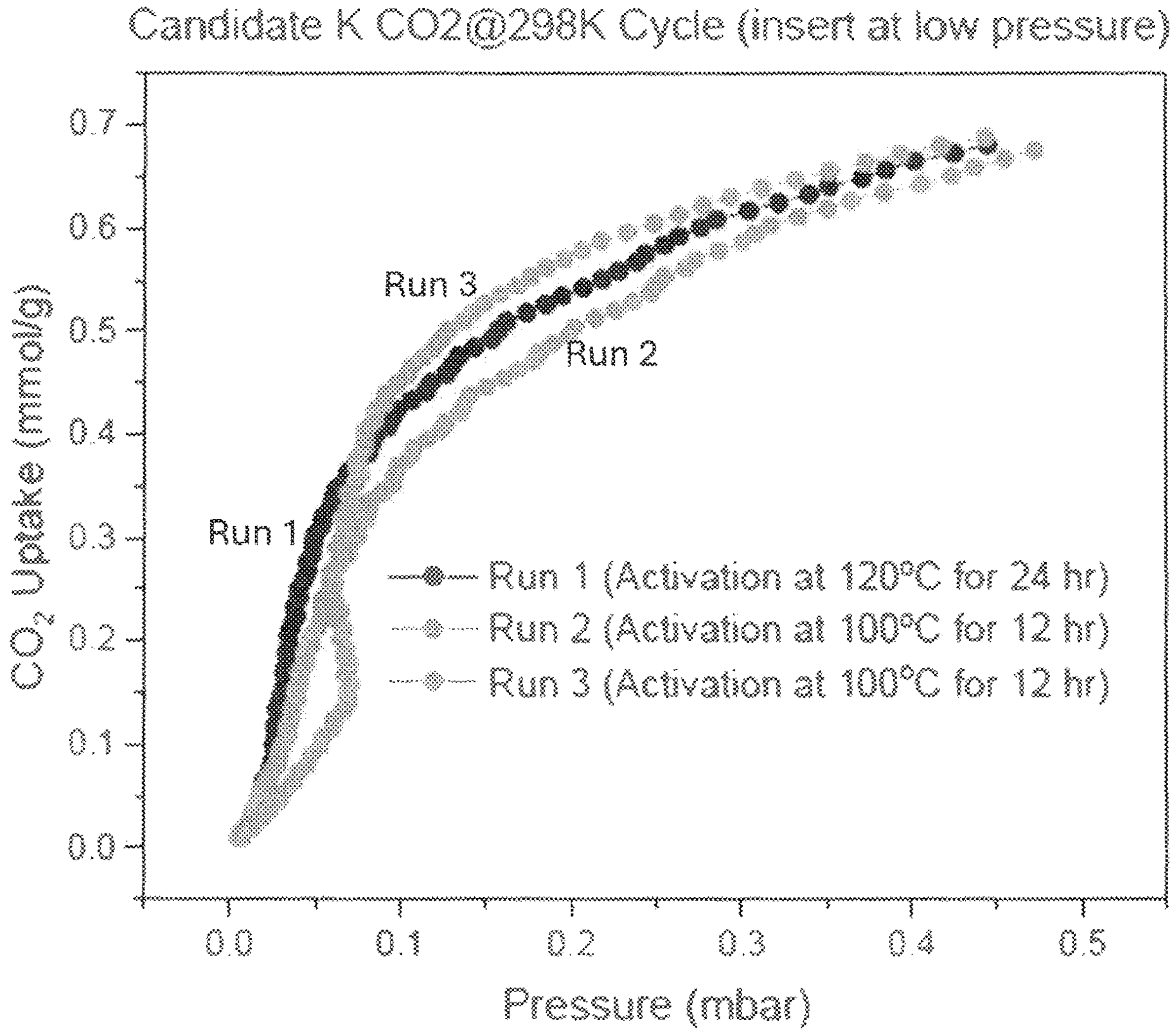
FIG. 31 shows a graph of $CO_2$ adsorption insert of isotherm at 298K for Candidate K. At 0.4 mbar pressure, less than 1% of performance loss was observed.

FIGS. 29 to 31 show the surprisingly unexpected excellent performance after consecutively adsorption/desorption cycles with activation between each cycle for the candidate aerogels under various conditions.

Figure 32:
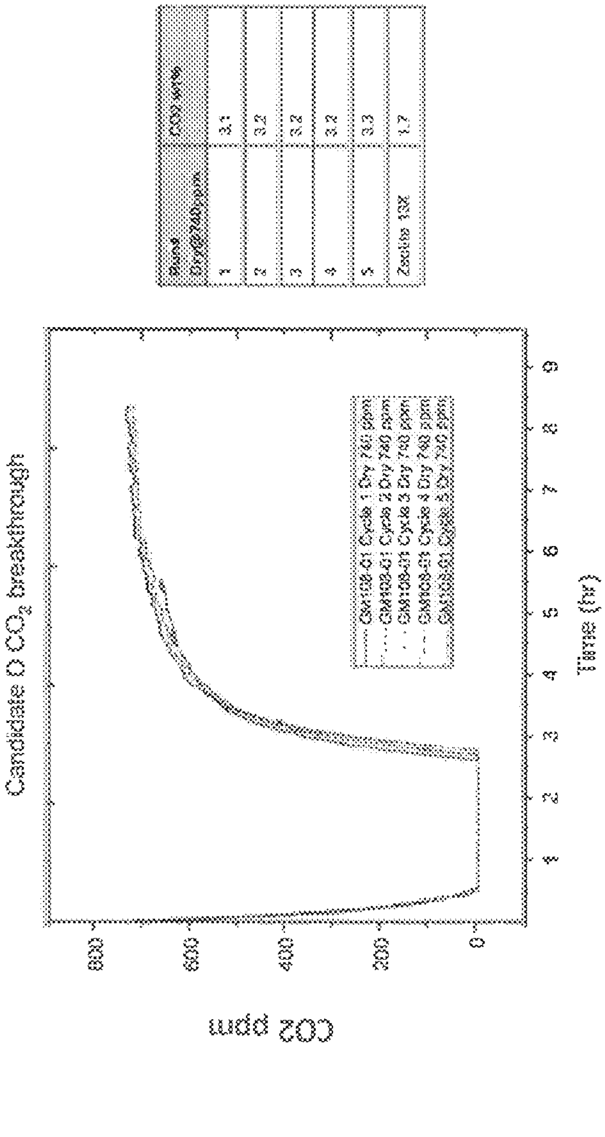
FIG. 32 shows a graph of $CO_2$ at 298K breakthrough experiment at 740 ppm in dry conditions. 5 cycles were run with the aerogel being activated in between each run at 100° C. for 12 hrs. No $CO_2$ performance loss was observed for Candidate D.
Figure 33:
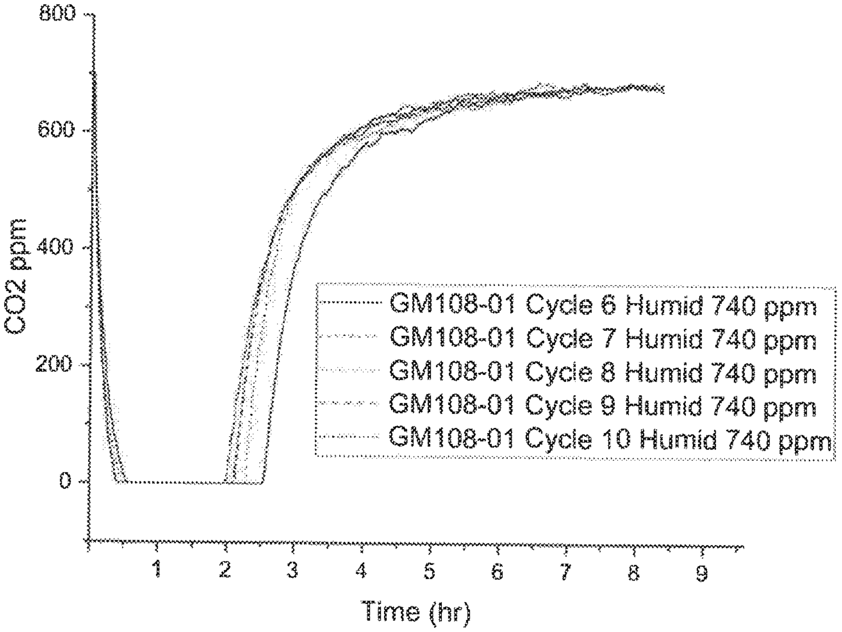
FIG. 33 shows a graph of $CO_2$ at 298K breakthrough experiment at 740 ppm in humid conditions. 5 cycles (run 6-10) were run with the aerogel being activated in between each run at 100° C. for 12 hrs. A 20% performance loss was observed during the cycling experiments. This $CO_2$ removal remains above the commercial Zeolite 13X sample under the same condition.

FIGS. 32 and 33 provide information on breakthrough experiments whereby the cyclability of the candidate aerogels outperformed Zeolite 13X. This was performed in dry and humid conditions operating at 740 ppm $CO_2$ concentration levels.

Example 4 General Process for Pellet Formation of Silica-Based Aerogels (i) Preparation of pressed pellets: a binder and graphite were mixed with a dried silica-based aerogel, ensuring all components are homogeneously mixed. Pressing pressure and filling depth were adjusted to form solid pellets of the desired thickness. A lower pressure (i.e. setting 3) usually related to a small filling depth to produce a solid robust pellet. Higher pressures (i.e. setting 5) required a larger filling depth. Both combinations produced pellets in the required thickness range.

(ii) Preparation of slurry-based extrusion of pellets: a cellulose/siloxane solution-based binder was prepared by combining in a screw capped bottle the following, 50 mL of each ethanol and water to 3 g of siloxane solution. To this mixture, 3 g of cellulose was added in portions of 100 mg. After each addition the slurry was continuously stirred until the cellulose dissolved. After all remaining cellulose was added, the slurry was mixed until a consistency of a viscous solution was obtained. The silica-based aerogels were sieved to obtain particles <200 mm in size. Optionally, a lubricating agent (e.g. magnesium stearate) may be used as required to adjust the viscosity to an extrudable material.

General methods for liquid extrusion involves the use of 10 mL plastic syringes with 2.0 mm female Luer-lock barb attachment. This enables for extrusion on a 0.5-2 g scale of formulated paste.

A silica-based aerogel and binder were combined and worked into a paste using a spatula. Solvent was slowly evaporated with a gently flow of nitrogen gas, this provided a dough like paste after about 2-3 minutes of exposure. The dough was pushed through a 5 mL 10 mL syringe fitted with a 2.0 barb. Noodle like extrudates were formed and pellets were individually cut to about 3-4 mm long. Pellets were dried at room temperature followed by further drying at 80° C. under vacuum (0.1 mbar) for 12 hours.

Example 4a—Candidate B

A pellet was formed according to the method described in (i) above by mixing 11 g of binder and 1.58 g of graphite with 66 g of Candidate B until all components were homogenously mixed. Pressing pressure and filling depth were adjusted to form solid pellets of the desired thickness of Candidate B.

Example 4b—Candidate E

A pellet was formed according to the method described in (ii) above by preparing the binder solution in accordance with (ii) and the silica-based aerogel formulation prepared using 0.62 g Candidate E (sieved at <200 mm), 2.92 g cellulose/siloxane binder, 0.06 mg magnesium stearate (lubricant). The binder solution and silica-based aerogel formulation were combined and worked into a paste using a spatula. Solvent was slowly evaporated with a gently flow of nitrogen gas, this provided a dough like paste after 2-3 minutes of exposure. The dough was pushed through a 5 mL 10 mL syringe fitted with a 2.0 barb. Noodle like extrudates were formed and pellets were individually cut to 3-4 mm long. Pellets were dried at room temperature followed by further drying at 80° C. under vacuum (0.1 mbar) for 12 hours.

Example 4c—Candidate K

A pellet was formed according to the method described in (i) above by mixing 15.38 g of binder and 1.54 g of graphite with 60 g of Candidate K until all components were homogenously mixed. Pressing pressure and filling depth were adjusted to form solid pellets of the desired thickness of Candidate K.

Example 5 Pelleting Properties of Silica-Based Aerogels

The properties of the silica-based aerogel pellets were determined by selection of binder type and amount. The inventors have unexpectedly found that the type of binder and the amount used will determine whether the pellet can be pressed or extruded and will depend on the specific application (e.g. pellets for a DAC device vs a coating where pellet formation is not relevant and instead viscosity of the formulation becomes important.

Depending on the specific application, the aerogel products are preferred in pellet form (e.g. DAC device). Therefore, binder types, candidates types, and binder contents were studied aiming for robust strength and excellent $CO_2$ uptake performance.

Table 8 summarises the findings of various binders and the effect on the strength on pellets of the same candidate. The results suggest that $NH_2$ siloxane binder performed well as compared with other binders in terms of strength of final pellet.

TABLE 8

| Binder type vs strength of silica-based aerogels pellet for candidate A | | | |
|---|---|---|---|
| Binder | Binder amount (wt. %) | Shape forming | Pressability/ cuttability |
| Silica/hydroxypropyl cellulose | 29 | No | No/No |
| $NH_2$ siloxane | 35 | Yes | Yes/Yes |
| Poly(vinyl alcohol) | 35 | Yes | Yes/No |
| Low molecular weight polyglycol | 25 | Yes | Yes/Yes |
| Methyl cellulose/poly(propyleme)glycol | 25 | Yes | Yes/Yes |
| Poly(vinyl alcohol) | 36 | Yes | Yes/No |
| Polymethylhydrosiloxane | 36 | Yes | Yes/No |
| Polydimethylsiloxane | 30 | Yes | Yes/No |
| Polyvinylpyrrolidone | 30 | Yes | Yes/No |

Table 9 summarises the pelleting properties for different aerogel candidates in the form of pellets prepared in combination with a $NH_2$ siloxane binder. The results demonstrate that candidate L provides the strongest pellet combination and excellent performance among the candidates tested.

TABLE 9

| Candidate vs strength of silica-based aerogels pellet for $NH_2$ siloxane | | | | |
|---|---|---|---|---|
| Candidate | Binder | Binder amount (wt. %) | Shape forming | Pressability/ cuttability |
| A | $NH_2$ siloxane | 35 | Yes | Yes/No |
| B | $NH_2$ siloxane | 13 | Yes | Yes/No |
| B | $NH_2$ siloxane | 24 | Yes | Yes/Yes |
| L | $NH_2$ siloxane | 23 | Yes | Yes/Yes |

Table 10 summarises the impact on the amount of binder on the aerogel pellet strength and performance. The results suggest that the aerogel pellet strength of candidate L in combination with a $NH_2$ siloxane binder becomes poor when the amount of binder is less than about 10 wt. %.

TABLE 10

| Binder amount vs strength of silica-based aerogels pellet for Candidate L with $NH_2$ siloxane | | | | |
|---|---|---|---|---|
| Candidate | Binder | Binder amount (wt. %) | Shape forming | Pressability/ cuttability |
| L | $NH_2$ siloxane | 10 | Yes | Yes/No |
| L | $NH_2$ siloxane | 20 | Yes | Yes/Yes |
| L | $NH_2$ siloxane | 30 | Yes | Yes/Yes |
| L | $NH_2$ siloxane | 43 | Yes | Yes/Yes |

Example 6 Water Absorption Properties of Silica-Based Aerogels Pellets

Figure 34:
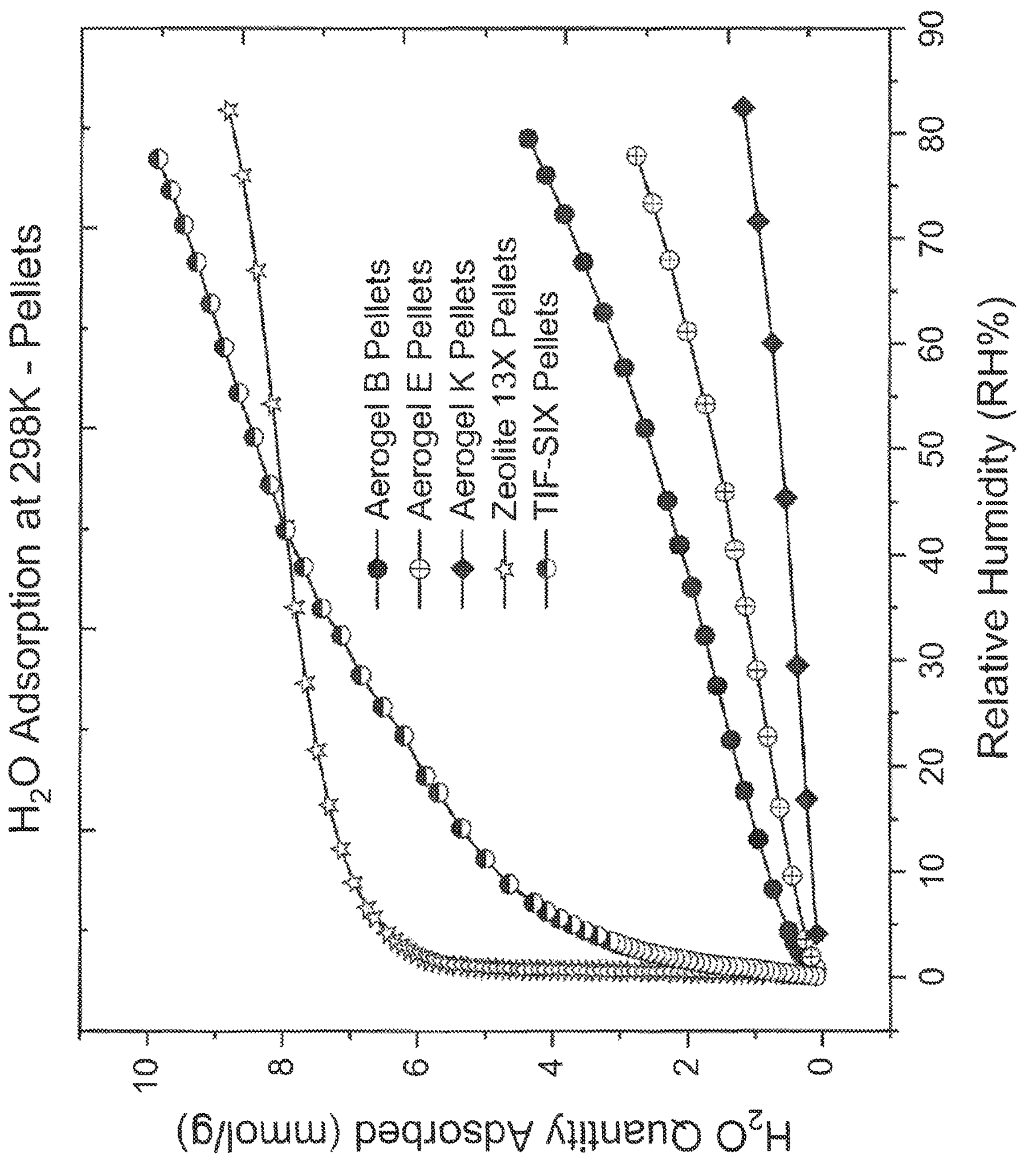
FIG. 34 shows a graph of $H_2O$ adsorption at 298K of Candidate B, E and K pellets providing a comparison with Zeolite 13X pellets and TIF-SIX pellets.

FIG. 34 provides information on water adsorption of candidate aerogel pellets compared with TIF-SIX pellets and Zeolite 13X pellets. This was performed in dry and humid conditions operating at 298K. The results show that, unlike Zeolite 13X or TIF-SIX pellets, the candidate aerogel pellets do not provide good water adsorption properties, surprisingly rendering the present silica-based aerogel pellets far superior for selective adsorption of $CO_2$.

The invention claimed is:

1. A silica-based microporous aerogel for carbon dioxide ($CO_2$) capture, the microporous aerogel comprises a reaction product of reagents comprising at least one amino substituted silane, at least one alkyl substituted silane, and at least one silicate, wherein:

the microporous aerogel comprises a plurality of pores wherein at least 50% of the pores have a diameter of less than about 2 nm;

the microporous aerogel has a surface area in a range between about 0.1 m2/g and about 500 m2/g;

the at least one silicate is in accordance with Formula 3:

$$Si(OR^7)_4 \qquad \text{Formula 3,}$$

wherein $R^7$ is C1-6alkyl; and the at least one silicate has a % loading of at least about 20 mol %.

2. The microporous aerogel according to claim 1, wherein the aerogel adsorbs $CO_2$ from the air in environments with a $CO_2$ concentration of less than about 10 vol. %.

3. The microporous aerogel according to claim 1, wherein the aerogel adsorbs $CO_2$ from the air in enclosed environments with a $CO_2$ concentration of less than about 2 vol. %.

4. The microporous aerogel according to claim 1, wherein the aerogel adsorbs $CO_2$ from the air in environments with a $CO_2$ concentration of about 0.04 vol. %.

5. The microporous aerogel according to claim 4, wherein the $CO_2$ adsorption of the aerogel is at least 0.47 mmol/g.

6. The microporous aerogel according to claim 1, wherein the amino substituted silane is according to Formula 1:

$$R^1Si(OR^2)_n\text{-L-}NH_2 \qquad \text{Formula 1}$$

wherein:

$R^1$ is C1-6alkyl or is absent;

$R^2$ is C1-6alkyl;

L is a —C1-6alkyl-linker group between the silicon and nitrogen atoms; and n is 2 or 3.

7. The microporous aerogel according to claim 1, wherein the alkyl substituted silane is according to Formula 2:

$$R^5{}_mSi(OR^6)_n \qquad \text{Formula 2}$$

wherein:

$R^5$ and $R^6$ are each independently selected from C1-6alkyl; and m is 1 and n is 3 or m and n are each 2.

8. The microporous aerogel according to claim 1, wherein:

the at least one amino substituted silane is 3 aminopropyl (diethoxy)methylsilane with a % loading of about 40 mol %, the at least one alkyl substituted silane is triethoxymethylsilane with a % loading of about 40 mol %, and the at least one silicate is tetraethyl orthosilicate with a % loading of about 20 mol %; or the at least one amino substituted silane is 3 aminopropyl (triethoxy)silane with a % loading of about 60 mol %, the at least one alkyl substituted silane is triethoxymethylsilane with a % loading of about 20 mol %, and the at least one silicate is tetraethyl orthosilicate with a % loading of about 20 mol %; or the at least one amino substituted silane is 3 aminopropyl (diethoxy)methylsilane with a % loading of about 50 mol %, the at least one alkyl substituted silane is a mixture of triethoxymethylsilane with a % loading of about 15 mol % and triethoxy(ethyl)silane with a % loading of about 15 mol %, and the at least one silicate is tetraethyl orthosilicate with a % loading of about 20 mol %.

9. The microporous aerogel according to claim 1, wherein:

the at least one amino substituted silane is 3 aminopropyl (triethoxy)silane with a % loading of about 40 mol %, the at least one alkyl substituted silane is triethoxymethylsilane with a % loading of about 40 mol %, and the at least one silicate is tetraethyl orthosilicate with a % loading of about 20 mol %; or the at least one amino substituted silane is 3 aminopropyl (diethoxy)methylsilane with a % loading of about 40 mol %, the at least one alkyl substituted silane is triethoxymethylsilane with a % loading of about 20 mol %, and the at least one silicate is tetraethyl orthosilicate with a % loading of about 40 mol %; or the at least one amino substituted silane is 3 aminopropyl (triethoxy)silane with a % loading of about 40 mol %, the at least one alkyl substituted silane is triethoxymethylsilane with a % loading of about 20 mol %, and the at least one silicate is tetraethyl orthosilicate with a % loading of about 40 mol %; or the at least one amino substituted silane is 3 aminopropyl (diethoxy)methylsilane with a % loading of about 40 mol %, the at least one alkyl substituted silane is triethoxy(ethyl)silane with a % loading of about 40 mol %, and the at least one silicate is tetraethyl orthosilicate with a % loading of about 20 mol %; or the at least one amino substituted silane is 3 aminopropyl (triethoxy)silane with a % loading of about 40 mol %, the at least one alkyl substituted silane is triethoxy (ethyl)silane with a % loading of about 40 mol %, and the at least one silicate is tetraethyl orthosilicate with a % loading of about 20 mol %; or the at least one amino substituted silane is 3 aminopropyl (diethoxy)methylsilane with a % loading of about 40 mol %, the at least one alkyl substituted silane is dimethyldiethoxysilane with a % loading of about 40 mol %, and the at least one silicate is tetraethyl orthosilicate with a % loading of about 20 mol %; or the at least one amino substituted silane is 3 aminopropyl (diethoxy)methylsilane with a % loading of about 40 mol %, the at least one alkyl substituted silane is a mixture of triethoxymethylsilane with a % loading of about 20 mol % and dimethyldiethoxysilane with a % loading of about 20 mol %, and the at least one silicate is tetraethyl orthosilicate with a % loading of about 20 mol %; or the at least one amino substituted silane is 3 aminopropyl (diethoxy)methylsilane with a % loading of about 60 mol %, the at least one alkyl substituted silane is dimethyldiethoxysilane with a % loading of about 10 mol %, and the at least one silicate is tetraethyl orthosilicate with a % loading of about 30 mol %; or the at least one amino substituted silane is 3 aminopropyl (diethoxy)methylsilane with a % loading of about 40 mol %, the at least one alkyl substituted silane is dimethyldiethoxysilane with a % loading of about 30 mol %, and the at least one silicate is tetraethyl orthosilicate with a % loading of about 30 mol %; or the at least one amino substituted silane is 3 aminopropyl (triethoxy)silane with a % loading of about 40 mol %, the at least one alkyl substituted silane is a mixture of triethoxymethylsilane with a % loading of about 20 mol % and dimethyldiethoxysilane with a % loading of about 20 mol %, and the at least one silicate is tetraethyl orthosilicate with a % loading of about 20 mol %; or the at least one amino substituted silane is 3 aminopropyl (diethoxy)methylsilane with a % loading of about 40 mol %, the at least one alkyl substituted silane is a mixture of triethoxymethylsilane with a % loading of about 20 mol % and triethoxy(ethyl)silane with a % loading of about 20 mol %, and the at least one silicate is tetraethyl orthosilicate with a % loading of about 20 mol %; or the at least one amino substituted silane is 3 aminopropyl (diethoxy)methylsilane with a % loading of about 60 mol %, the at least one alkyl substituted silane is triethoxymethylsilane with a % loading of about 20 mol %, and the at least one silicate is tetraethyl orthosilicate with a % loading of about 20 mol %; or the at least one amino substituted silane is 3 aminopropyl (triethoxy)silane with a % loading of about 60 mol %, the at least one alkyl substituted silane is triethoxymethylsilane with a % loading of about 20 mol %, and the at least one silicate is tetraethyl orthosilicate with a % loading of about 20 mol %; or the at least one amino substituted silane is 3 aminopropyl (diethoxy)methylsilane with a % loading of about 60 mol %, the at least one alkyl substituted silane is a mixture of triethoxymethylsilane with a % loading of about 10 mol % and triethoxy(ethyl)silane with a % loading of about 10 mol %, and the at least one silicate is tetraethyl orthosilicate with a % loading of about 20 mol %; or the at least one amino substituted silane is 3 aminopropyl (diethoxy)methylsilane with a % loading of about 50 mol %, the at least one alkyl substituted silane is triethoxymethylsilane with a % loading of about 25 mol %, and the at least one silicate is tetraethyl orthosilicate with a % loading of about 25 mol %; or the at least one amino substituted silane is 3 aminopropyl (diethoxy)methylsilane with a % loading of about 60 mol %, the at least one alkyl substituted silane is triethoxy(ethyl)silane with a % loading of about 20 mol %, and the at least one silicate is tetraethyl orthosilicate with a % loading of about 20 mol %.

10. The microporous aerogel according to claim 1, wherein the microporous aerogel has a free amine content that is less than, or equal to, about 60 mol %.

11. The microporous aerogel according to claim 1, wherein the density of the microporous aerogel is in a range between about 0.02 g/cm$^3$ to about 0.6 g/cm3.

12. The microporous aerogel according to claim 1, wherein the aerogel is in the form of particles, powders, beads, granules, sheets/layers, cast blocks, cylinders, discs, porous membranes or monoliths or is applied as applied as a coating composition or film on a substrate.

13. The microporous aerogel according to claim 1, wherein, the at least one amino substituted silane is 3 aminopropyl(diethoxy)methylsilane with a % loading of about 60 mol %, and the at least one silicate is tetraethyl orthosilicate with a % loading of about 40 mol %.

14. An aerogel composite comprising:

a microporous aerogel according to claim 1; and one or more additives selected from a buffer, a binder, a metal organic framework (MOF), and a nanoparticle.

15. The aerogel composite according to claim 14, wherein the additive has a % loading of about 5 to about 35 wt. %.

16. The aerogel composite according to claim 14, further comprising a lubricant, and/or a solvent.

17. The aerogel composite according to claim 14, wherein the composite is in the form of a pellet, bead, sheet, or granule, or is applied as a coating composition, paste or film on a substrate.

18. The aerogel composite according to claim 14, wherein the one or more additives includes a binder that is selected from cellulose-based polymers, silane-based polymers, cellulose-siloxane-based polymers, polyglycol-based polymers, polyvinyl pyrrolidone, polyvinyl alcohol, polyethylene imine, bentonite, graphite, or combinations thereof.

19. A process for preparing a silica-based microporous aerogel for carbon dioxide ($CO_2$) capture, wherein the microporous aerogel comprises a reaction product of reagents comprising at least one amino substituted silane, at least one alkyl substituted silane, and at least one silicate that is in accordance with Formula 3:

$Si(OR^7)_4$ Formula 3 wherein $R^7$ is C1-6alkyl, and wherein the at least one silicate has a % loading of at least about 20 mol %, the process comprising:

(i)(a) mixing an aqueous solution comprising the at least one amino substituted silane, the at least one alkyl substituted silane, and the at least one silicate, and a solvent system, to form a wet-gel matrix; and (ii) drying the wet-gel matrix to provide the silica-based microporous aerogel, wherein the dried silica-based microporous aerogel has a plurality of pores wherein at least 50% of the pores have a diameter of less than about 2 nm, the microporous aerogel has a surface area in a range between about 0.1 $m^2/g$ and about 500 $m^2/g$;

with the proviso that drying the wet-gel matrix does not involve supercritical $CO_2$.

20. The process according to claim 19, wherein step (i) further comprises step (i)(b) rinsing the wet-gel matrix.

21. The process according to claim 19, wherein the process is a sol gel process and step (ii) comprises:

(a1) optionally heating the wet gel matrix to obtain a gel; and (a2) drying the gel by solvent evaporation and/or heat treatment, to thereby provide the dried silica-based microporous aerogel.

22. The process according to claim 19, wherein step (ii) further comprises:

(b1) applying the wet gel matrix is applied to a substrate to form a wet-gel film coating the substrate; and (b2) drying the wet-gel film by solvent evaporation and/or heat treatment, to thereby provide the dried silica-based microporous aerogel as a coating on the coated substrate.

23. The process according to claim 19, wherein the process further comprises an activation step.

24. The process according to claim 19, wherein the amount of amino substituted silane is in a range between about 10% and about 80% based on the total weight of the microporous aerogel;

the amount of alkyl substituted silane is in a range between about 10% and about 80% based on the total weight of the aerogel; and the amount of silicate is in a range between about 10% and about 50% based on the total weight of the microporous aerogel.

25. The process according to claim 19, further comprising addition of one or more additives.

26. A process for preparing an aerogel composite, the process comprising:

preparing a dried silica-based microporous aerogel by the process according to claim 19;

mixing the dried silica-based microporous aerogel with one or more additives, and optionally a lubricant, to form a mixture, the one or more additives having a % loading of about 5 to about 35 wt. %;

and either:

(c1) pressing the mixture into a pellet; or (c2) liquid extrusion of the mixture to provide a viscous paste.

27. A process for capturing carbon dioxide ($CO_2$) from a gaseous stream or atmosphere containing $CO_2$ comprising:

contacting the gaseous stream or atmosphere with a silica-based microporous aerogel for capturing at least some $CO_2$ from the gaseous stream or atmosphere, wherein the silica-based microporous aerogel is in accordance with claim 1 or is a silica-based microporous aerogel prepared by the process according to claim 19.

28. The process according to claim 27, wherein the gaseous stream or atmosphere has a $CO_2$ concentration of less than about 150,000 ppm; and one or more of:

wherein the gaseous stream or atmosphere has a $CO_2$ concentration in a range between about 3,000 ppm and about 150,000 ppm, wherein the process is direct air capture in external power plants (DACex);

wherein the gaseous stream or atmosphere has a $CO_2$ concentration in a range between about 4,000 ppm and about 5,000 ppm, wherein the process is direct air capture (DAC) of exhaled breath in masks or personal protective equipment (DACp);

wherein the gaseous stream or atmosphere has a $CO_2$ concentration of less than about 2,000 ppm, wherein the process is direct air capture (DAC) in indoor sealed environments (DACi); and/or wherein the gaseous stream or atmosphere is ambient air; and wherein the gaseous stream or atmosphere is less than about 500 ppm, wherein the process is direct air capture (DAC); and/or wherein at least about 50% to about 99% of $CO_2$ is removed from the gaseous stream or atmosphere.

29. The process according to claim 27, wherein the process further comprises a regeneration recovery process to desorb the absorbed $CO_2$ from the silica-based microporous aerogel.

30. The process according to claim 29, wherein the regeneration recovery process comprises one or more of:

heating the silica-based microporous aerogel to a temperature range of between about 60° C. and about 140° C., reducing pressure, flow of a gas with low $CO_2$, heating the silica-based microporous aerogel by contact with steam.

31. An adsorption apparatus for capturing carbon dioxide ($CO_2$) from a gaseous stream or atmosphere containing $CO_2$ comprising: a chamber enclosing at least one silica-based microporous aerogel that is in accordance with claim 1, or that is prepared according to claim 19, the chamber comprising an inlet through which gaseous stream can flow to the silica-based microporous aerogel, and an outlet through which the effluent gaseous stream can flow out from the silica-based microporous aerogel.

32. The apparatus according to claim 31, wherein the chamber comprises silica-based microporous aerogel in the form of a pellet, or is coated with the silica-based microporous aerogel located or packed within the chamber.

* * * * *